(12) United States Patent
Izawa et al.

(10) Patent No.: US 11,404,060 B2
(45) Date of Patent: *Aug. 2, 2022

(54) ELECTRONIC DEVICE AND CONTROL METHOD THEREOF

(71) Applicants: Qingdao Hisense Electronics Co., Ltd., Qingdao (CN); Toshiba Visual Solutions Corporation, Misawa (JP)

(72) Inventors: Hidehito Izawa, Saitama (JP); Reiko Kawachi, Tokyo (JP); Kunio Honsawa, Tokyo (JP); Hiroyuki Nomoto, Saitama (JP)

(73) Assignee: Hisense Visual Technology Co., Ltd., Qingdao (CN)

( * ) Notice: Subject to any disclaimer, the term of this patent is extended or adjusted under 35 U.S.C. 154(b) by 12 days.

This patent is subject to a terminal disclaimer.

(21) Appl. No.: 16/728,981

(22) Filed: Dec. 27, 2019

(65) Prior Publication Data

US 2020/0135202 A1 Apr. 30, 2020

Related U.S. Application Data

(63) Continuation of application No. 15/445,851, filed on Feb. 28, 2017, now Pat. No. 10,522,139.

(30) Foreign Application Priority Data

Oct. 12, 2016 (JP) .................................. 2016-200978

(51) Int. Cl.
*G10L 15/22* (2006.01)
*G10L 15/10* (2006.01)
*G10L 15/30* (2013.01)

(52) U.S. Cl.
CPC .............. *G10L 15/22* (2013.01); *G10L 15/10* (2013.01); *G10L 15/30* (2013.01);
(Continued)

(58) Field of Classification Search
USPC ........................ 704/246, 247, 251, 252, 275
See application file for complete search history.

(56) References Cited

U.S. PATENT DOCUMENTS 4,862,363 A * 8/1989 Krisher ............... B60R 16/0373
701/59
8,924,219 B1 12/2014 Bringert et al.
(Continued)

FOREIGN PATENT DOCUMENTS

JP H02135499 A 5/1990
JP H052400 A 1/1993
(Continued)

OTHER PUBLICATIONS

Japanese Patent Office, Office Action Issued in Application No. 2016-200978, dated Oct. 15, 2019, 8 pages. {Submitted with Machine Translation}.
(Continued)

*Primary Examiner* — Leonard Saint Cyr
(74) *Attorney, Agent, or Firm* — Crowell & Moring LLP

(57) ABSTRACT

According to one embodiment, an electronic device determines whether one or more devices should be controlled based on a second utterance input subsequent to a first utterance input from outside in accordance with the first utterance. The electronic device includes a management unit and a controller. The management unit prepares and manages a determination audio data item for determining whether the first utterance is a desired utterance by utterances input from outside at a plurality of times, and determines whether the first utterance is the desired utterance using the prepared and managed determination audio data item. The controller controls the one or more devices based on the second utterance.

15 Claims, 44 Drawing Sheets

(52) U.S. Cl.
CPC .. *G10L 2015/221* (2013.01); *G10L 2015/223* (2013.01); *G10L 2015/228* (2013.01)

(56) References Cited

U.S. PATENT DOCUMENTS

| | | | |
|---|---|---|---|
| 9,225,891 | B2 | 12/2015 | Han et al. |
| 10,044,869 | B2 | 8/2018 | Tadasco |
| 2007/0150291 | A1 | 6/2007 | Yamamoto et al. |
| 2011/0255707 | A1 | 10/2011 | Kumagai |
| 2012/0310645 | A1 | 12/2012 | Gruenstein et al. |
| 2013/0085755 | A1 | 4/2013 | Bringert et al. |
| 2014/0136207 | A1* | 5/2014 | Kayama ............... G10H 1/344 704/258 |
| 2014/0223477 | A1 | 8/2014 | Han et al. |
| 2014/0288931 | A1 | 9/2014 | Cho et al. |
| 2014/0297288 | A1 | 10/2014 | Yu et al. |
| 2015/0066516 | A1 | 3/2015 | Nishikawa et al. |
| 2015/0162007 | A1 | 6/2015 | Hwang et al. |
| 2015/0221305 | A1 | 8/2015 | Sharifi |
| 2015/0332675 | A1 | 11/2015 | Yasuda et al. |
| 2016/0034253 | A1 | 2/2016 | Bang et al. |
| 2016/0077794 | A1* | 3/2016 | Kim ..................... G06F 3/167 704/275 |
| 2017/0069321 | A1* | 3/2017 | Toiyama ............... G10L 15/22 |
| 2017/0140752 | A1* | 5/2017 | Sugitani ............... G10L 15/32 |
| 2017/0169817 | A1* | 6/2017 | VanBlon ............... G10L 15/22 |
| 2017/0213559 | A1* | 7/2017 | Agrawal ............... G10L 15/22 |
| 2018/0007210 | A1 | 1/2018 | Todasco |

FOREIGN PATENT DOCUMENTS

| | | |
|---|---|---|
| JP | 2005178473 A | 7/2005 |
| JP | 2010039099 A | 2/2010 |
| JP | 2013140349 A | 7/2013 |
| JP | 2014137430 A | 7/2014 |
| JP | 2015052945 A | 3/2015 |
| JP | 2015088108 A | 5/2015 |
| JP | 2018036397 A | 3/2018 |
| JP | 2018036653 A | 3/2018 |

OTHER PUBLICATIONS

European Patent Office: European Search Report mailed in corresponding European Patent Application No. 17158200.0 dated Jan. 26, 2018 (8 pages).

Setting and using "Hey Siri" to start Siri by voice, Dekiru Net, Oct. 21, 2016, 21 pages, Downloaded by ISA/JP on Apr. 27, 2018 from: http://dekiru.net/article/5312.

* cited by examiner

| Earthquake sensor | Door sensor | Odor sensor |
|---|---|---|
| Humidity sensor | Window sensor | Gravity sensor |
| Water leak sensor | Bathtub water level sensor | Condensation sensor |
| Gas sensor | Illuminance sensor | Call sensor |
| Smoke sensor | Acceleration sensor | Electrical leak sensor |
| Flame sensor | Pressure sensor | Rain sensor |
| Overflow sensor | Passage sensor | Active mass sensor |

FIG. 2

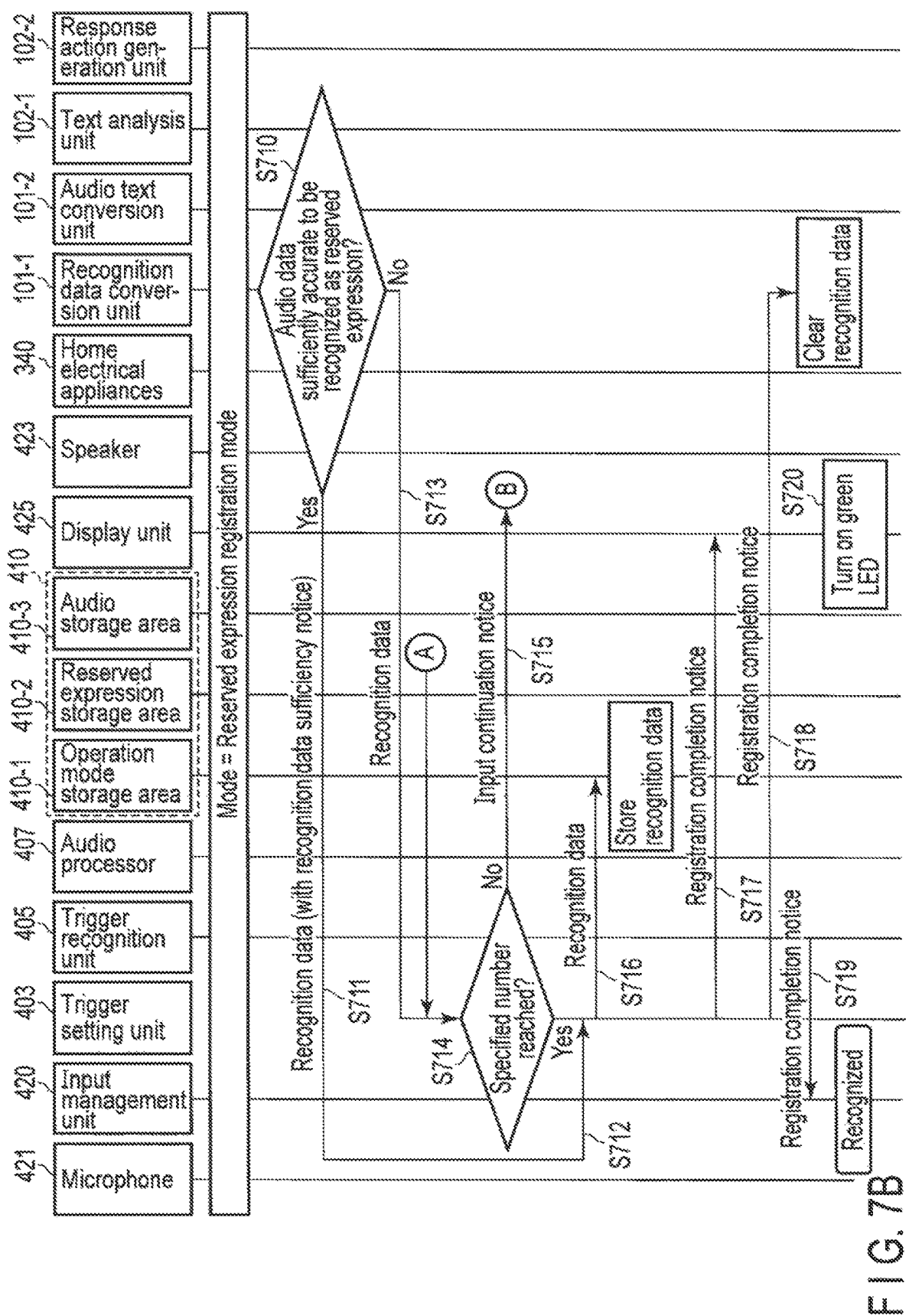
F I G. 7B

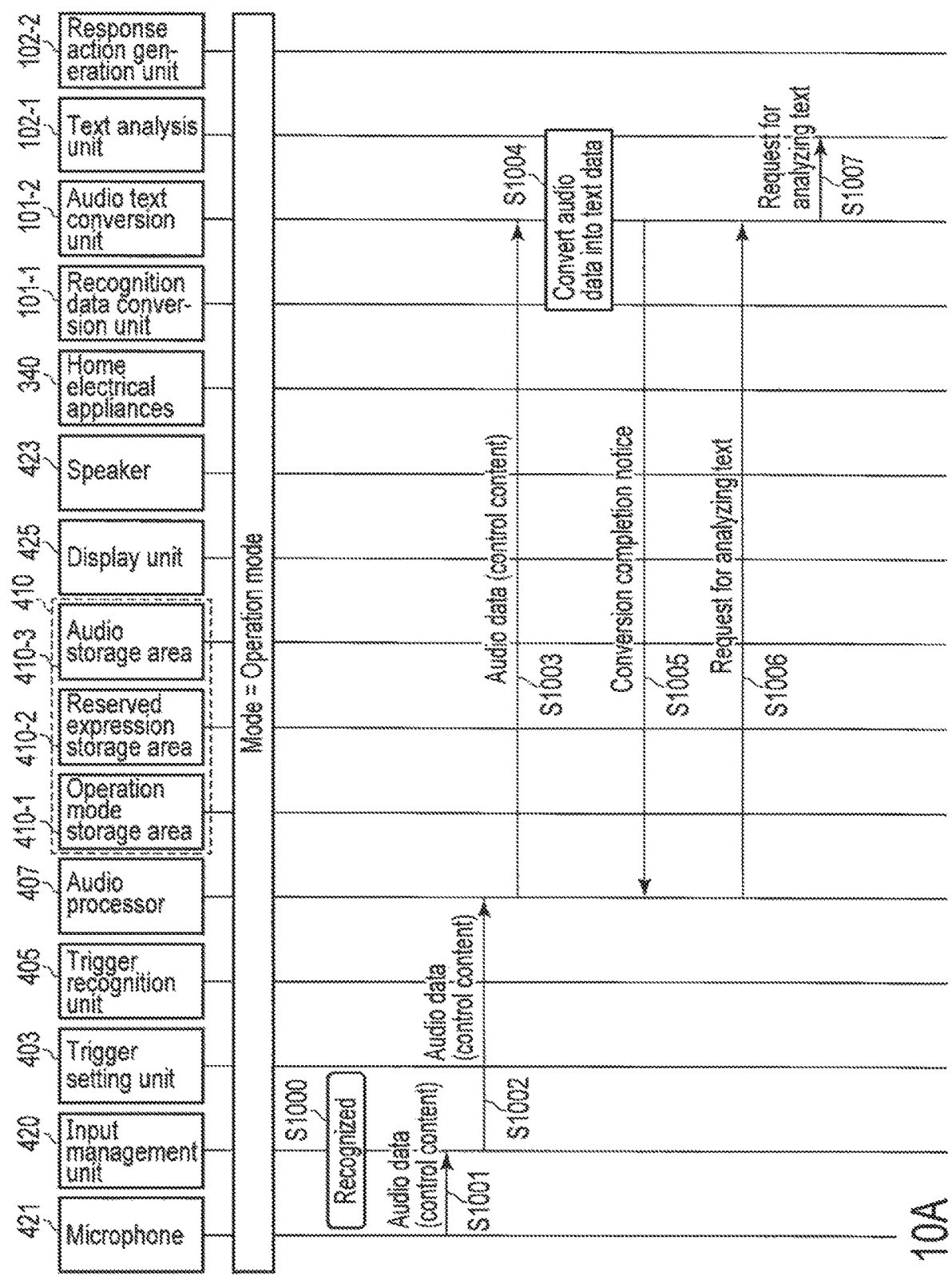
F I G. 10A

| Item 1 | Item 2 = Target | Item 3 = Instruction | Item 4 = Words |
|---|---|---|---|
| Target = Air conditioner 1<br>Instruction = Activation instruction | Air conditioner 1 | Activation instruction | Turn the air conditioner on |
| Target = Air conditioner 1<br>Instruction = Stop instruction | Air conditioner 1 | Stop instruction | Turn the air conditioner off |
| Target = Air conditioner 1<br>Instruction = Operation change instruction | Air conditioner 1 | Operation change instruction | Switch to dry mode |
| Target = Air conditioner 1<br>Instruction = Setting change instruction | Air conditioner 1 | Setting change instruction | Turn the air conditioner on at ten at night |

FIG. 13

| Reserved expression | Operation (additional information 1) |
|---|---|
| Iroha (abc) | — |
| Oresama-da (It's me) | Immediately make announcement of "goshujin-sama, yorokonde (my master)" |
| Musuko-ya (my son) | Extend expiry time T0 of input interval confirmation timer |

FIG. 14

| Reserved expression | Additional word | Operation (additional information 2) |
|---|---|---|
| Iroha (abc) | (None) | — |
| | Chan (sweetie) | Use high tone in response |
| | Ya (son) | Extend time T0 |
| | Oi (hey) | Immediately make announcement of "moushiwakegozaimasen (I'm sorry)" |

F I G. 17A

| Reserved expression | Additional word | Operation (additional information 2) |
|---|---|---|
| Iroha (abc) | (None) | — |
| | Chan (sweetie) | Use high tone in response |
| | Ya (son) | Extend time T0 |
| | Oi (hey) | Immediately make announcement of "moushiwakegozaimasen (I'm sorry)" |
| Ookini (thank you) | (None) | — |
| | Chan (sweetie) | Increase speed of announcement of response |
| | Desuuuu (meeee) | Decrease speed of announcement of response |
| Shindo (I'm tired) | (None) | Announce types of beers in refrigerator |
| | Mattaku (really) | Increase speed of announcement of response |
| | Ya (son) | Immediately make announcement of "hayou yasunde (go to bed early)" |

F I G. 17B

| Reserved expression | Speech recognition dictionary (additional information 3) |
|---|---|
| Konnichiwa | Japanese dictionary |
| Hello | English dictionary |
| Ookini | Dialect dictionary (Kansai dialect) |

FIG. 20

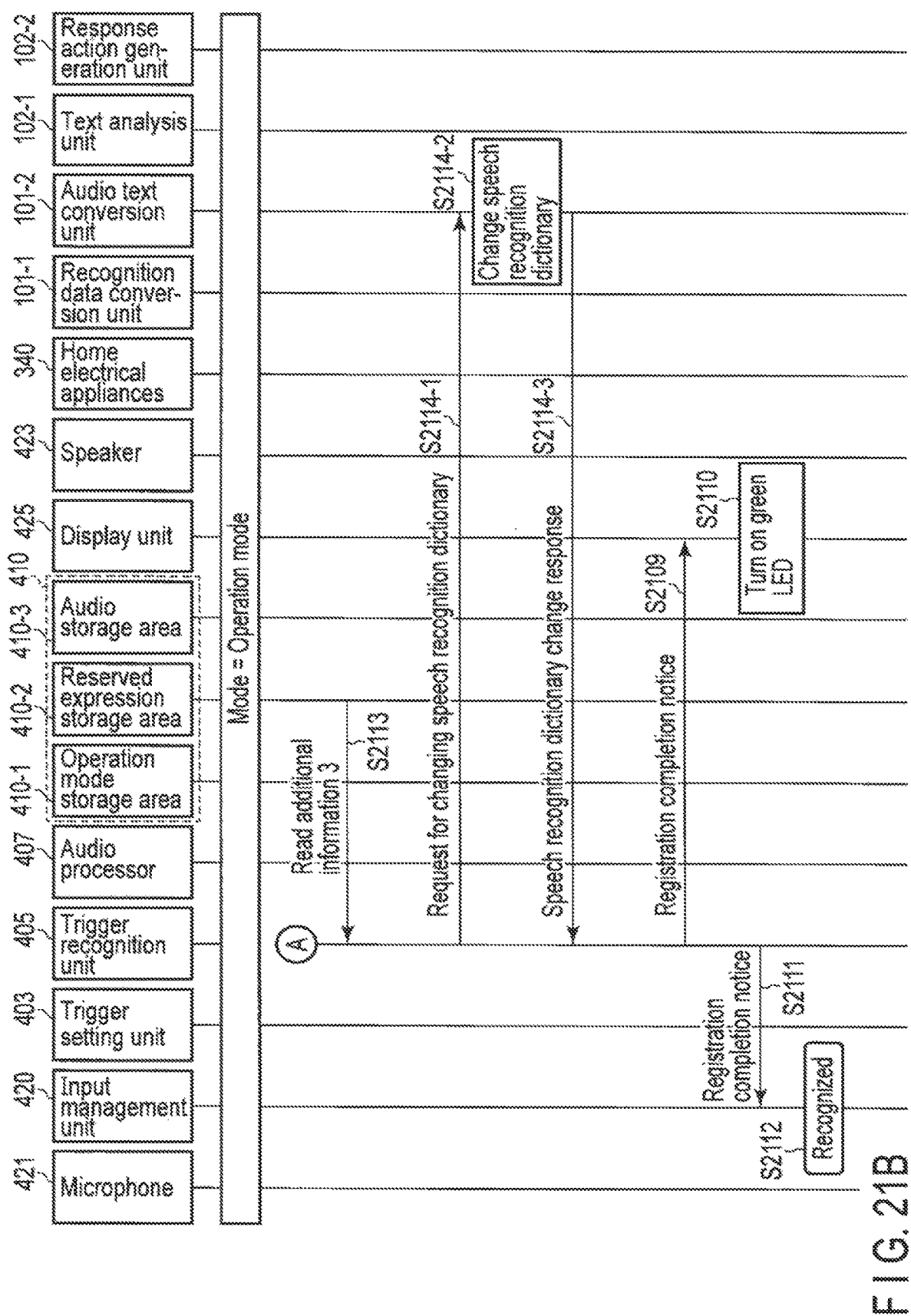
F I G. 21B

| Reserved expression | Additional word | Operation (additional information 2) | Speech recognition dictionary (additional information 3) |
|---|---|---|---|
| Iroha(abc) | (None) | — | Japanese dictionary |
| | Chan (sweetie) | Use high tone in response | Japanese dictionary |
| | Ya (son) | Extend time T0 | Japanese dictionary |
| | Oi (hey) | Immediately make announcement of "moushiwakegozaimasen (I'm sorry)" | Japanese dictionary |
| Ookini (thank you) | (None) | Increase speed of announcement of response | Dialect dictionary (Kansai dialect) |
| | Desuuuu (meeee) | Decrease speed of announcement of response | Dialect dictionary (Kansai dialect) |

F I G. 22

| Condition for change = Time | Speech recognition dictionary (additional information 3) |
|---|---|
| 5:00 – 8:00 | General dictionary for family |
| 8:00 – 16:00 | Dictionary for Wife |
| 16:00 – 20:00 | General dictionary for family |
| 20:00 – 5:00 | Dictionary for adults |

F I G. 23A

| Condition for change = Operation status of host device | Speech recognition dictionary (additional information 3) |
|---|---|
| GOING TO WORK | Time route search dictionary (prioritize route/station/train operation status) |
| OUT | General dictionary |
| NIGHT | Refresh dictionary (prioritize music/program/movie) |

F I G. 23B

| Remedial reserved expression (reserved expression (for remedy)) | Reserved expression display (display range) |
|---|---|
| I don't know | Display all reserved expressions |
| Tell me | Display some of reserved expressions |
| Not used | Display reserved expressions which have not been used for the past year |

F I G. 26

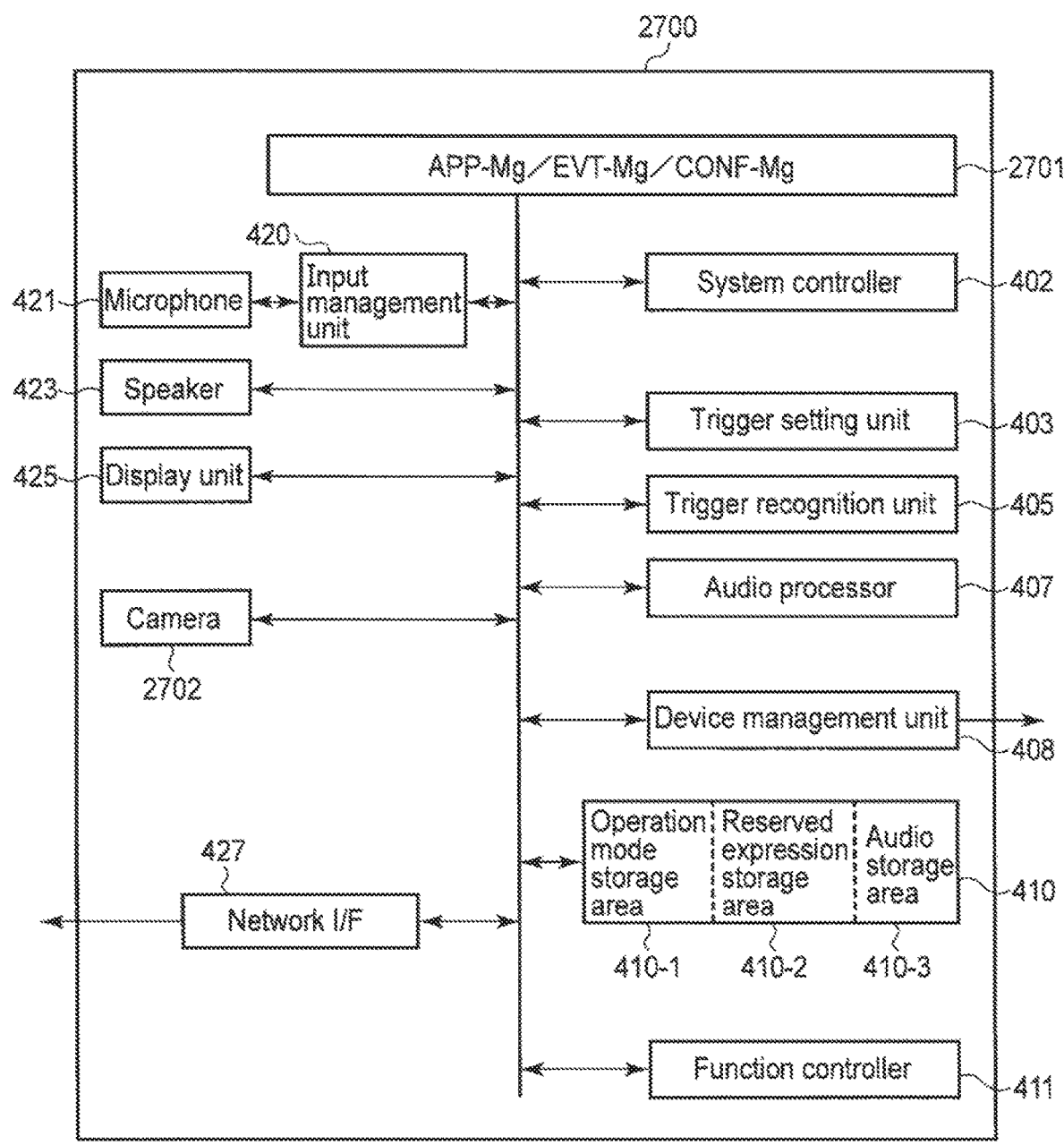
F I G. 27

ELECTRONIC DEVICE AND CONTROL METHOD THEREOF

CROSS-REFERENCE TO RELATED APPLICATIONS

This application is a continuation of U.S. patent application Ser. No. 15/445,851 filed on Feb. 28, 2017, which claims the benefit of priority from Japanese Patent Application No. 2016-200978, filed on Oct. 12, 2016, the entire contents of which are incorporated herein by reference.

TECHNICAL FIELD

Embodiments described herein relate generally to an electronic device which controls a plurality of devices by voice in the field of home automation at home, office, and small office home office, and a control method thereof.

BACKGROUND

In the conventional home automation, a speech recognition device or method for operating and controlling various devices at home, office, and small office home office by voice input is present.

The speech recognition device or method determines whether the speech input by the user is the speech for turning the function of the device on by analyzing the input speech. When the device or method determines that the input speech is the speech for turning the function of the device on, the device or method analyses the continuing speech, and performs a process based on the result of analysis. The device or method may recognize the feature of the speech input by the user, specify the user of the speech, and perform a process suitable for the user.

In a form of the home automation system, devices are connected to each other via a network at home. Further, a host device which controls these devices as a whole is connected to the network. In this case, the host device controls the operations of the devices connected via the network, and collects and manages information related to each device such that the user can browse the information in an integrated fashion.

For example, the user gives an instruction to the host device by voice. In this way, the user can control each device connected to the host device via the network and browse the information related to each device in an integrated fashion.

In the home automation system in the above form, the devices to be controlled can be easily connected via the network. Therefore, the number of connected devices or types is subject to be great. In addition, new entry into the network, setting change and withdrawal from the network occur frequently in connection with addition of a device to be controlled, or change, version upgrade, move of the installation site or disposal of the controlled devices. Since the connected devices vary widely in terms of the type such as the operation or specification, there is a tendency to use the home automation system at home or office irrespective of age or sex. Recently, this tendency has become pronounced in connection with the reduction in the size of devices or sensors having a wide variety of functions.

However, in the conventional home automation system, the control of various devices or support for a wide range of users is insufficient. For example, when the home automation system is used at home, the control of devices does not sufficiently correspond to the lifestyle of each of family members.

In consideration of the above problem, the embodiments described herein aim to suggest an electronic device which controls a wide variety of devices connected via a network such that the operation is more suitable for the lifestyle of each user, and a control method thereof.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 shows a list of other examples of sensors according to an embodiment.

FIG. 7B shows an example of the sequence of steps for registering a reserved expression according to an embodiment.

FIG. 10A shows an example of the sequence of steps for controlling a device or sensor based on the successive utterance of the user for controlling the device or sensor after the recognition of a reserved expression according to an embodiment.

FIG. 13 shows a list of specific examples of control information used to control the devices and sensors after the recognition of a reserved expression according to an embodiment.

FIG. 14 shows a list of examples of operations performed in accordance with a plurality of reserved expressions according to an embodiment.

FIG. 17A shows a list of examples of operations set in accordance with utterances subsequent to reserved expressions according to an embodiment.

FIG. 17B shows a list of examples of operations set in accordance with utterances subsequent to reserved expressions according to an embodiment.

FIG. 20 shows a list of examples of types of speech recognition dictionaries used in accordance with a plurality of reserved expressions in the recognition of the reserved expressions according to an embodiment.

FIG. 21B shows an example of the sequence of steps for recognizing one of reserved expressions and changing the type of speech recognition dictionary to be used in accordance with the reserved expression according to an embodiment.

FIG. 22 shows a list of examples for changing, in the recognition of a plurality of reserved expressions, the operation to be set and the type of speech recognition dictionary to be used in accordance with each utterance subsequent to each reserved expression according to an embodiment.

FIG. 23A shows a list of examples in which the type of speech recognition dictionary is changed in accordance with the content other than a reserved expression according to an embodiment.

FIG. 23B shows a list of examples in which the type of speech recognition dictionary is changed in accordance with the content other than a reserved expression according to an embodiment.

FIG. 26 shows a list of examples of remedial reserved expressions and ranges for displaying corresponding reserved expressions when the user forgets a registered reserved expression in a process according to an embodiment.

FIG. 27 shows the functional blocks of the host device according to an embodiment.

DETAILED DESCRIPTION

Various embodiments will be described hereinafter with reference to the accompanying drawings.

In general, according to one embodiment, an electronic device determines whether one or more devices should be controlled based on a second utterance input subsequent to a first utterance input from outside in accordance with the first utterance. The electronic device comprises a management unit and a controller. The management unit prepares and manages a determination audio data item for determining whether the first utterance is a desired utterance by utterances input from outside at a plurality of times, and determines whether the first utterance is the desired utterance using the prepared and managed determination audio data item. The controller controls the one or more devices based on the second utterance. When the management unit determines that the first utterance is the desired utterance using the determination audio data item, the controller controls the one or more devices based on the second utterance.

Figure 1:
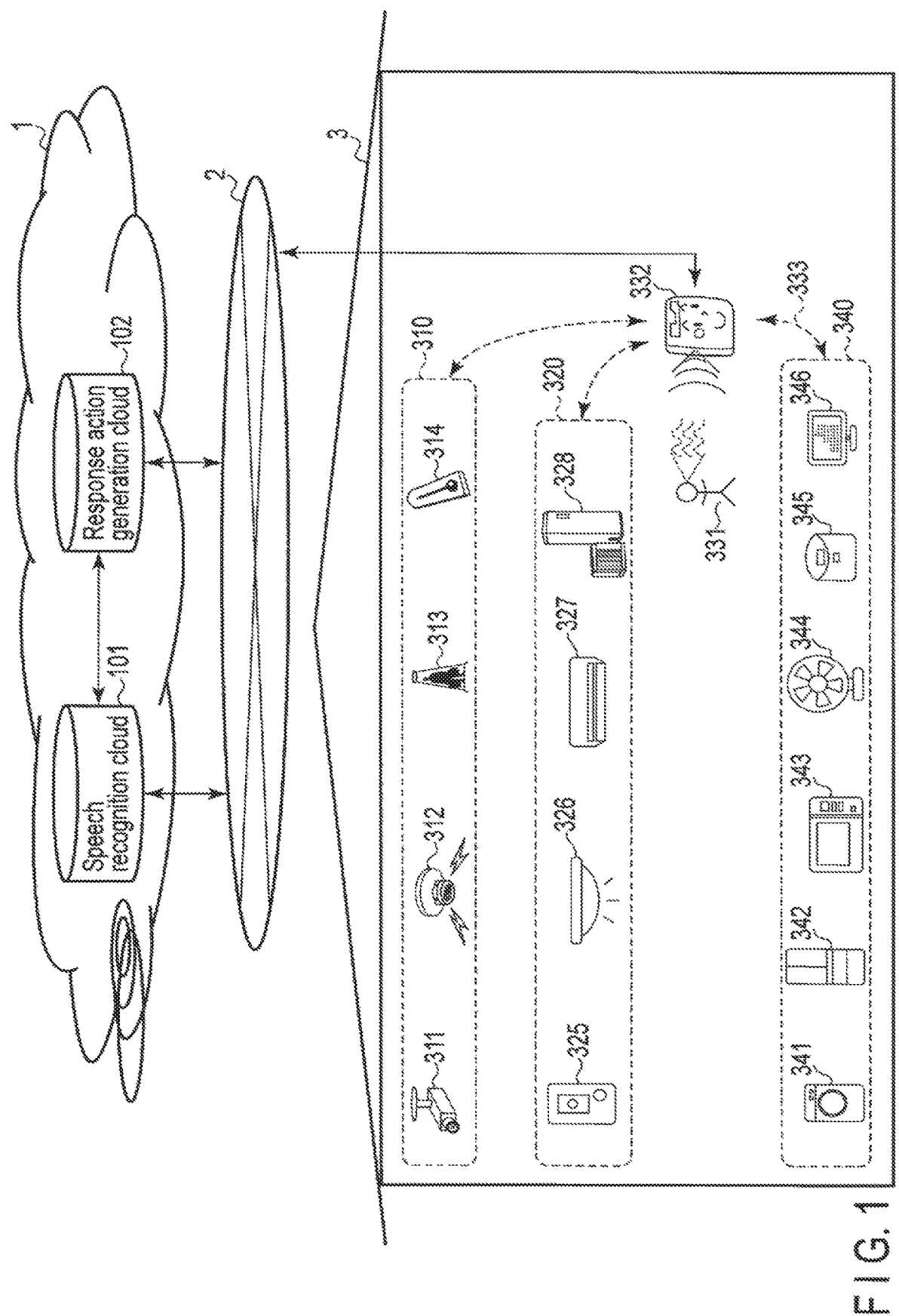
FIG. 1 shows an example of the whole structure of a home automation system according to an embodiment.

FIG. 1 shows an example of the whole structure of a home automation system according to the present embodiment. The home automation system comprises a cloud server 1, a home 3 and the Internet 2. The cloud server 1 comprises a group of servers placed on a cloud. The home 3 comprises various sensors 310, various equipment devices 320 and various home electrical appliances 340 connected to each other via a host device 332 having a home gateway (HGW) function and a network 333. The Internet 2 connects the cloud server 1 and the host device 332.

The home 3 is a home, office, or small office home office comprising the sensors 310, the equipment devices 320 and the home electrical appliances 340 connected to each other via the host device 332 having the HGW function and the home network 333. The scale of the home 3 is not particularly specified.

The host device 332 has a function for controlling the devices and sensors connected via the network 333 based on the information set in advance or the information from the sensors connected via the network 333, and managing the information related to the devices and sensors in an integrated fashion.

The host device 332 comprises a microphone, and is capable of loading the utterance of a user 331. When the host device 332 recognizes a predetermined expression (referred to as a reserved expression) from the utterance of the user 331, the host device 332 is configured to load the utterance of the user 331 subsequent to the reserved expression. The host device 332 is further configured to analyze the loaded utterance, and send a response to the user 331 or control the devices and sensors connected via the network 333 in accordance with the result of analysis.

Unless the host device 332 recognizes a reserved expression from the utterance of the user 331, the host device 332 does not continuously load the utterance of the user 331. In this way, the host device 332 prevents itself from operating with unnecessary ambient sound.

The host device 332 recognizes a reserved expression. The cloud server 1 loads the utterance of the user 331 subsequent to the reserved expression and analyzes the loaded utterance. The details of the function of the host device 332 are explained later.

For the sake of convenience, the equipment devices 320 indicate devices which are difficult to move, and the home electrical appliances 340 indicate devices which are relatively easy to move. The term "equipment device" or "home electrical appliance" shown as an example does not limit the performance or function of each device.

Specific examples of the sensors 310 include a security camera 311, a fire-alarm box 312, a motion detector 313 and a temperature sensor 314. Specific examples of the equipment devices 320 include an interphone 325, a light fixture 326, an air conditioner 327 and a water heater 328. Specific examples of the home electrical appliances 340 include a wash machine 341, a refrigerator 342, a microwave 343, an electric fan 344, a rice cooker 345 and a television 346.

FIG. 2 shows other examples of the sensors 310 shown in FIG. 1.

Figure 3:
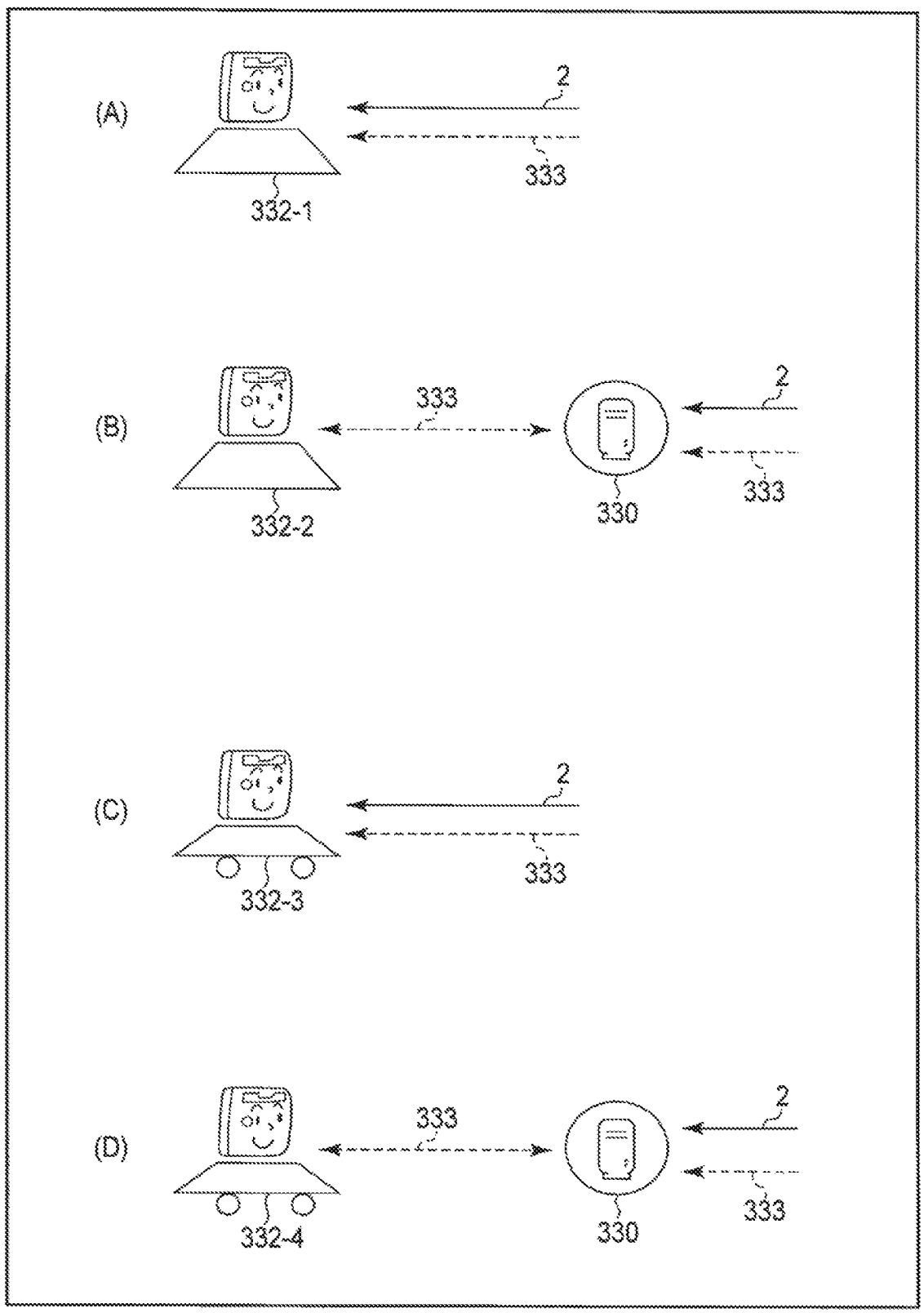
FIG. 3 shows examples of host devices according to an embodiment.

FIG. 3 shows various examples of the host device 332 shown in FIG. 1.

Host device 332-1 is the host device 332 shown in FIG. 1, and is an example of a stationary type having a built-in HGW function. Host device 332-1 is connected to the other devices and sensors provided in the home 3 via the network 333, and is connected to the cloud server 1 via the Internet 2. Host device 332-1 is stationary. Thus, host device 332-1 is an example in which a unit for autonomously moving such as a motor is not provided.

Host device 332-2 is an example of a stationary type which does not have a built-in HGW function. Host device 332-2 is connected to an HGW 330 via the network 333. Host device 332-2 is connected to the other devices and sensors provided in the home 3 via the HGW 330 and the network 333, and is connected to the cloud server 1 via the HGW 330 and the Internet 2. Host device 332-2 is stationary. Thus, host device 332-2 is an example in which a unit for autonomously moving such as a motor is not provided.

Host device 332-3 is an example of a movable type having a built-in HGW function. Host device 332-3 is connected to the other devices and sensors via the network 333, and is connected to the cloud server 1 via the Internet 2. Host device 332-3 is movable. Thus, host device 332-3 is an example in which a unit for autonomously moving such as a motor is provided.

Host device 332-4 is an example of a movable type which does not have a built-in HGW function. Host device 332-4 is connected to the HGW 330 via the network 333. Host device 332-4 is connected to the other devices and sensors via the HGW 330 and the network 333, and is connected to the cloud server 1 via the HGW 330 and the Internet 2. Host device 332-4 is movable. Thus, host device 332-4 is an example in which a unit for autonomously moving such as a motor is provided.

Figure 4:
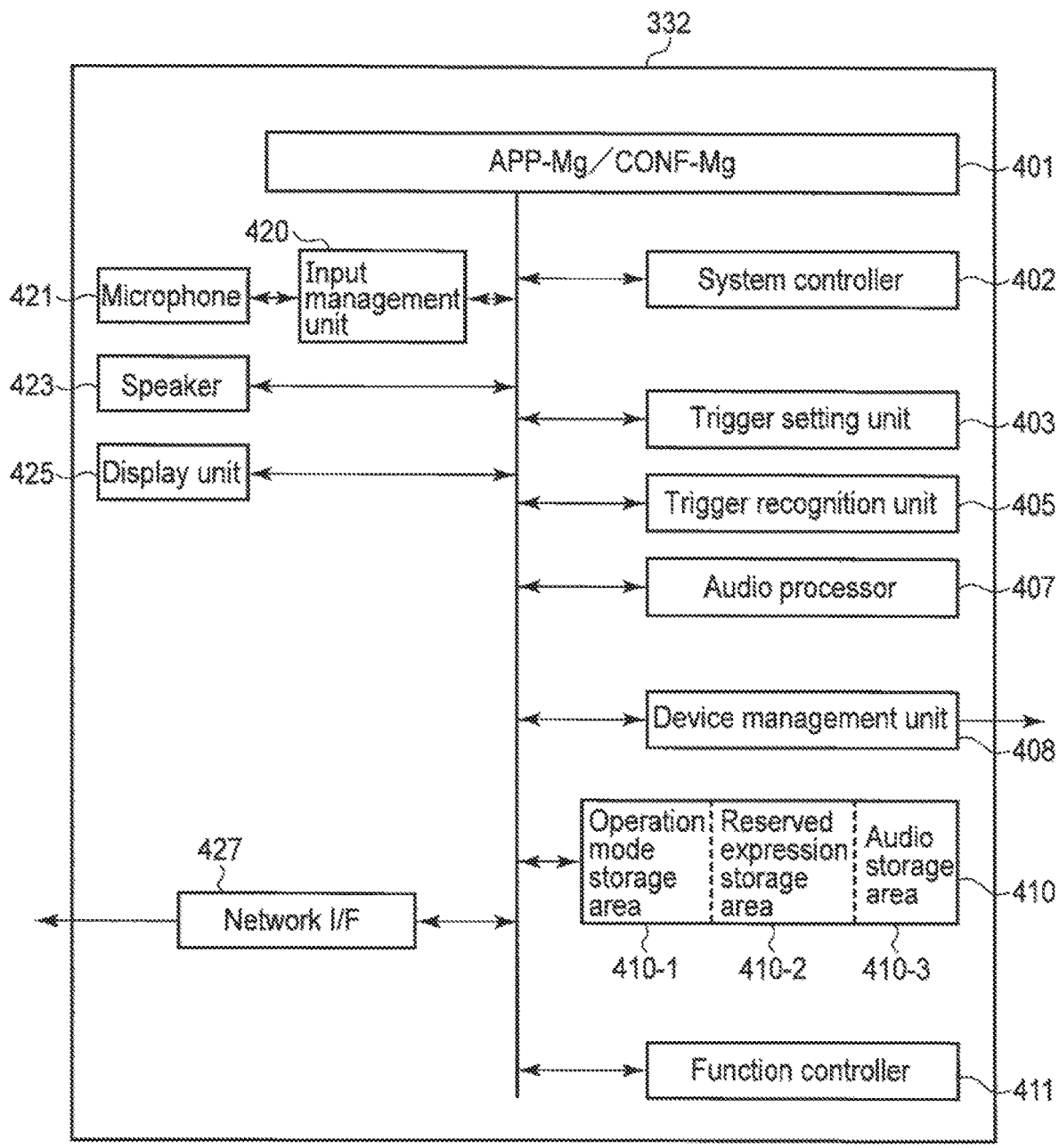
FIG. 4 shows the functional blocks of the host device according to an embodiment.

FIG. 4 shows the functional blocks of the host device 332 shown in FIG. 1. The host device 332 comprises a system controller 402 which controls the internal process as a whole, a control management unit 401 which controls each function by the system controller 402, a trigger setting unit 403, a trigger recognition unit 405, an input management unit 420, and a network I/F 427 for connection to the network 333. The control management unit 401 internally comprises APP-Mg 401-1 which manages a plurality of applications for controlling various operations of the host device 332, and CONF-Mg 401-2 which manages the setting of each functional block of the host device 332 such as the default setting, the setting of various states and the operation setting.

The host device 332 comprises, as interfaces (I/F) with the user 331, a microphone 421 for loading the utterance of the user 331, a speaker 423 for outputting a response to the user 331 by sound, and a display unit 425 for notifying the user 331 of the state of the host device 332.

The microphone 421 is connected to the input management unit 420. The input management unit 420 performs control regarding whether the audio data input from the microphone 421 should be transmitted to the trigger setting unit 403, the trigger recognition unit 405 or an audio processer 407. The display unit 425 notifies the user 331 of the state of the host device 332, and is, for example, a light-emitting diode (LED) or a liquid crystal display (LCD).

A memory 410 is divided into three areas, specifically, an operation mode storage area 410-1, a reserved expression storage area 410-2 and an audio storage area 410-3. The data stored in each area is explained later.

As explained above, when the host device 332 recognizes a reserved expression from the utterance of the user 331, the host device 332 is configured to load the utterance of the user 331 subsequent to the reserved expression. Further, the host device 332 is configured to analyze the loaded utterance, and send a response to the user 331 or control the operations of the devices and sensors connected via the network 333 in accordance with the result of analysis.

To realize the above functions, the host device 332 mainly performs four processes. In the first process, a reserved expression is registered. In the second process, a reserved expression is recognized. In the third process, the control content of the target device or sensor is registered. In the fourth process, a device or sensor in which the control content has been registered is controlled.

The first process in which a reserved expression is registered is explained.

The host device 332 has a function for registering a reserved expression in the host device 332. To register a reserved expression, the host device 332 has a mode for registering a reserved expression (referred to as a reserved expression registration mode).

Figure 5A:
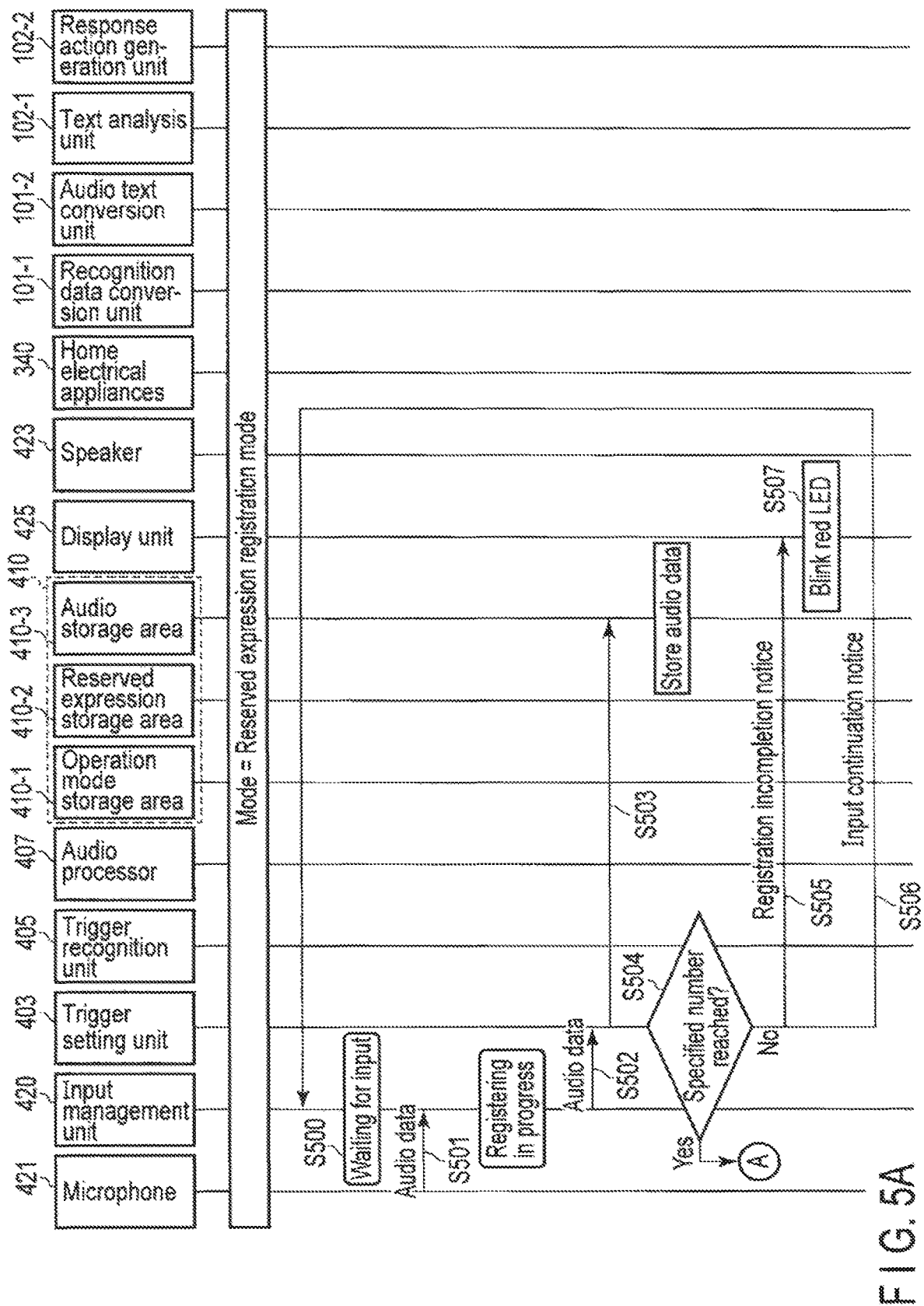
FIG. 5A shows an example of the sequence of steps for registering a reserved expression according to an embodiment.
Figure 5B:
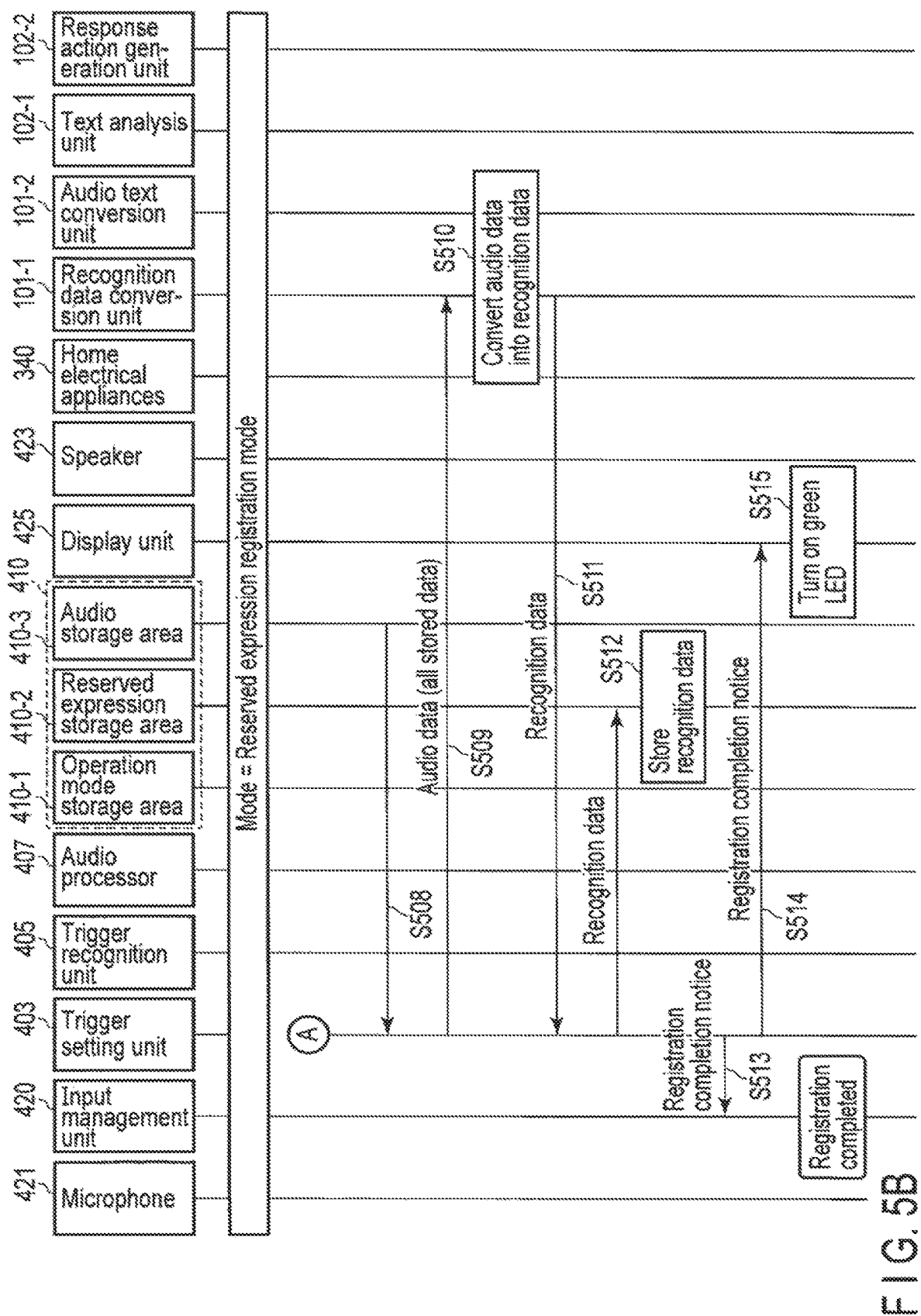
FIG. 5B shows an example of the sequence of steps for registering a reserved expression according to an embodiment.

FIG. 5A and FIG. 5B show an example of the sequence of steps which are performed by the host device 332 for registering a reserved expression from start to completion in a state where the host device 332 is in a reserved expression registration mode to register the reserved expression.

The host device 332 may change the mode by recognizing the utterance of the user 331 in an order determined in advance to change the mode. Alternatively, a menu screen may be displayed on the display unit 425. The user 331 may operate the menu screen to change the mode. Alternatively, the user 331 may change the mode of the host device 332 by operating a menu screen displayed on a smartphone or tablet connected via the network I/F 427 for changing the mode.

When the user 331 says a reserved expression, the host device 332 loads the audio data input from the microphone 421 into the input management unit 420 (S501). The input management unit 420 has a function for determining the forwarding destination of the input audio data in accordance with the state managed internally. When the host device 332 is in a setting mode, the input management unit 420 transmits the received audio data to the trigger setting unit 403 (S502). The trigger setting unit 403 stores the received audio data in the audio storage area 410-3 of the memory 410 (S503), and confirms whether the number of loads of utterances of the user 331 has reached a specified number (S504).

When the trigger setting unit 403 determines that the number of loads of utterances of the user 331 has not reached the specified number as a result of confirmation, the trigger setting unit 403 performs display to prompt the user 331 to say the expression to be registered (S507), and transmits input continuation notice to the input management unit 420 (S506). After the input continuation notice is received, the input management unit 420 causes the internal state to transition to a state for waiting for a speech input from the microphone (S500).

The display to prompt the user 331 to say the expression to be registered is preferably performed by a display method which allows the user 331 to recognize incompletion. For example, the trigger setting unit 403 may transmit registration incompletion notice to the display device 425 (S505). After the registration incompletion notice is received, the display device 425 may cause, for example, a red light-emitting diode (LED) to blink (S507). Instead of the display method, a sound method may be used to prompt the user 331 to input the expression to be registered. In this case, the trigger setting unit 403 may transmit registration incompletion notice to the speaker 423. After the registration incompletion notice is received, the speaker 423 may make an announcement, such as "please input again", to the user 331. Alternatively, the trigger setting unit 403 may use both a display method and a sound method to prompt the user 331 to input the expression to be registered. Alternatively, when the host device 332 is movable, the trigger setting unit 403 may instruct a movable unit (not described) to, for example, repeatedly rotate the host device 332 with a certain angular width.

When the trigger setting unit 403 determines that the number of loads of utterances of the user 331 has reached the specified number as a result of confirmation, the trigger setting unit 403 reads all the audio data stored in the audio storage area 410-3 (S508), and transmits the read audio data to a recognition data conversion unit 101-1 of a speech recognition cloud 101 of the cloud server 1 via the Internet 2 (S509).

The recognition data conversion unit 101-1 converts the audio data transmitted from the trigger setting unit 403 into recognition data for recognition as a reserved expression (S510). After the conversion into recognition data is completed, the recognition data conversion unit 101-1 transmits the recognition data to the trigger setting unit 403 via the Internet 2 (S511). After the recognition data is received, the trigger setting unit 403 stores the received data in the reserved expression storage area 410-2 of the memory 410 (S512).

The trigger setting unit 403 performs display to notify the user 331 that the registration of the reserved expression is completed (S514). The display to notify the user 331 that the registration of the reserved expression is completed is preferably performed by a display method which allows the user 331 to recognize the completion. For example, the trigger setting unit 403 may transmit registration completion notice to the display device 425 (S514). After the registration completion notice is received, the display device 425 may turn on, for example, a green LED. Instead of the display method, the trigger setting unit 403 may use a sound method to notify the user 331 of the completion of the registration of the reserved expression. In this case, the trigger setting unit 403 may transmit registration completion notice to the speaker 423. After the registration completion notice is received, the speaker 423 may make an announcement, such as "registration has been completed", to the user 331. Alternatively, the trigger setting unit 403 may use both a display method and a sound method to notify the user 331 that the registration of the reserved expression is completed. Alternatively, when the host device 332 is movable, the trigger setting unit 403 may instruct the movable unit (not described) to cause the host device 332 to, for example, repeatedly perform a rectilinear motion with a certain motion width.

As described above, the trigger setting unit 403 serves to manage the flow of data in the process for registering a reserved expression.

Figure 6A:
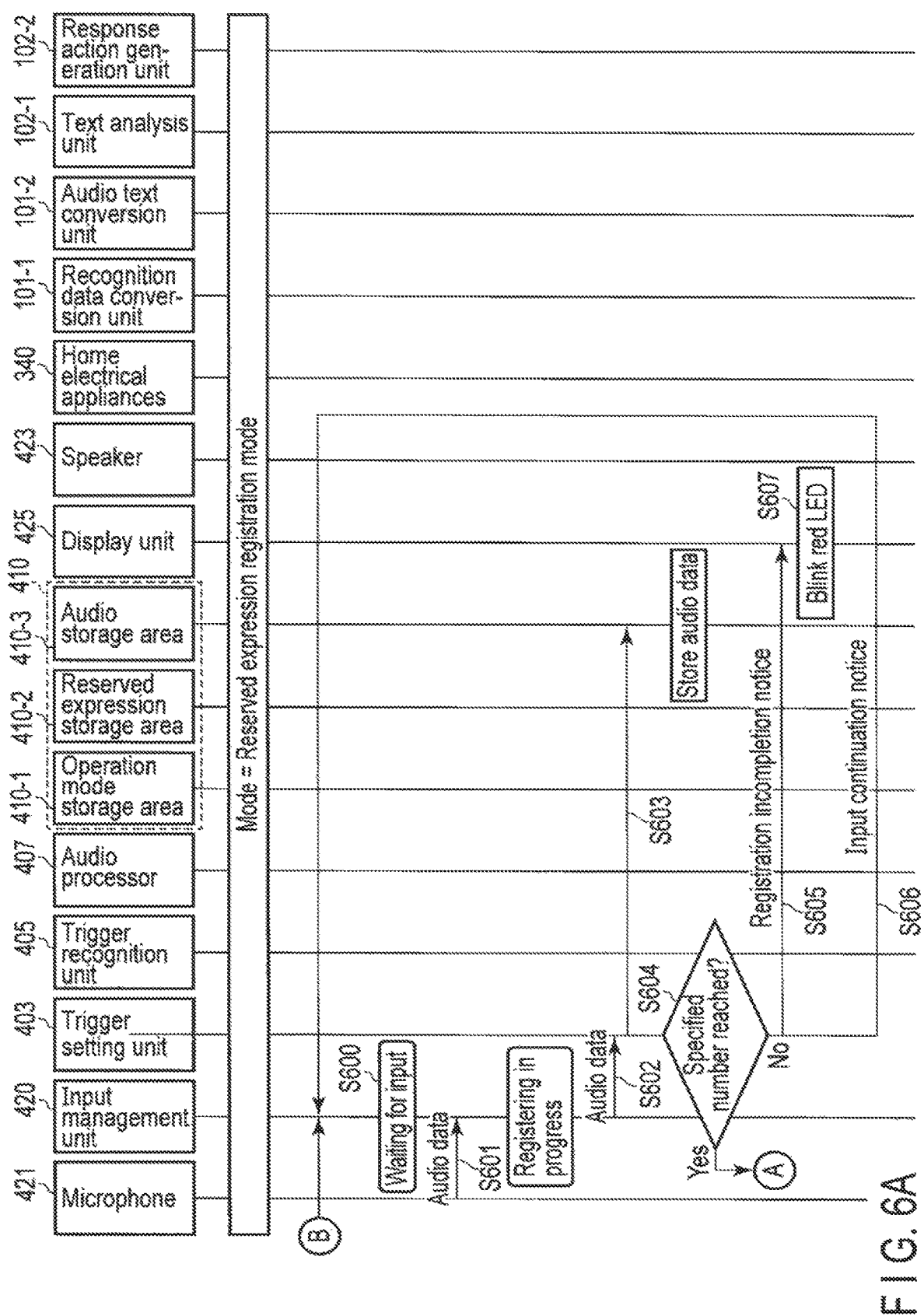
FIG. 6A shows an example of the sequence of steps for registering a reserved expression according to an embodiment.
Figure 6B:
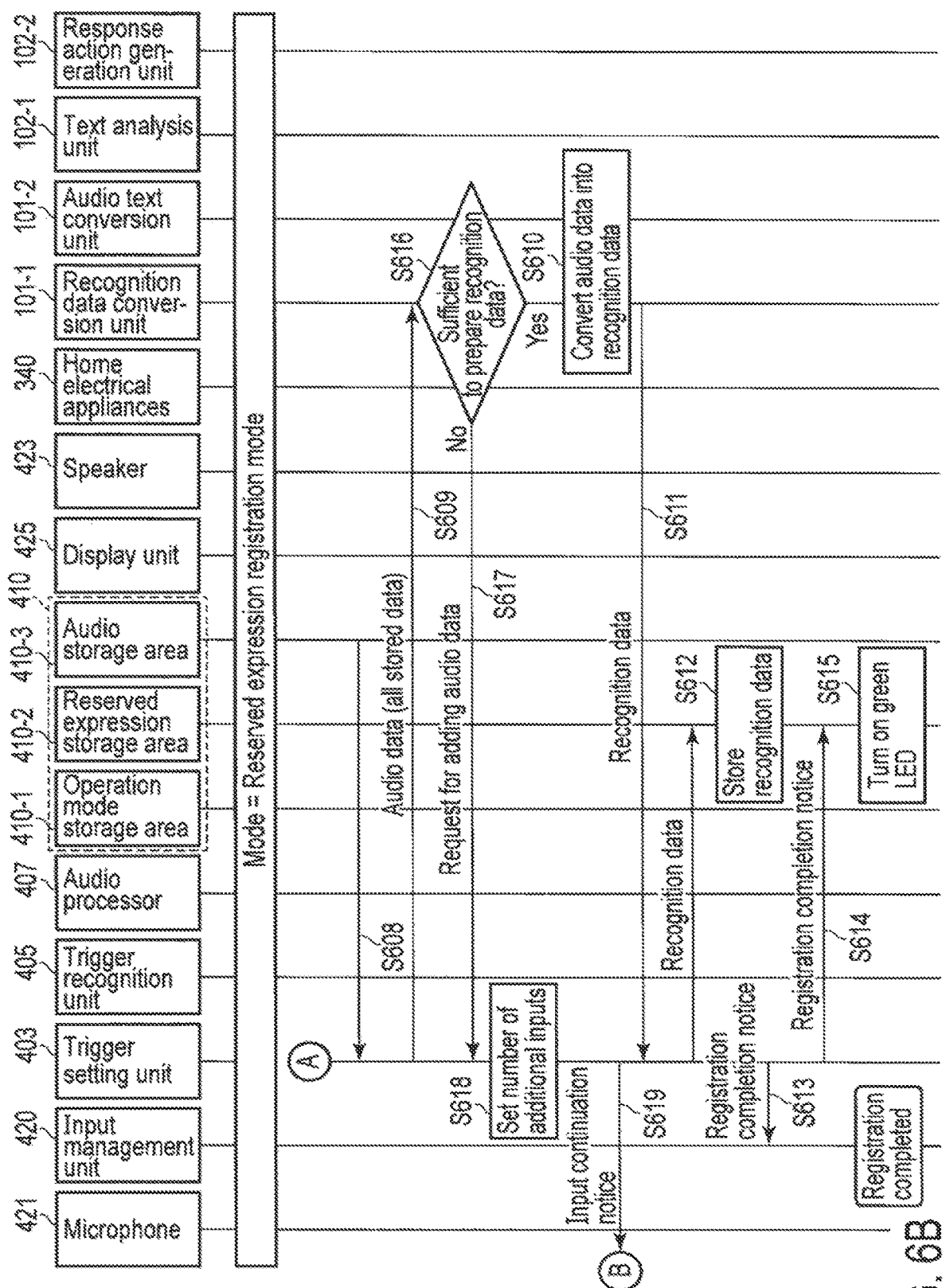
FIG. 6B shows an example of the sequence of steps for registering a reserved expression according to an embodiment.

FIG. 6A and FIG. 6B show another example of the sequence of steps for registering a reserved expression from start to completion. In some cases, the audio data loaded by the host device 332 is insufficient to be registered as a reserved expression. FIG. 6A and FIG. 6B show an example of a process which is performed when the loaded data is insufficient.

Steps S600 to S615 shown in FIG. 6A and FIG. 6B are the same as steps S500 to S515 shown in FIG. 5A and FIG. 5B, respectively. The process of FIG. 5A and FIG. 5B is different from that of FIG. 6A and FIG. 6B in respect that FIG. 6B includes additional steps S616 to S619.

When the trigger setting unit 403 determines that the number of loads of utterances of the user 331 has reached the specified number as a result of confirmation (S604), the trigger setting unit 403 reads all the audio data stored in the audio storage area 410-3 (S608), and transmits the read audio data to the recognition data conversion unit 101-1 of the speech recognition cloud 101 of the cloud server 1 via the Internet 2 (S609).

When the trigger setting unit 403 determines that the number of loads of utterances of the user 331 has not reached the specified number, the trigger setting unit 403 performs display to prompt the user 331 to say the expression to be registered (S607), and transmits input continuation notice to the input management unit 420 (S606). After the input continuation notice is received, the input management unit 420 causes the internal state to transition to a state for waiting for a speech input from the microphone (S600).

The display to prompt the user 331 to say the expression to be registered is preferably performed by a display method which allows the user 331 to recognize incompletion. For example, the trigger setting unit 403 may transmit registration incompletion notice to the display device 425 (S605). After the registration incompletion notice is received, the display device 425 may cause, for example, the red LED to blink (S607). Instead of the display method, a sound method may be used to prompt the user 331 to input the expression to be registered. In this case, the trigger setting unit 403 may transmit registration incompletion notice to the speaker 423. After the registration incompletion notice is received, the speaker 423 may make an announcement, such as "please input again", to the user 331. Alternatively, the trigger setting unit 403 may use both a display method and a sound method to prompt the user 331 to input the expression to be registered. Alternatively, when the host device 332 is movable, the trigger setting unit 403 may instruct the movable unit (not described) to, for example, repeatedly rotate the host device 332 with a certain angular width.

When the recognition data conversion unit 101-1 converts all the audio data transmitted from the trigger setting unit 420 into recognition data, the recognition data conversion unit 101-1 determines whether the transmitted audio data can be converted into recognition data (S616). When the recognition data conversion unit 101-1 determines that some items of the transmitted audio data cannot be converted into recognition data, the recognition data conversion unit 101-1 transmits a request for adding audio data to the trigger setting unit 403 via the Internet 2 (S617). After the request for adding audio data is received, the trigger setting unit 403 sets the number of inputs to be additionally performed by the user 331 regarding the expression to be registered as a reserved expression (S618), and transmits input continuation notice to the input management unit 420 (S619).

The trigger setting unit 403 sets the number of inputs to be additionally performed by the user 331 (S618). At this time, for example, the red LED of the display unit 425 still lights up. In accordance with this display, the user 331 says the expression to be registered as a reserved expression at the number of times additionally set in step S618.

After the input continuation notice is received (S619), the input management unit 420 causes the internal state to transition to a state for waiting for a speech input from the user 331 (S600).

Figure 7A:
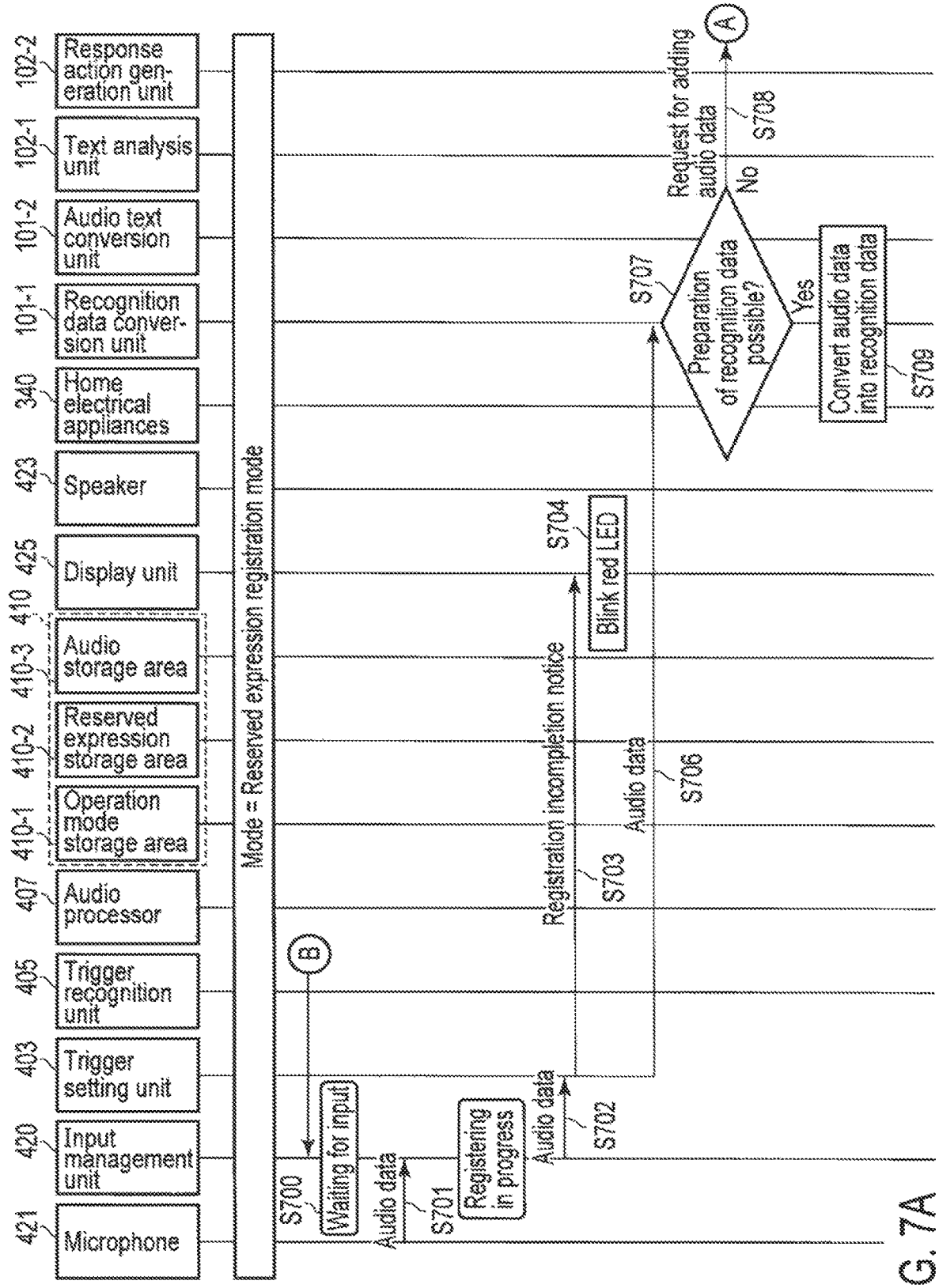
FIG. 7A shows an example of the sequence of steps for registering a reserved expression according to an embodiment.

In the process shown in FIG. 5A and FIG. 5B and the process shown in FIG. 6A and FIG. 6B, when the number of loads of utterances of the user 331 into the input management unit 402 has reached the specified number, the loaded audio data is transmitted to the recognition data conversion unit 101-1 of the cloud server 1 as a whole. However, every time the input management unit 420 loads the utterance of the user 331, the loaded audio data may be transmitted to the recognition data conversion unit 101-1. FIG. 7A and FIG. 7B show an example of the sequence in which, every time the input management unit 420 loads the utterance of the user 331, the loaded audio data is transmitted to the recognition data conversion unit 101-1 of the cloud server 1 and converted into recognition data.

Steps S700 to S702 shown in FIG. 7A are the same as steps S500 to S502 shown in FIG. 5A, respectively. Steps S703 and 704 shown in FIG. 7A are the same as steps S505 and 507 shown in FIG. 5A, respectively.

When the user 331 says the expression to be registered as a reserved expression, the host device 332 loads the audio data input from the microphone 421 into the input management unit 420 (S701). Since the host device 332 is in a reserved expression registration mode, the input management unit 420 transmits the received audio data to the trigger setting unit 403 (S702). Every time the trigger setting unit 403 receives audio data, the trigger setting unit 403 transmits the received audio data to the recognition data conversion unit 101-1 of the cloud server 1 (S706). When the recognition data conversion unit 101-1 converts the audio data transmitted from the trigger setting unit 403 into recognition data, the recognition data conversion unit 101-1 determines whether the received audio data can be converted into recognition data (S707).

When the recognition data conversion unit 101-1 determines that the received audio data cannot be converted into recognition data, the recognition data conversion unit 101-1 transmits a request for adding audio data to the trigger setting unit 403 via the Internet 2 (S708). After the request for adding audio data is received (S708), the trigger setting unit 403 confirms whether the number of loads of utterances of the user 331 has reached the specified number (S714). When the trigger setting unit 403 determines that the number of loads of utterances of the user 331 has not reached the specified number as a result of confirmation, the trigger setting unit 403 continues to perform display to prompt the user 331 to say the expression to be registered, and transmits input continuation notice to the input management unit 420 (S715). In this way, the trigger setting unit 403 causes the input management unit 420 to transition to a state for waiting for a speech input from the microphone (S700). After the input continuation notice is received (S715), the input management unit 420 causes the internal state to transition to a state for waiting for a speech input from the user 331 (S700).

When the recognition data conversion unit 101-1 determines that the received audio data can be converted into recognition data (S707), the recognition data conversion unit 101-1 converts the audio data into recognition data (S709). After the conversion into recognition data (S709), the recognition data conversion unit 101-1 determines whether the audio data input from the microphone 421 is sufficiently accurate to be recognized as a reserved expression (S710), using all the recognition data including the recognition data already obtained.

When the recognition data conversion unit 101-1 determines that the audio data input from the microphone 421 is sufficiently accurate to be recognized as a reserved expression, using all the recognition data, the recognition data conversion unit 101-1 notifies the trigger setting unit 403 of the recognition data with additional information indicating that the recognition data is sufficient (with recognition data sufficiency notice) via the Internet 2 (S711) to stop the user 331 from saying the expression to be registered as a reserved expression. After the recognition data (recognition data sufficiency notice) is received, the trigger setting unit 403 recognizes that, as of this moment, the received recognition data is sufficient to recognize the audio data input from the microphone 421 as a reserved expression. Even when the number of times of loads of utterances of the user 331 has not reached the specified number, the trigger setting unit 403 stops prompting the user 331 to input the expression to be registered (S712). The trigger setting unit 403 stores all the received recognition data as of this moment in the reserved expression storage area 410-2 (S716), and transmits registration completion notice to the input management unit 420, the display unit 425 and the recognition data conversion unit 101-1 (S717, S718 and S719). This structure is allowed to stop the user 331 from saying the expression to be registered as a reserved expression even when the number of loads of utterances of the user 331 has not reached the specified number in accordance with the accuracy of the obtained recognition data. In this way, the process for registering a reserved expression can be more flexible. The specified number may be changed by the user 331 as a setting value of the host device 332, and may be changed as additional information described later.

When the recognition data conversion unit 101-1 determines that, as of this moment, the accuracy of the obtained recognition data is insufficient to recognize the audio data input from the microphone 421 as a reserved expression, the recognition data conversion unit 101-1 transmits only the obtained recognition data to the trigger setting unit 403 (S713). After the recognition data is received, the trigger setting unit 403 confirms whether the number of loads of utterances of the user 331 has reached the specified number (S714). When the trigger setting unit 403 determines that the number of loads has not reached the specified number as a result of confirmation, the trigger setting unit 403 continues to perform display to prompt the user 331 to say the expression to be registered, and transmits input continuation notice to the input management unit 420 (S715). Thus, the trigger setting unit 403 causes the input management unit 420 to transition to a state for waiting for a speech input from the microphone (S700).

The display to prompt the user 331 to input the expression to be registered is preferably performed by a display method which allows the user 331 to recognize incompletion. For example, the trigger setting unit 403 may transmit registration incompletion notice to the display device 425 (S703). After the registration incompletion notice is received, the display device 425 may cause, for example, the red LED to blink (S704). Instead of the display method, a sound method may be used to prompt the user 331 to input the expression to be registered. In this case, the trigger setting unit 403 may transmit registration incompletion notice to the speaker 423. After the registration incompletion notice is received, the speaker 423 may make an announcement, such as "please input again", to the user 331. Alternatively, the trigger setting unit 403 may use both a display method and a sound method to prompt the user 331 to input the expression to be registered. Alternatively, when the host device 332 is movable, the trigger setting unit 403 may instruct the movable unit (not described) to, for example, repeatedly rotate the host device 332 with a certain angular width.

After the recognition data is received, the trigger setting unit 403 confirms whether the number of loads has reached the specified number (S714). When the trigger setting unit 403 determines that the number of loads has reached the specified number as a result of confirmation, the trigger setting unit 403 transmits registration completion notice to the input management unit 420, the display unit 425 and the recognition data conversion unit 101-1 (S717, S718 and S719). After the registration completion notice is received (S718), the recognition data conversion unit 101-1 clears the recognition data temporarily stored for performing step S710.

Now, this specification explains the second process of the host device 332 in which a reserved expression is recognized.

When the host device 332 recognizes a reserved expression from the utterance of the user 331, the host device 332 is configured to analyze the subsequent utterance of the user 331 and control a device or sensor based on the result of analysis. To recognize a reserved expression and control a device or sensor after recognizing the reserved expression, the host device 332 has a mode for recognizing a reserved expression and controlling a device or sensor (referred to as an operation mode).

Figure 8A:
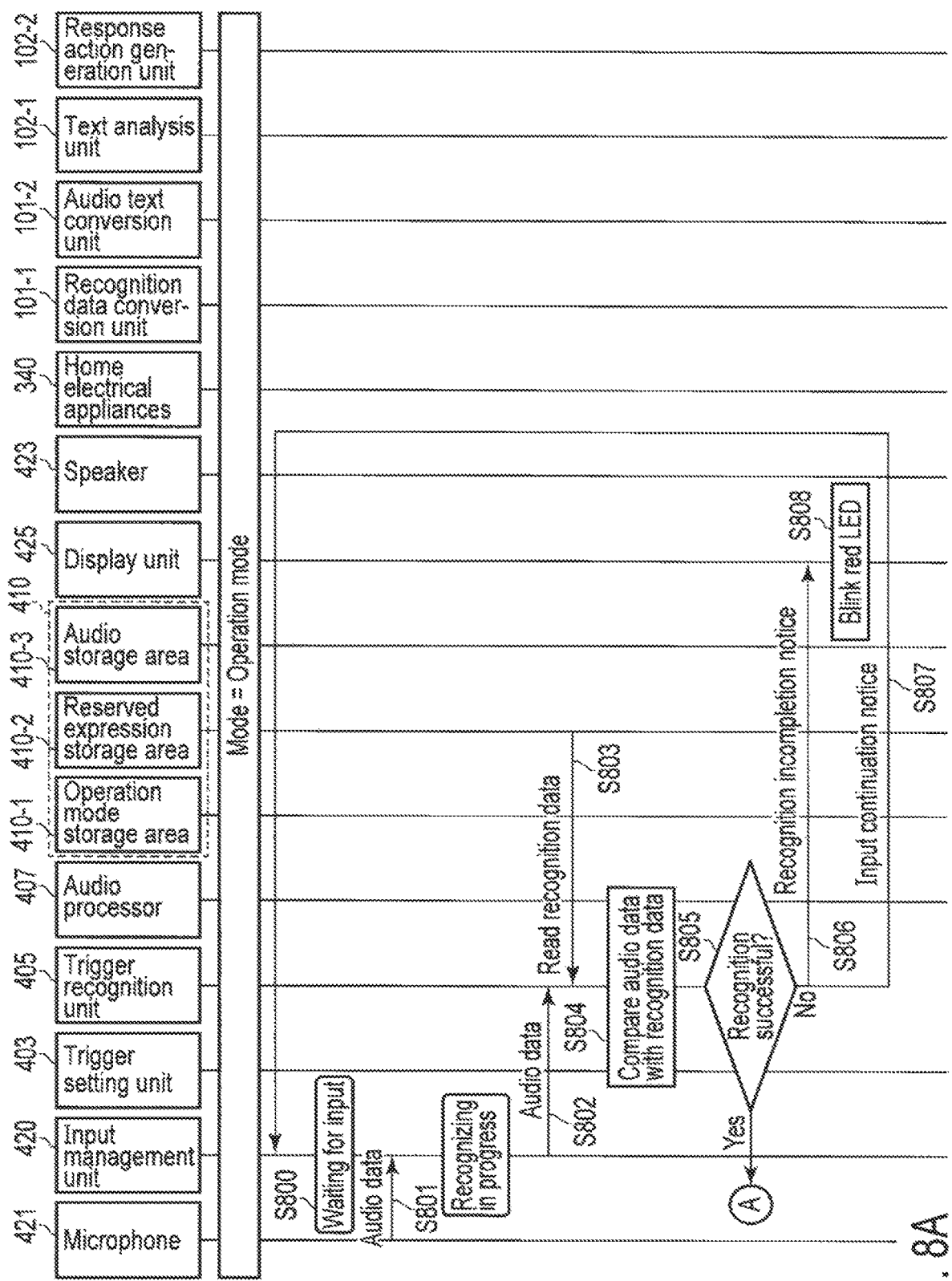
FIG. 8A shows an example of the sequence of steps for recognizing a reserved expression according to an embodiment.
Figure 8B:
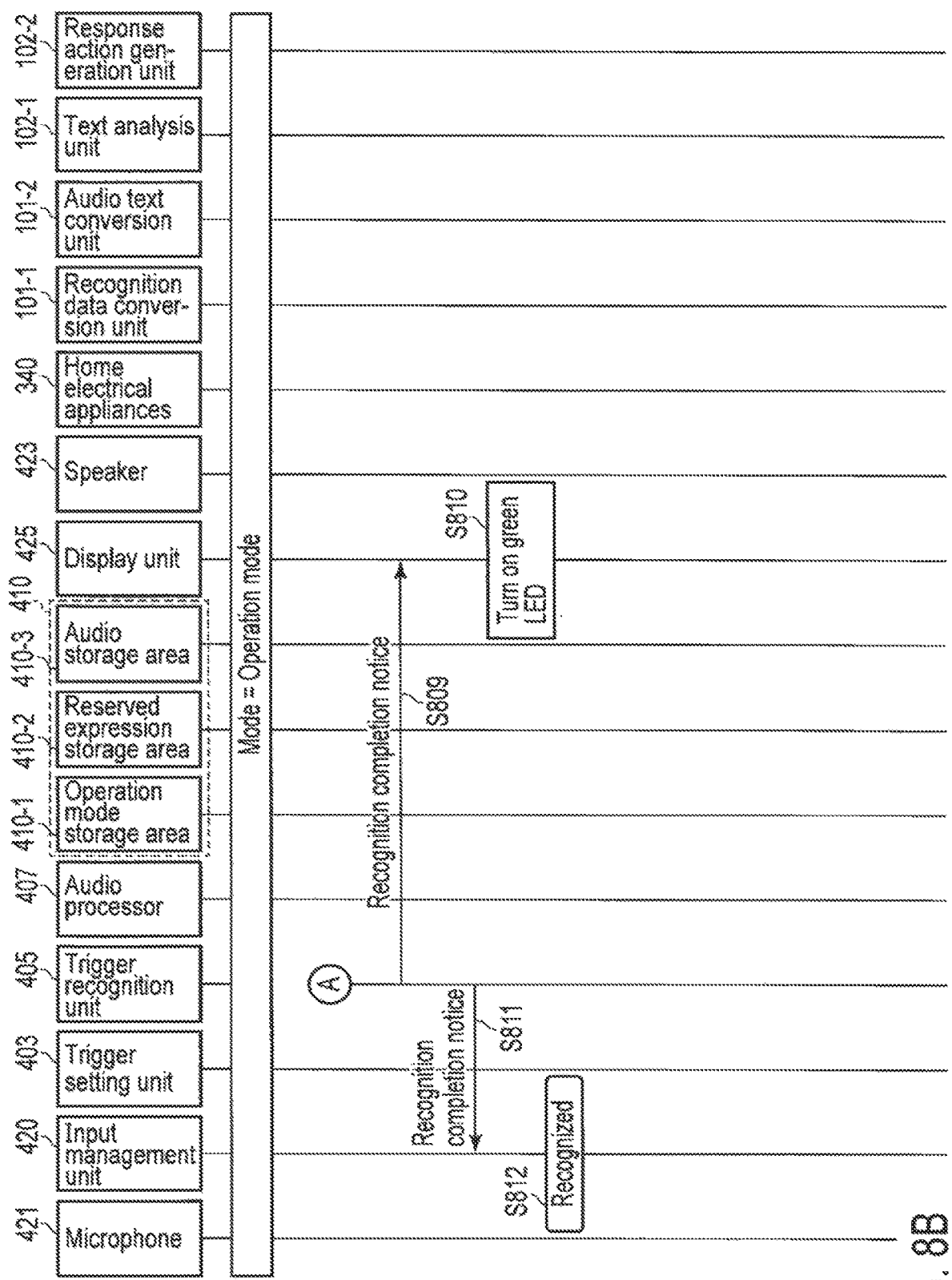
FIG. 8B shows an example of the sequence of steps for recognizing a reserved expression according to an embodiment.

FIG. 8A and FIG. 8B show an example of the sequence of steps which are performed by the host device 332 for recognizing that the utterance of the user 331 is one of the registered reserved expressions in the operation mode.

When the user 331 speaks, the host device 332 loads the audio data input from the microphone 421 into the input management unit 420 (S801). When the host device 332 is in the operation mode, the input management unit 420 transmits the received audio data to the trigger recognition unit 405 (S802). After the audio data transmitted from the input management unit 420 is received, the trigger recognition unit 405 compares the received audio data with the recognition data read from the reserved expression storage area 410-2 of the memory 410 (S803) to determine whether the audio data is a reserved expression (S804).

When the trigger recognition unit 405 determines that the input audio data cannot be recognized as a reserved expression (S805), the trigger recognition unit 405 performs display to prompt the user 331 to say a reserved expression (S808), and transmits input continuation notice to the input management unit 420 (S807). The display to prompt the user 331 to say a reserved expression is preferably performed by a display method which allows the user 331 to recognize incompletion. For example, the trigger recognition unit 405 may transmit recognition incompletion notice to the display unit 425 (S806). After the recognition incompletion notice is received, the display unit 425 may cause, for example, the red LED to blink (S808). Instead of the display method, the trigger recognition unit 405 may use a sound method to prompt the user 331 to input speech. In this case, the trigger recognition unit 405 may transmit recognition incompletion notice to the speaker 423. After the recognition incompletion notice is received, the speaker 423 may make an announcement, such as "I didn't hear you", to the user 331. Alternatively, the trigger recognition unit 405 may use both a display method and a sound method to prompt the user 331 to input speech. Alternatively, when the host device 332 is movable, the trigger recognition unit 405 may instruct the movable unit (not described) to, for example, repeatedly rotate the host device 332 with a certain angular width.

When the trigger recognition unit 405 recognizes that the input audio data is a reserved expression (S805), the trigger recognition unit 405 performs display indicating that the utterance of the user 331 is recognized as a reserved expression (S810). The display indicating that the utterance of the user 331 is recognized as a reserved expression is preferably performed by a display method which allows the user 331 to recognize the completion. For example, the trigger recognition unit 405 may transmit recognition completion notice to the display device 425 (S809). After the recognition completion notice is received, the display device 425 may turn on, for example, the green LED (S810). Instead of the display method, the trigger recognition unit 405 may use a sound method to notify the user 331 that the utterance of the user 331 is recognized as a reserved expression. In this case, the trigger recognition unit 405 may transmit recognition completion notice to the speaker 423. After the recognition completion notice is received, the speaker 423 may make an announcement, such as "yes, yes" or "a reserved expression was heard", to the user 331. Alternatively, the trigger recognition unit 405 may use both a display method and a sound method to notify the user 331 that the utterance of the user 331 is recognized as a reserved expression. Alternatively, when the host device 332 is movable, the trigger recognition unit 405 may instruct the movable unit (not described) to, for example, cause the host device 332 to repeatedly perform a rectilinear motion with a certain motion width.

Figure 9A:
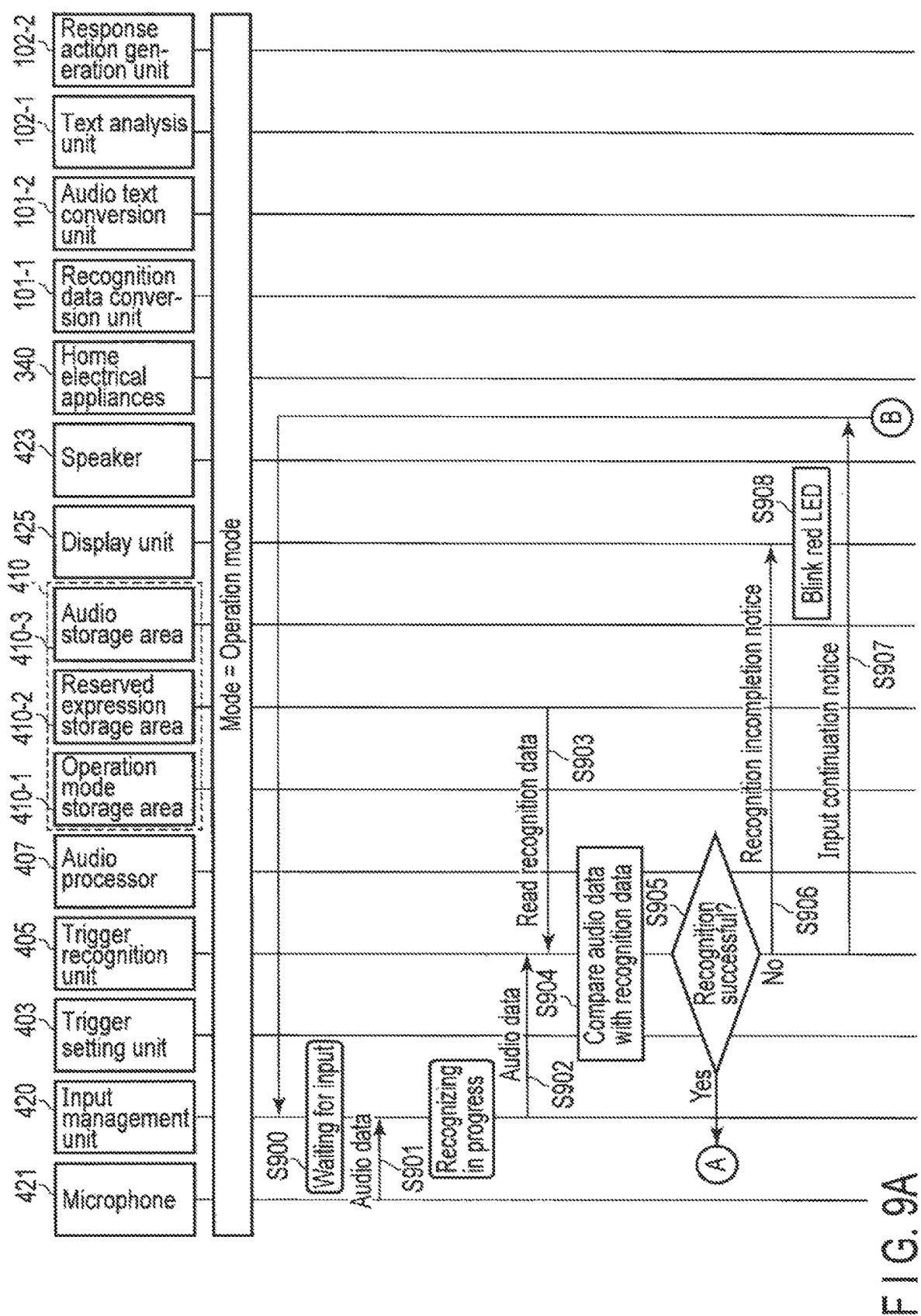
FIG. 9A shows an example of the sequence of steps for recognizing a reserved expression according to an embodiment.
Figure 9B:
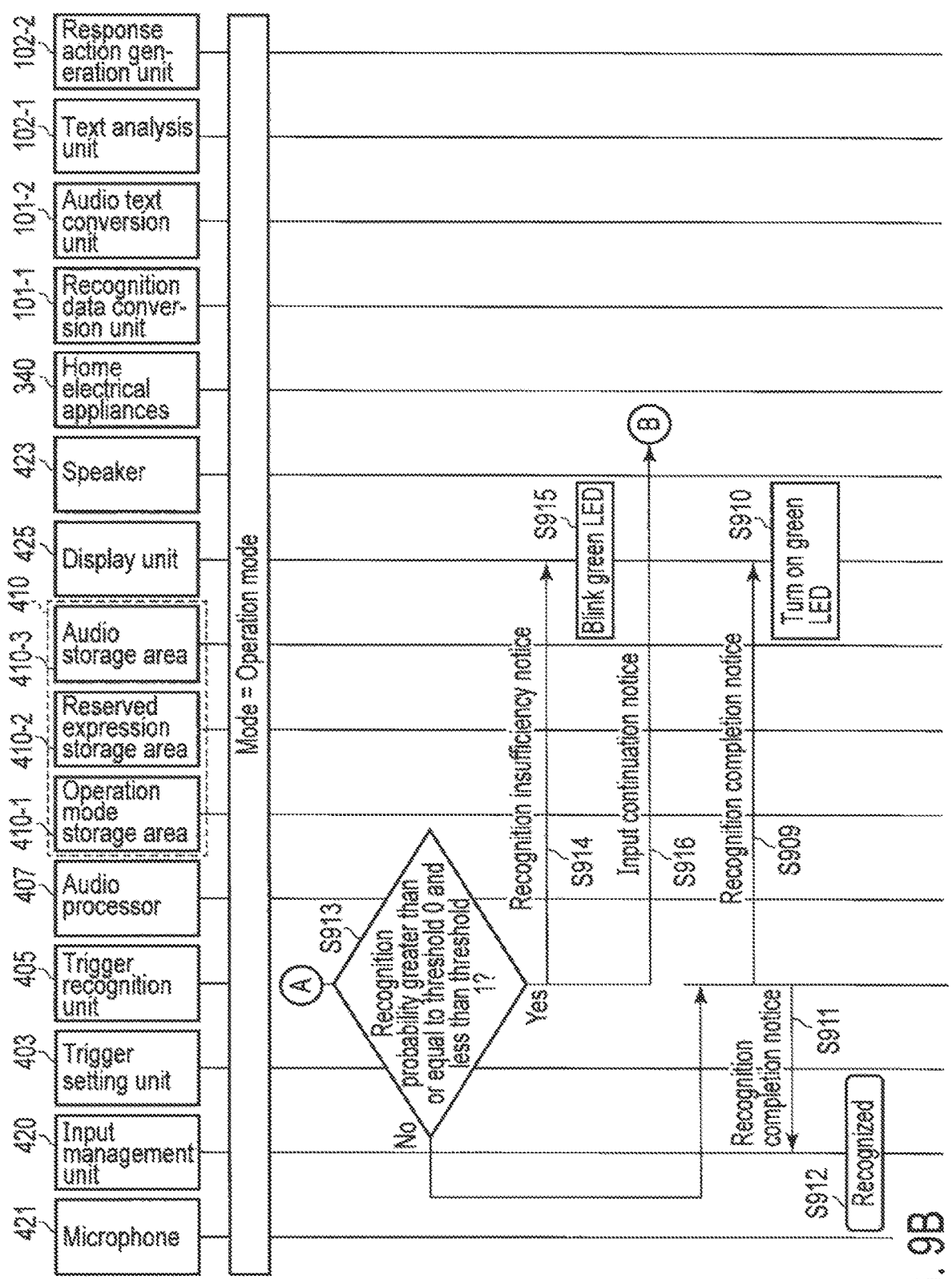
FIG. 9B shows an example of the sequence of steps for recognizing a reserved expression according to an embodiment.

FIG. 9A and FIG. 9B show another example of the sequence of steps which are performed by the host device 332 for recognizing that the utterance of the user 331 is one of the registered reserved expressions in the operation mode.

The sequence example of FIG. 9A and FIG. 9B is different from that of FIG. 8A and FIG. 8B in respect that the recognition probability is considered in a process for recognizing a reserved expression. The recognition probability indicates to what extent recognition data conforms to the audio data transmitted from the input management unit 420 as a result of comparison in terms of feature points such as the frequency component and strength. Steps S900 to S912 shown in FIG. 9A and FIG. 9B are the same as steps S800 to S812, respectively. The process of FIG. 9A and FIG. 9B is different from that of FIG. 8A and FIG. 8B in terms of addition of steps S913 to S916.

After the audio data transmitted from the input management unit 420 is received, the trigger recognition unit 405 reads recognition data from the reserved expression storage area 410-2 of the memory 410 (S903), and compares the recognition data with the audio data transmitted from the input management unit 420 (S904).

When the trigger recognition unit 405 determines that the input audio data is recognized as a reserved expression (S905), the trigger recognition unit 405 proceeds to a process for determining the recognition probability (S913).

In the speech recognition process, the trigger recognition unit 405 compares the recognition data read from the reserved expression storage area 410-2 of the memory 410 with the audio data transmitted from the input management unit 420 in terms of feature points such as the frequency component and strength. When they conform to each other beyond a certain level, the trigger recognition unit 405 determines that the audio data transmitted from the input management unit 420 is the recognition data.

When the host device 332 compares the recognition data with the audio data transmitted from the input management unit 420 in terms of feature points such as the frequency component and strength, the host device 332 may set a plurality of thresholds to determine the level of conformance. This structure allows the host device 332 to determine the level of conformance in the following manner at the time of recognizing a reserved expression from the utterance of the user. Instead of merely determining the level of conformance in two ways, specifically, "reserved expression recognized" or "no reserved expression recognized", the host device 332 is allowed to add a determination "close to complete recognition". In this manner, the host device 332 may add a determination that the utterance of the user is close to a correct reserved expression. Thus, a plurality of thresholds may be set for the recognition probability. In this case, when the user 331 does not accurately remember a reserved expression and repeatedly tries with expressions close to the reserved expression, the host device 332 loads the utterances of the user 331 and responds in accordance with the result of determination as "close to complete recognition". Based on these responses, the user 331 may get close to the correct reserved expression.

FIG. 9A and FIG. 9B show an example in which two thresholds are set for the recognition probability. The threshold with which a reserved expression can be recognized is defined as threshold 1, and the threshold with which no reserved expression can be recognized is defined as threshold 0. When the recognition probability is greater than or equal to threshold 1 as a result of comparison in step S904, recognition has been completed. When the recognition probability is greater than or equal to threshold 0, and less than threshold 1, the host device 332 is close to complete recognition. When the recognition probability is less than threshold 0, recognition has not been completed. Thus, in step S905, the recognition probability is compared with threshold 0. In step S913, the recognition probability is compared with threshold 1.

When the host device 332 determines that the recognition probability is greater than or equal to threshold 0 and less than threshold 1 (S913), the host device 332 performs display to prompt the user 331 to say a reserved expression (S915) and transmits input continuation notice to the input management unit 420 (S916). The display to prompt the user 331 to say a reserved expression is preferably performed by a display method which allows the user 331 to recognize insufficiency. For example, the trigger recognition unit 405 may transmit recognition insufficiency notice to the display unit 425 (S914). After the recognition insufficiency notice is received, the display unit 425 may cause, for example, the green LED to blink (S915).

The user 331 can recognize that his or her utterance is close to a reserved expression and is incorrect by differentiating the display to prompt the user 331 to say a reserved expression from the display performed when recognition has failed (S908) and the display performed when recognition has been successful (S910).

The trigger recognition unit 405 may use a sound method instead of the display method to prompt the user 331 to input speech. In this case, the trigger recognition unit 405 may transmit recognition insufficiency notice to the speaker 423 (S914). After the recognition insufficiency notice is received, the speaker 423 may make an announcement, such as "did you call me?", to the user 331. Alternatively, the trigger recognition unit 405 may use both a display method and a sound method to prompt the user 331 to input speech. Alternatively, when the host device 332 is movable, the trigger recognition unit 405 may instruct the movable unit (not described) to, for example, repeatedly rotate the host device 332 with a certain angular width.

Now, this specification explains the third process of the host device 332 in which the control content of the target device or sensor is registered, and the fourth process in which a device or sensor in which the control content has been registered is controlled.

An overview of control of a device or sensor using the host device 332 is explained.

When the host device 332 recognizes a reserved expression from the utterance of the user 331, the host device 332 is configured to continuously load the utterance of the user after the recognition of the reserved expression. The host device 332 is further configured to control a device or sensor by analyzing the loaded utterance.

Figure 10B:
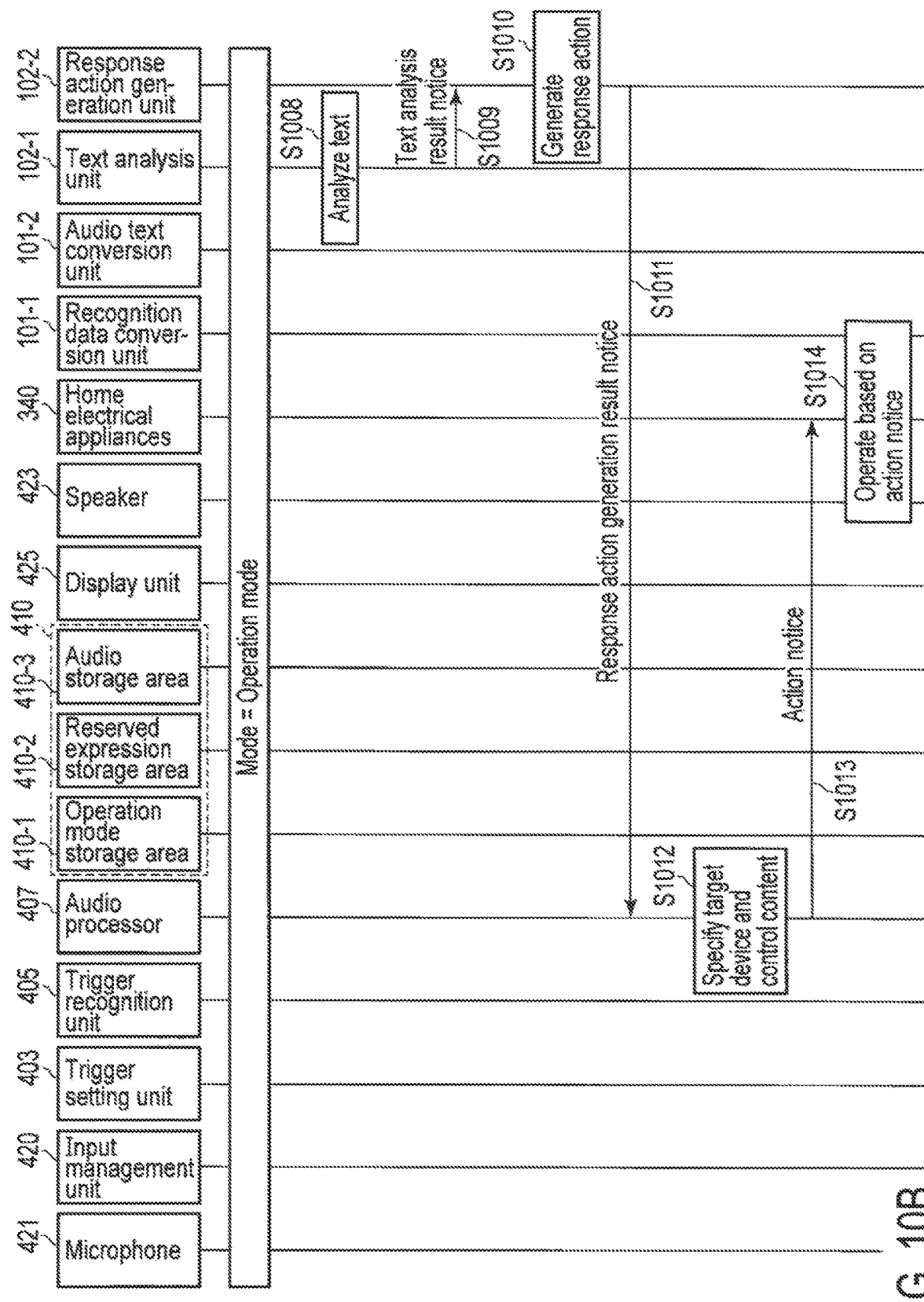
FIG. 10B shows an example of the sequence of steps for controlling a device or sensor based on the successive utterance of the user for controlling the device or sensor after the recognition of a reserved expression according to an embodiment.

FIG. 10A and FIG. 10B show an example of the sequence of steps which are performed by the host device for controlling a device or sensor based on the audio data including the control content of the device or sensor loaded from the microphone 421 after the completion of the recognition of a reserved expression. Since the reserved expression has been recognized, the internal state of the input management unit 420 is a state where recognition has been done (S1000).

When the user 331 issues an utterance including the control content of a device or sensor, the host device 332 loads the audio data (control content) into the input management unit 420 (S1002) through the microphone 421 (S1001). Since the internal state is a state where recognition has been done, the input management unit 420 transmits the input audio data (control content) to the audio processor 407 (S1002). The audio processor 407 transmits the received audio data (control content) to an audio text conversion unit 101-2 of the speech recognition cloud 101 of the cloud server 1 via the Internet 2.

The audio text conversion unit 101-2 converts the audio data transmitted via the Internet 2 into text data (S1004). Thus, the utterance of the user 331 loaded through the microphone 421 is converted into text data.

After the audio data is converted into text data, the audio text conversion unit 101-2 internally stores the text data and transmits conversion completion notice to the audio processor 407 (S1005).

After the audio processor 407 receives the conversion completion notice, the audio processor 407 transmits a request for analyzing text to the audio text conversion unit 101-2 (S1006). After the audio text conversion unit 101-2 receives the request for analyzing text, the audio text conversion unit 101-2 transmits the request for analyzing text to a text analysis unit 102-1 together with the text data internally stored (S1007). After the text analysis unit 102-1 receives the request for analyzing text (S1007), the text analysis unit 102-1 analyzes the attached text data (S1008). After the completion of analysis of the received text data, the text analysis unit 102-1 transmits the result of analysis to a response action generation unit 102-2 as text analysis result notice (S1009). After the response action generation unit 102-2 receives the result of text analysis (S1009), the response action generation unit 102-2 generates a command for controlling the target device based on the result of text analysis (S1010), and transmits the generated command to the audio processor 407 as response action generation result notice (S1011).

After the audio processor 407 receives the response action generation result notice (S1011), the audio processor 407 specifies the device or sensor to be controlled and the control content based on the response action generation result notice (S1012). The audio processor 407 converts the specified device or sensor to be controlled and the specified control content into a format recognizable by the device or sensor, and transmits them to the device or sensor as action notice via the network 333 when needed (S1013).

After the action notice is received (S1013), the device or sensor to be controlled as the destination of the action notice operates based on the control content included in the action notice (S1014).

When the user 331 continuously speaks, the host device 332 is capable of determining this continuous speech as a series of utterances and loading the continuous speech without requesting the user 331 to say a reserved expression in the middle. When the user 331 speaks after a certain time, the host device 332 requests the user 331 to input a reserved expression again. Each case is explained with reference to FIG. 11A and FIG. 11B, or FIG. 12A and FIG. 12B.

Figure 11A:
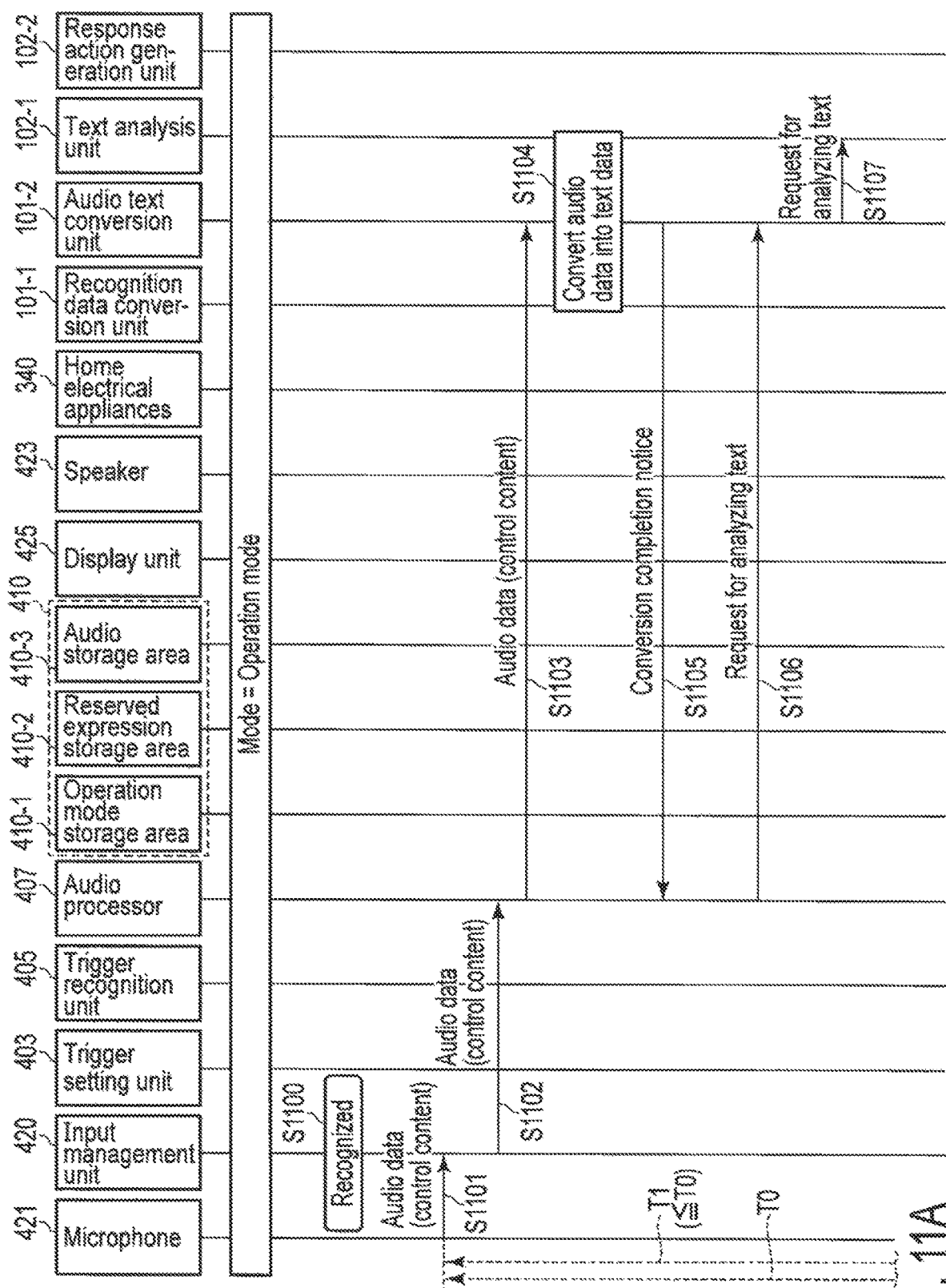
FIG. 11A shows an example of the sequence of steps which are performed when the user continuously issues an utterance for controlling a device or sensor within a certain time after the recognition of a reserved expression according to an embodiment.
Figure 11B:
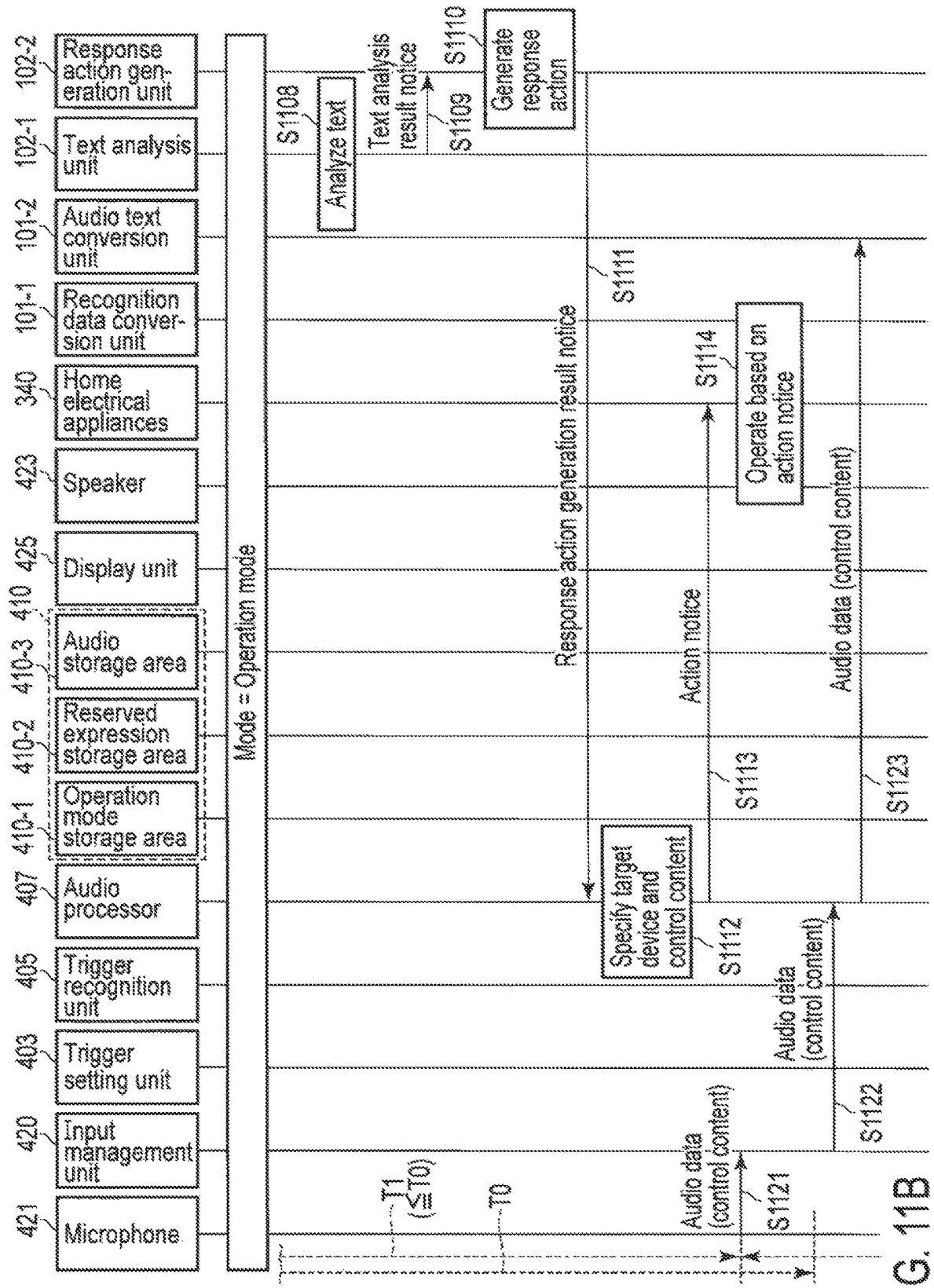
FIG. 11B shows an example of the sequence of steps which are performed when the user continuously issues an utterance for controlling a device or sensor within a certain time after the recognition of a reserved expression according to an embodiment.

FIG. 11A and FIG. 11B show an example of the sequence of steps which are performed when the user 331 continuously issues an utterance within time T0 after the completion of recognition of a reserved expression. When the host device 332 loads the audio data (control content) input from the microphone 421 into the input management unit 420 (S1101), the input management unit 420 activates an input interval confirmation timer T. When the host device 332 loads the next audio data (control content) of the user 331 into the input management unit 420 through the microphone 421 at time T1 before the expiry (=T0) of the input interval conformation timer T (S1121), the input management unit 420 transmits the loaded audio data (control content) to the audio processor 407 (S1122). At the same time, the input interval conformation timer T in activation is activated again. The audio processor 407 transmits the received audio data (control content) to the audio text conversion unit 101-2 of the speech recognition cloud 101 of the cloud server 1 via the Internet 2 (S1123). Subsequently, the process of the audio data transmitted to the speech recognition cloud 101 (S1123) is continued in the same manner as steps S1104 to S1110.

The input interval confirmation timer T is activated when the input management unit 420 loads the audio data input from the microphone 421. However, the activated time is not limited to this example. For example, the input interval confirmation timer T may be activated when the input management unit 420 transmits the data transmitted from the microphone 421 to the trigger setting unit 403 or the audio processor 407. The input interval conformation timer T may be activated when the internal state of the input management unit 420 transitions to a state where recognition has been done (S1100).

Figure 12A:
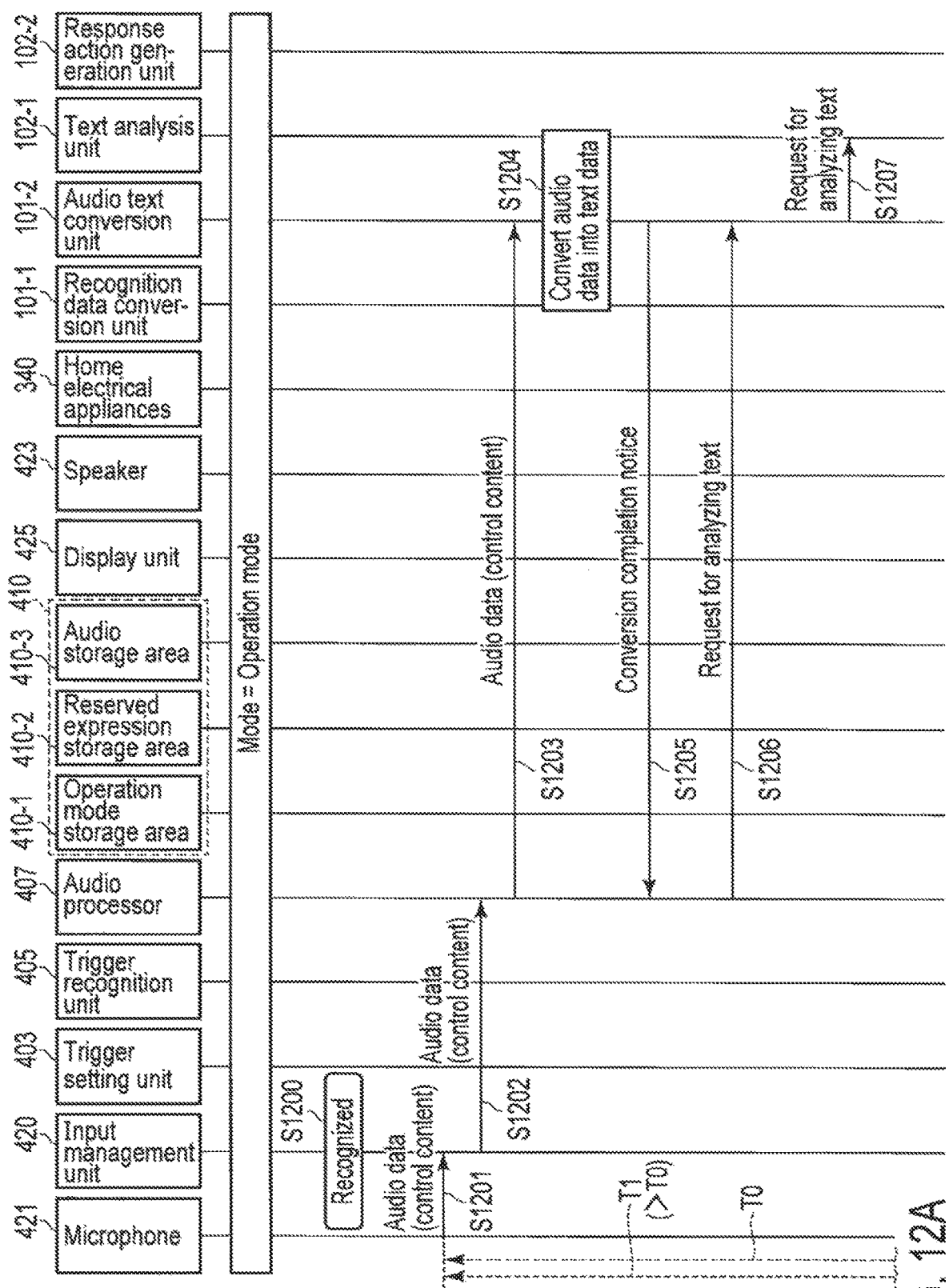
FIG. 12A shows an example of the sequence of steps which are performed when the user continuously issues an utterance for controlling a device or sensor beyond a certain time after the recognition of a reserved expression according to an embodiment.
Figure 12B:
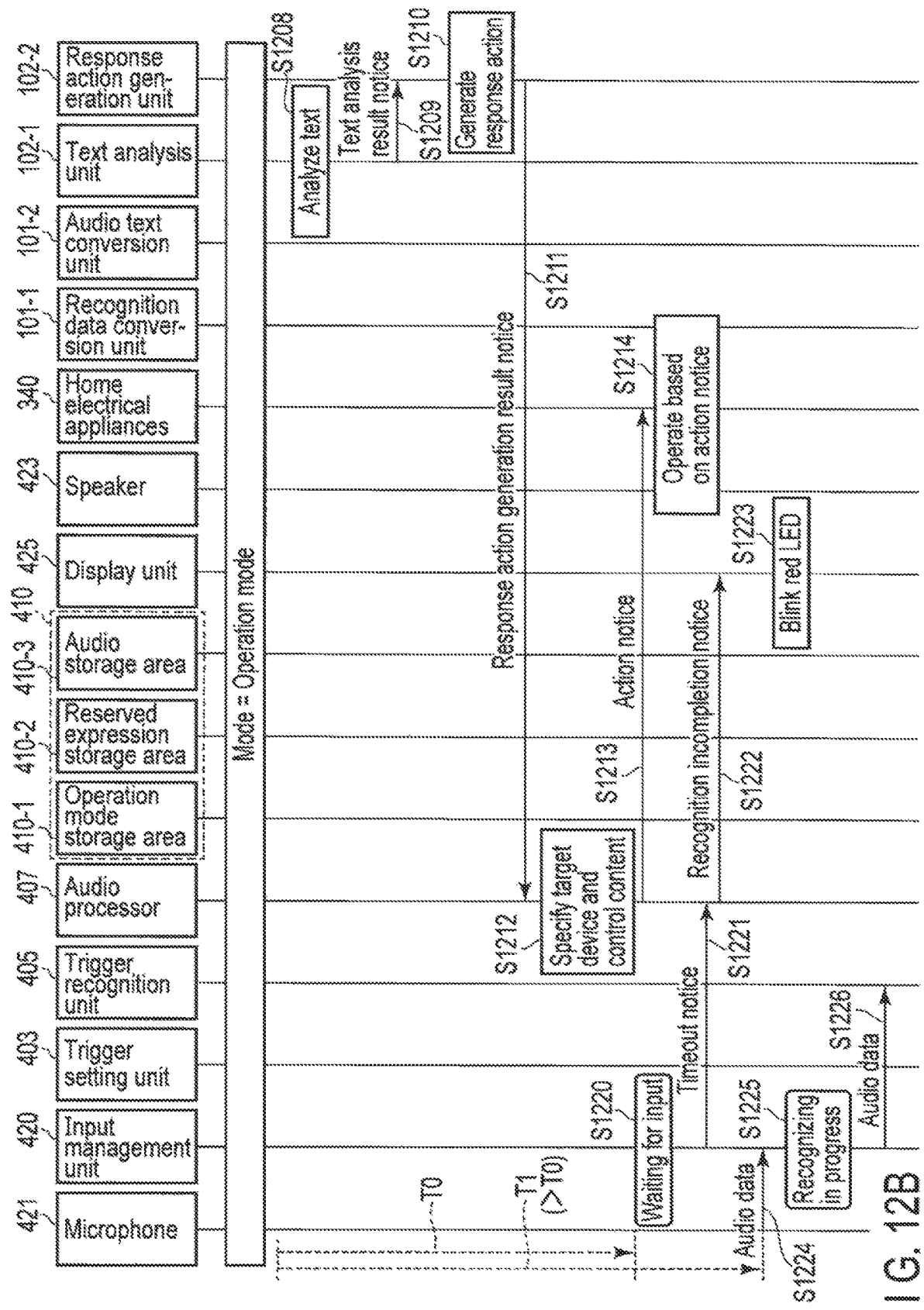
FIG. 12B shows an example of the sequence of steps which are performed when the user continuously issues an utterance for controlling a device or sensor beyond a certain time after the recognition of a reserved expression according to an embodiment.

FIG. 12A and FIG. 12B show an example in which the user 331 does not continuously issue an utterance within time T0. When the host device 332 loads the audio data (control content) input from the microphone 421 into the input management unit 420 (S1201), the input management unit 420 activates the input interval confirmation timer T. The input management unit 420 causes the internal state to transition to a state for waiting for a speech input after the expiry (=T0) of the input interval confirmation timer T (S1220).

When the host device 332 loads the next audio data input from the microphone 421 after the expiry (=T0) of the input interval confirmation timer T (S1224), the host device 332 does not control a device or sensor based on the loaded audio data, and performs display to prompt the user 331 to say a reserved expression.

When the input interval confirmation timer T has expired, the input management unit causes the internal state to transition to a state for waiting for a speech input (S1220), and transmits timeout notice to the audio processor 407

(S1221). After the timeout notice is received, the audio processor 407 transmits recognition incompletion notice to the display unit 425 (S1222). After the recognition incompletion notice is received, the display unit 425 performs display to prompt the user 331 to say a reserved expression. For example, the display unit 425 causes the red LED to blink (S1223).

When the host device 332 loads the next audio data input from the microphone 421 after the expiry of the input interval conformation timer T (S1224), the input management unit 420 causes the internal state to a state where recognition is in progress (S1225), and transmits the loaded audio data to the trigger recognition unit 405 (S1226). Subsequently, the host device 332 performs steps S803 to S812 shown in FIG. 8A and FIG. 8B or steps S903 to S916 shown in FIG. 9A and FIG. 9B, and recognizes a reserved expression again.

Now, this specification explains the registration of the control content for controlling a device or sensor using the host device 332, and the control of the device or sensor based on the registered control content.

FIG. 13 shows a specific example of control information used by the host device 332 to control the sensors 310, the equipment devices 320 and the home electrical appliances 340 as shown in the sequence diagrams of FIG. 10A and FIG. 10B after a reserved expression is recognized.

Item 1 shows specific examples of information for controlling the sensors 310, the equipment devices 320 and the home electrical appliances 340 in the response action generation result notice transmitted from the response action generation unit 102-2 (referred to as response action information). The response action generation information includes the target to be controlled by the host device 332, such as a device or sensor, and an instruction indicating the content for controlling the target. After the response action generation result notice is received, the host device 332 extracts action information from the notice, and controls the target device based on the action information.

Examples of instructions include an activation instruction for activating (operating) the device to be controlled, a stop instruction for terminating (stopping) the operation, an operation change instruction for changing the current operation (mode), and a setting change instruction for changing the setting (mode) registered in the target device in advance.

The user 331 needs to register in advance a combination of each device to be controlled, the control content, and words to control the device for the host device 332 as the default setting of the host device 332 in the response action generation unit 102-2 such that the response action generation unit 102-2 generates response action information to be included in response action generation result notice. This specification explains the registration of response action information in the default setting of the host device 332, using the example of FIG. 13.

Item 2 indicates the target which is the device to be controlled through the host device 332. The target is the identification title of each device or sensor included in the sensors 310, the equipment devices 320 and the home electrical appliances 340. An air conditioner 1 is described as a specific example.

Item 3 indicates an instruction which is the control content of the device shown in item 2. FIG. 13 shows instructions for the air conditioner 1 shown in item 2 as specific examples. The specific examples include an activation instruction for operating the air conditioner, a stop instruction for stopping the air conditioner, an operation change instruction for changing the operation of the air conditioner, and a setting change instruction for changing the setting of the air conditioner.

The product specification of each device or sensor in items 2 and 3 is stored in advance in a product specification cloud server in which the information of the product specification is stored (not described). The user 331 obtains the information of the product specification of the device or sensor to be controlled through the host device 332 in items 2 and 3 from the product specification cloud server.

Subsequently, the user 331 determines item 4 indicating the words to be said to the host device 332 when the control content of items 2 and 3 is performed through the host device 332. The words preferably correspond to the instructions for the air conditioner 1 in item 3. FIG. 13 shows, as examples, "turn the air conditioner on" for the activation instruction for operating the air conditioner, "turn the air conditioner off" for the stop instruction for stopping the air conditioner, "switch to dry mode" for the operation change instruction for changing the operation of the air conditioner from the cooling mode to the dry mode, and "turn the air conditioner on at ten at night" for the setting change instruction for changing the operation start time in the setting of the air conditioner to ten o'clock at night.

The user 331 prepares the combination determined in the above manner (specifically, the combination of the target, instructions and words) as the default setting of the host device 332. The user 331 applies a similar process to all of the devices to be controlled through the host 332, and ultimately prepares a response action information list in which the targets, instructions and words related to all of the devices to be controlled are integrated. The prepared response action information list is registered in the response action generation unit 102-2 through the host 332.

When the response action information list is registered in the response action generation unit 102-2, as shown in FIG. 10A and FIG. 10B, the host device 332 is capable of controlling each device and sensor by continuously loading and analyzing the utterance of the user 331 after the completion of recognition of a corresponding reserved expression.

When the user 331 says "turn the air conditioner on", the audio text conversion unit 101-2 converts the input audio data into text data. The text analysis unit 102-1 analyzes the text data such that the text data indicates "turn the air conditioner on". Based on the result of analysis, the response action generation unit 102-2 refers to the registered response action information list and searches for response action information corresponding to the result of analysis of the words "turn the air conditioner on". In this way, the response action generation unit 102-2 extracts response action information including the air conditioner 1 as the target and the operation start as the instruction, sets the response action information including the air conditioner 1 as the target and the operation start as the instruction in response action generation result notice, and transmits the notice to the audio processor 407.

The audio processor 407 refers to the response action information set in the received response action generation result notice, and controls the applicable device or sensor of the sensors 310, the equipment devices 320 and the home electrical appliances 340.

Now, this specification explains a case where the content for controlling a device or sensor or the operation of the host device 332 is changed based on various conditions when the device or sensor is controlled using the host device 332.

It is assumed that a plurality of reserved expressions are registered in the host device 332, and the host device 332 recognizes that the utterance of the user 331 is one of the reserved expressions. FIG. 14 shows a list of examples of operations performed in accordance with the recognized reserved expression.

The host device 332 is capable of registering a plurality of reserved expressions. The host device 332 is allowed to set an operation (referred to as additional information 1) to be performed in accordance with each of the reserved expressions when the reserved expression is recognized.

It is assumed that three reserved expressions of "iroha", "oresama-da" and "musuko-ya" are registered in the host device 332 as shown in FIG. 14. Iroha is a Japanese phrase corresponding to, for example, "abc" in the English language. Oresama-da is a Japanese phrase corresponding to, for example, "it's me" in the English language. Musuko-ya is a Japanese phrase corresponding to, for example, "my son" in the English language. When the host device 332 recognizes that the user 331 says the reserved expression "iroha", the host device 332 does not change the operation already set. When the host device 332 recognizes that the user 331 says the reserved expression "oresama-da", the host device 332 changes the operation such that the host device 332 always makes an announcement of "goshujin-sama, yorokonde", which is a Japanese phrase corresponding to, for example, "my master" in the English language, through the speaker 423 every time the host device 332 recognizes the utterance of the user 331. When the host device 332 recognizes that the user 331 says the reserved expression "musuko-ya", the host device 332 determines that the user 331 is an elderly user. Since elderly people tend to speak slowly, the host device 332 changes the setting such that the expiry time T0 of the input interval confirmation timer shown in FIG. 11A and FIG. 11B is longer than the normal setting time.

In the example shown in FIG. 14, the host device 332 changes the operation of the host device itself. However, the structure is not limited to this example. The operation of each device or sensor connected to the host device 332 via the network 333 may be controlled.

To change the operation of the host device 332 in accordance with a plurality of reserved expressions, the host device 332 needs to register additional information 1 corresponding to each of the reserved expressions in the host device 332 in advance.

When a reserved expression is registered in the host device 332, additional information 1 corresponding to the reserved expression can be registered together with the reserved expression. This mode of the host device 332 is referred to as a reserved expression registration (additional information 1) mode.

Figure 15A:
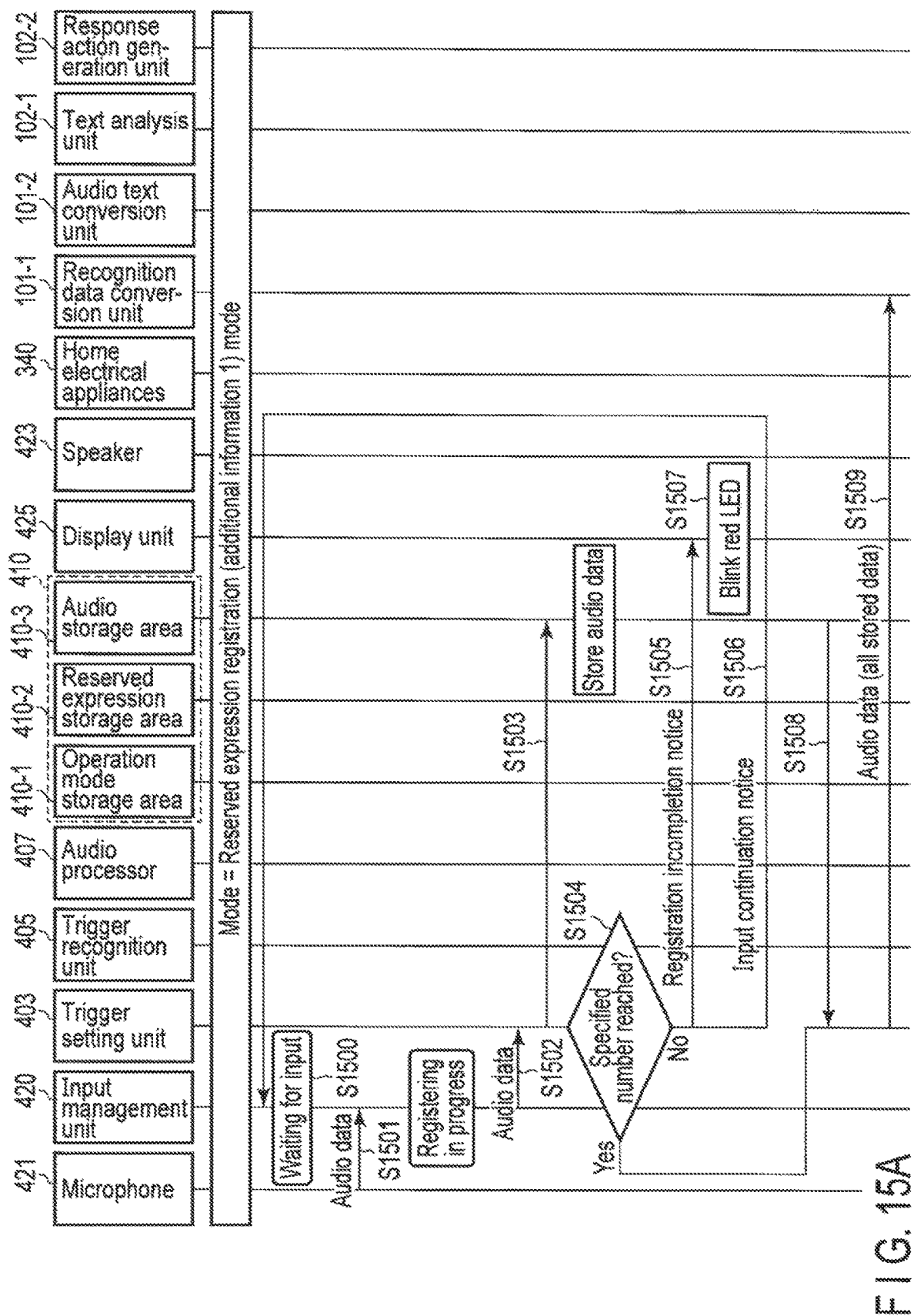
FIG. 15A shows an example of the sequence of steps for registering a plurality of reserved expressions and operations performed in accordance with the reserved expressions together according to an embodiment.
Figure 15B:
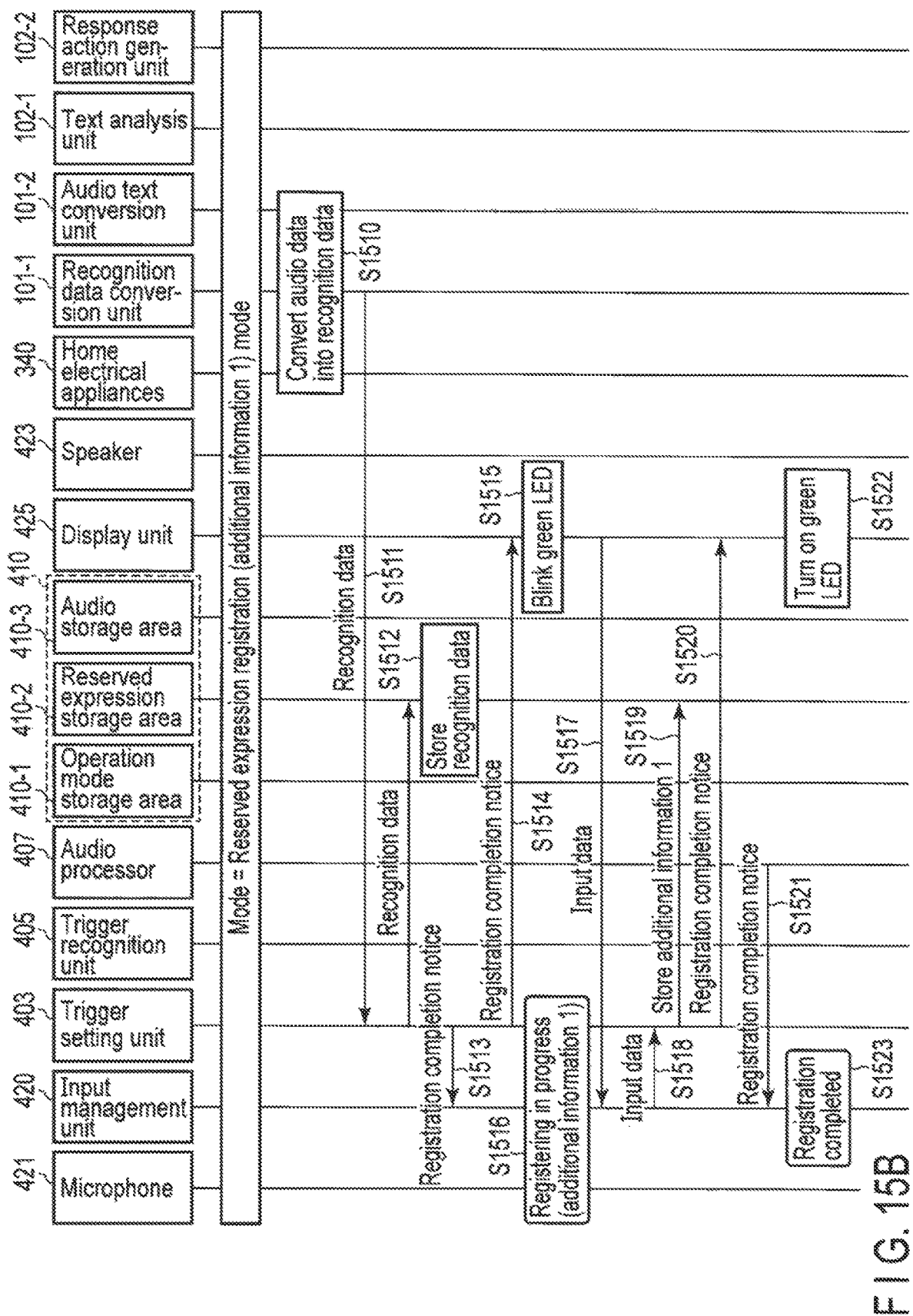
FIG. 15B shows an example of the sequence of steps for registering a plurality of reserved expressions and operations performed in accordance with the reserved expressions together according to an embodiment.

FIG. 15A and FIG. 15B show an example of the sequence of steps which are performed by the host device 332 from the start of registration of a reserved expression to the completion of registration of additional information 1 corresponding to the reserved expression in a state where the host device 332 is in a reserved expression registration (additional information 1) mode to register the reserved expression together with additional information 1. Steps S1500 to S1514 shown in FIG. 15A and FIG. 15B are the same as steps S500 to S514 shown in FIG. 5A and FIG. 5B, respectively. The process of FIG. 15A and FIG. 15B is different from that of FIG. 5A and FIG. 5B in respect that step S1515 is different from step S515, and steps S1516 to S1523 are added.

The trigger setting unit 403 performs display to notify the user 331 that the registration of a reserved expression is completed (S1514). The display to notify the user 331 that the registration of the reserved expression is completed (S1515) is preferably performed by a display method which allows the user 331 to recognize the completion. For example, the trigger setting unit 403 may transmit registration completion notice to the display device 425 (S1514). After the registration completion notice is received, the display device 425 may cause the green LED to blink. This structure allows the trigger setting unit 403 to prompt the user 331 to register additional information 1.

When the user 331 recognizes that the green LED blinks (S1515), the user 331 is allowed to set additional information 1 corresponding to the reserved expression registered in step S1511.

To set additional information 1, the host device 332 may load the utterance of the user 331 through the microphone 421 and analyze the loaded audio data. Alternatively, a menu for setting additional information 1 may be displayed on the display device 425. The user 331 may register additional information 1 in accordance with the menu. Alternatively, an external device connected via the network I/F 427 shown in FIG. 4, such as a smartphone or tablet, may be used such that a menu for setting additional information 1 corresponding to a reserved expression is displayed on the display screen of the smartphone or tablet. The user 331 may register additional information 1 in accordance with the menu screen.

FIG. 15A and FIG. 15B show an example of the sequence of steps in which a menu for setting additional information 1 is displayed on the display unit 425, and the user 331 registers additional information 1 in accordance with the menu.

When the green LED blinks to prompt the user 331 to input additional information 1 (S1515), a menu for registering additional information 1 is displayed on the display unit 425. The user 331 prepares additional information 1 by operating the displayed menu screen. The prepared additional information 1 is loaded into the input management unit 420 (S1517). The input management unit 420 transmits the loaded additional information 1 to the trigger setting unit 403. The trigger setting unit 403 stores the received additional information 1 in the reserved expression storage area 410-2 of the memory 410 (S1519).

The trigger setting unit 403 stores additional information 1 in the reserved expression storage area 410-2 of the memory 410 in association with the reserved expression registered in step S1513.

The audio processor 407 performs display to notify the user 331 that the registration of additional information 1 is completed (S1522). The display to notify the user 331 that the registration of additional information 1 is completed (S1522) is preferably performed by a display method which allows the user 331 to recognize the completion. For example, the audio processor 407 may transmit registration completion notice to the display device 425 (S1520). After the registration completion notice is received, the display device 425 may turn on, for example, the green LED.

Figure 16A:
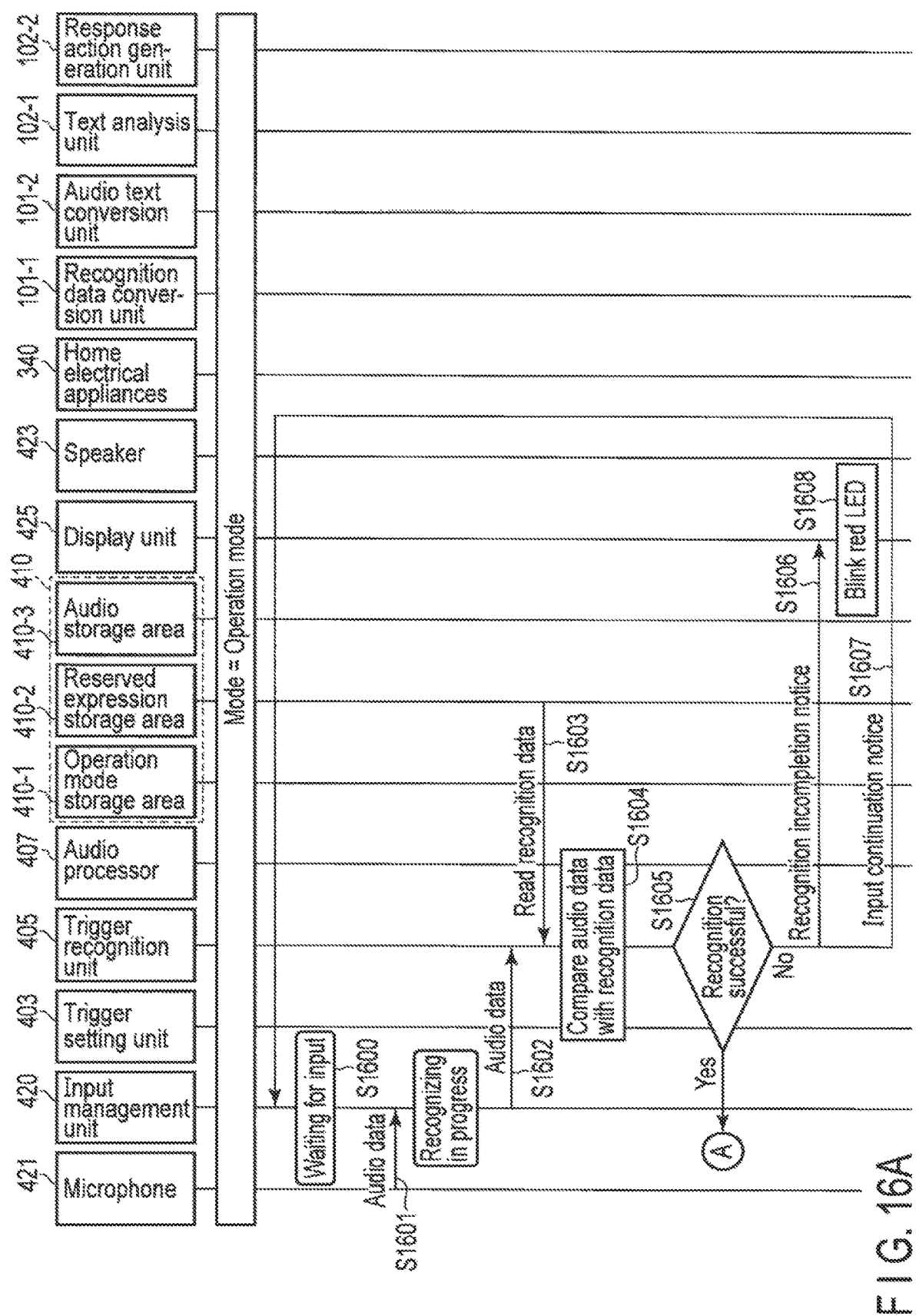
FIG. 16A shows an example of the sequence of steps for recognizing a reserved expression and setting an operation corresponding to the reserved expression according to an embodiment.
Figure 16B:
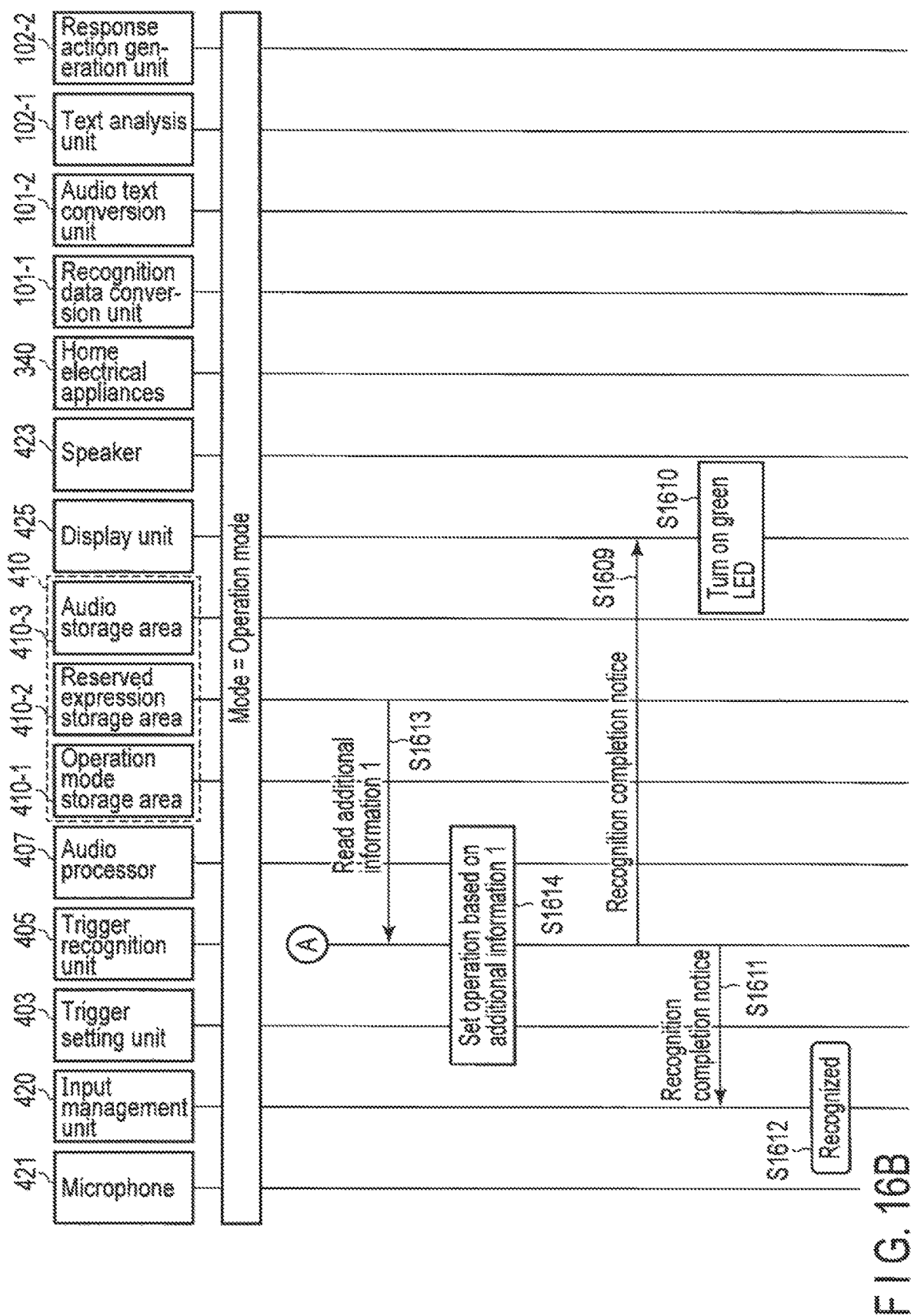
FIG. 16B shows an example of the sequence of steps for recognizing a reserved expression and setting an operation corresponding to the reserved expression according to an embodiment.

FIG. 16A and FIG. 16B show an example of the sequence of steps for recognizing a reserved expression from the utterance of the user 331, reading additional information 1 corresponding to the recognized reserved expression from the reserved expression storage area 410-2 and setting the operation in the host device 332 when additional information 1 is stored in the reserved expression storage area 410-2 of the memory 410 by the process shown in FIG. 15A and FIG. 15B.

Steps S1600 to S1612 shown in FIG. 16A and FIG. 16B are the same as steps S800 to S812 shown in FIG. 8A and FIG. 8B, respectively. The process of FIG. 16A and FIG. 16B is different from that of FIG. 8A and FIG. 8B in respect that steps S1613 and S1614 are added.

When the utterance of the user 331 is recognized as a reserved expression (S1605), the trigger recognition unit 405 reads additional information 1 corresponding to the applicable reserved expression from the reserved expression storage area 410-2 of the memory 410. After the trigger recognition unit 405 reads additional information 1, the trigger recognition unit 405 sets the operation of the read additional information 1 (S1613) in the host device 332 (S1614). When the operations of the examples of FIG. 14 are stored in the reserved expression storage area 410-2, and further when the reserved expression "musuko-ya" is recognized in step S1605, the trigger recognition unit 405 sets the expiry time T0 of the input interval confirmation timer T so as to be longer than the normal value in step S1614.

When the utterance of the user 331 is recognized as one of the reserved expressions registered in the host device 332, the host device 332 performs a specific operation in accordance with the utterance of the user 331 subsequent to the recognized reserved expression. FIG. 17(A) shows a list of examples of the specific operations.

When the host device 332 recognizes the utterance of the user 331 as a registered reserved expression, the host device 332 is capable of setting an operation (referred to as additional information 2) in accordance with the utterance of the user 331 (referred to as an additional word) subsequent to the recognized reserved expression.

It is assumed that the reserved expression "iroha" is registered as shown in FIG. 17(A). When the host device 332 recognizes the reserved expression "iroha", and further when no utterance is recognized from the user 331 subsequent to the reserved expression "iroha", the host device 332 does not change the operation already set. When the host device 332 recognizes "chan", which is a Japanese word corresponding to, for example, "sweetie" in the English language, as the utterance of the user 331 subsequent to the reserved expression "iroha", the host device 332 determines that the user 331 is in a good mood. The host device 332 changes the operation such that a high tone is used when the host device 332 responds through the speaker 423. When the host device 332 recognizes "ya", which is a Japanese word corresponding to, for example, "son" in the English language, as the utterance of the user 331 subsequent to the reserved expression "iroha", the host device 332 presumes that the user 331 is an elderly user. Since the user 331 tends to speak slowly, the host device 332 changes the expiry time T0 of the input interval confirmation timer shown in FIG. 11A and FIG. 11B so as to be longer than the normal setting time. When the host device 332 recognizes "oi", which is a Japanese word corresponding to, for example, "hey" in the English language, as the utterance of the user 331 subsequent to the reserved expression "iroha", the host device 332 determines that the user 331 is angry. The host device 332 immediately makes an announcement of "moushiwakegozaimasen", which is a Japanese phrase corresponding to, for example, "I'm sorry" in the English language, through the speaker 423.

In the example of FIG. 17(A), a plurality of additional words are set for a single reserved expression. Additional information 2 is set for the combination of each additional word and the reserved expression. In this way, the host device 332 changes the operation based on additional information 2. Additional information 2 may be set for each of combinations of additional words and reserved expressions. It is assumed that three reserved expressions "iroha", "ookini" and "shindo" are registered in the host device 332 as shown in FIG. 17(B). Ookini means "thank you" in the Kansai dialect used in the Kansai region of Japan. Shindo is a Japanese phrase corresponding to, for example, "I'm tired" in the English language. In this case, additional words may be defined for each reserved expression. Additional information 2 may be set for each of combinations of additional words and reserved expressions.

In some cases, the user may want the host device 332 to perform a specific operation by merely saying a reserved expression. When the user has a favorite phrase, the favorite phrase may be registered in the host device 332 as a reserved expression. An operation corresponding to the reserved expression may be registered in the host device 332. In this way, it is possible to easily control the operation of each device or sensor in accordance with the characteristics of the user. In the example of the reserved expression "shindo" in FIG. 17(B), the host device 332 is capable of announcing the information of beer stored in the refrigerator connected to the network 333 through the speaker 423 by merely recognizing the reserved expression "shindo" from the utterance of the user 331.

The host device 332 needs to register a combination of an additional word corresponding to a reserved expression and additional information 2 indicating the operation for the combination of the reserved expression and the additional word in the host device 332 to change the operation in accordance with the additional word for the reserved expression. Thus, the host device 332 has a mode for additionally registering an additional word or additional information corresponding to a registered reserved expression. A mode for adding additional information 1 to a reserved expression registered in the host device 332 is called an additional information 1 addition registration mode. A mode for adding an additional word and additional information 2 to a reserved expression registered in the host device 332 is called an additional information 2 addition registration mode.

To set additional information 2, the host device 332 may load the utterance of the user 331 through the microphone 421 and analyze the loaded audio data in a manner similar to that of the method for setting additional information 1. Alternatively, a menu for setting additional information 2 may be displayed on the display device 425. The user 331 may register additional information 2 in accordance with the menu. Alternatively, an external device connected via the network I/F 427 shown in FIG. 4, such as a smartphone or tablet, may be used such that a menu for setting additional information 2 corresponding to a reserved expression and an additional word is displayed on the display screen of the smartphone or tablet. The user 331 may register additional information 2 in accordance with the menu screen.

Figure 18A:
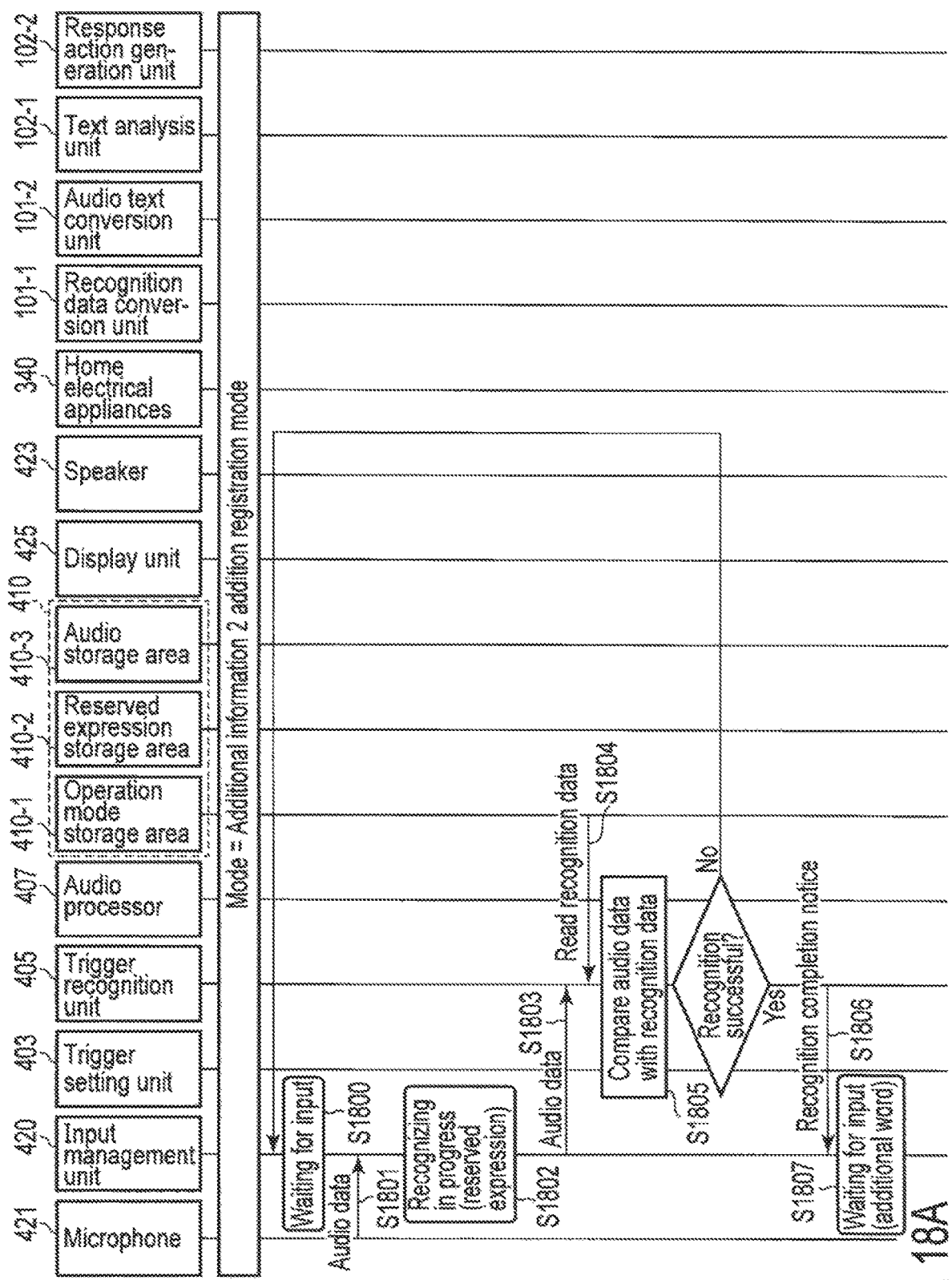
FIG. 18A shows an example of the sequence of steps for setting an operation corresponding to an utterance subsequent to a registered reserved expression in the recognition of the reserved expression according to an embodiment.
Figure 18B:
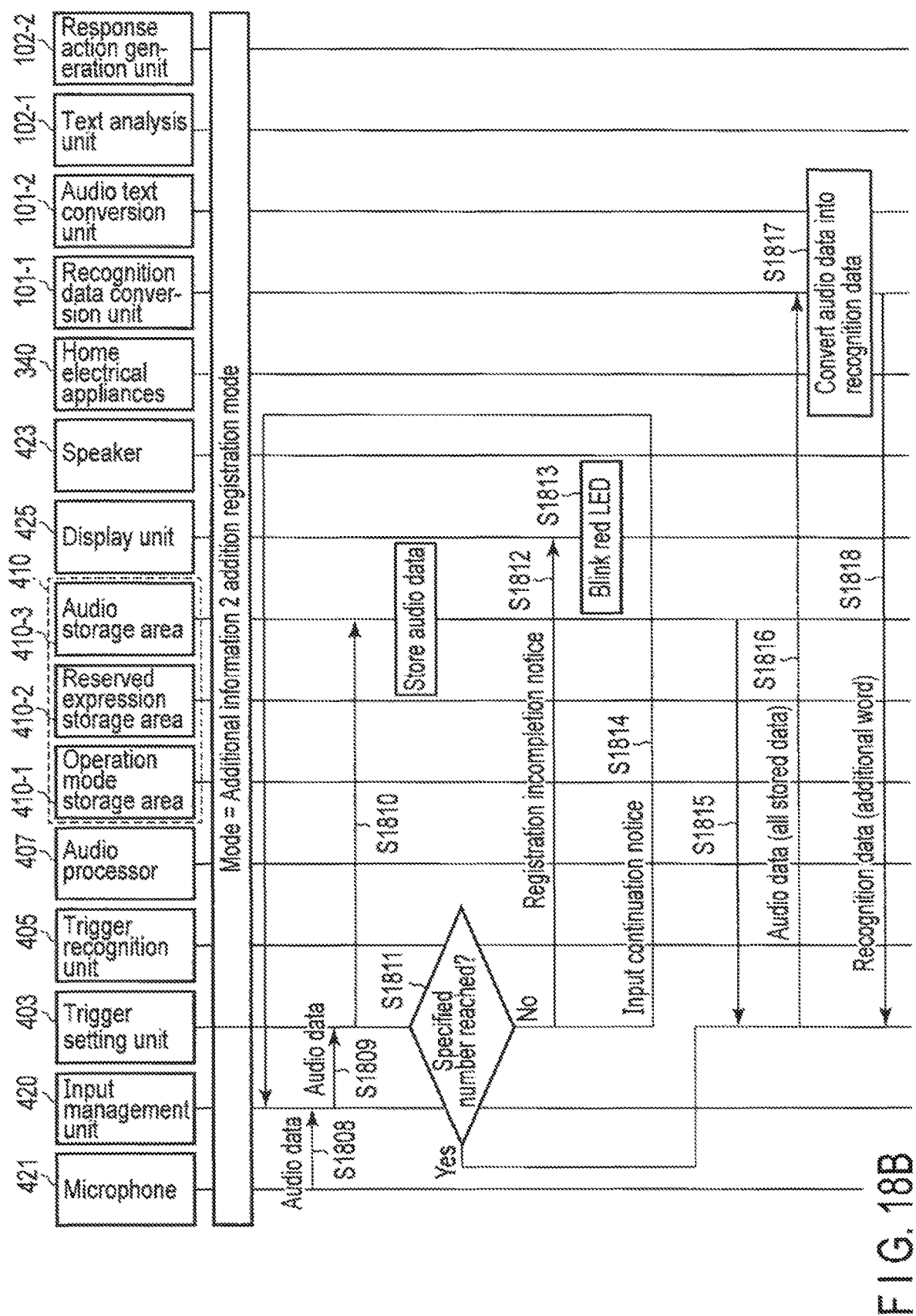
FIG. 18B shows an example of the sequence of steps for setting an operation corresponding to an utterance subsequent to a registered reserved expression in the recognition of the reserved expression according to an embodiment.
Figure 18C:
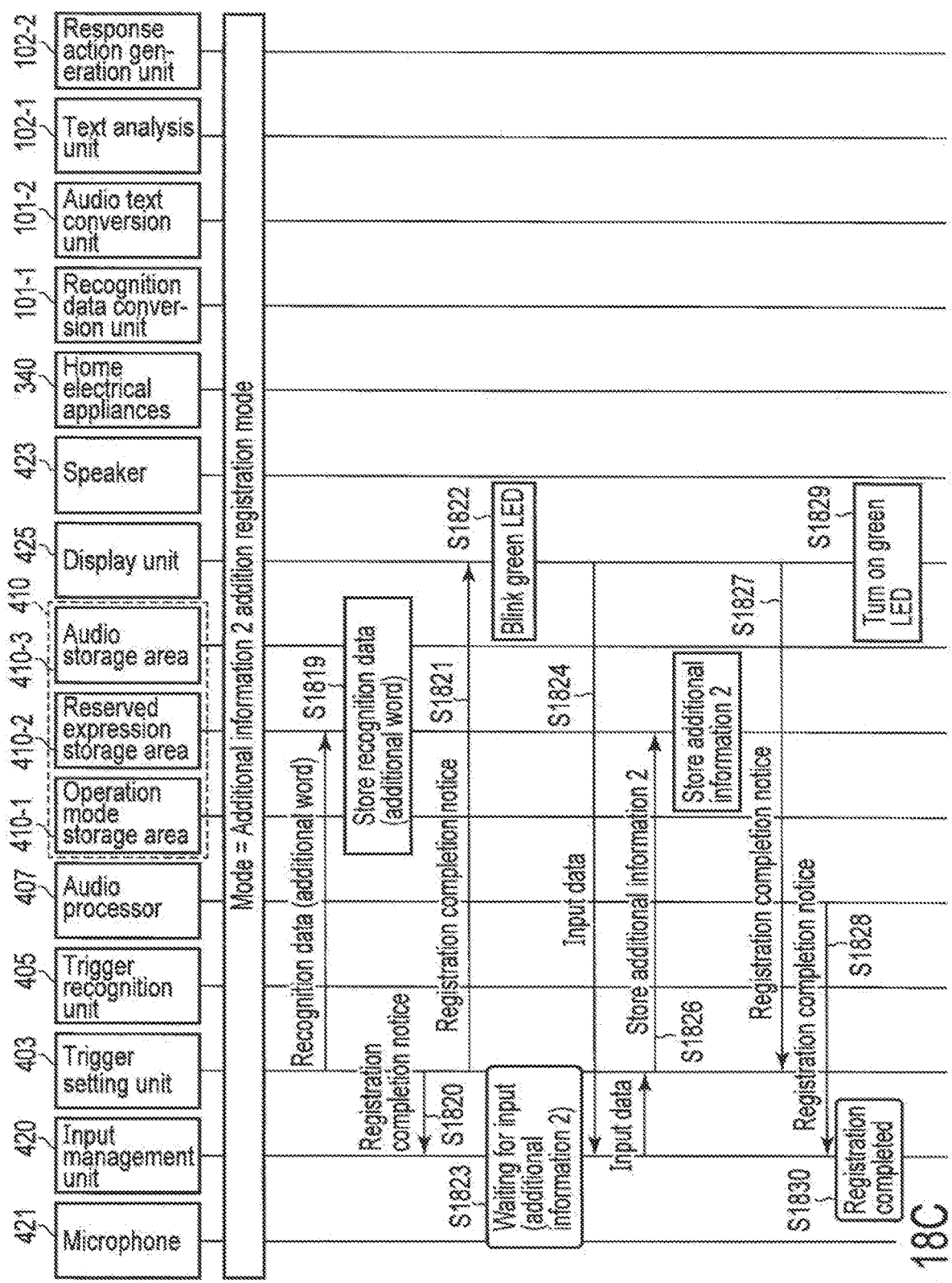
FIG. 18C shows an example of the sequence of steps for setting an operation corresponding to an utterance subsequent to a registered reserved expression in the recognition of the reserved expression according to an embodiment.

FIG. 18A, FIG. 18B and FIG. 18C show an example of the sequence of steps for registering an additional word and an operation (additional information 2) corresponding to the additional word for the registered reserved expressions shown in FIG. 17(A) and FIG. 17(B).

To additionally register an additional word for a registered reserved expression, the user 331 changes the host device 332 to an additional information 2 addition registration mode. When the host device 332 is changed to an additional information 2 addition registration mode, the user 331 says the registered reserved expression and the additional word to be registered for the reserved expression to the host device 332. The host device 332 firstly recognizes the reserved expression from the utterance of the user 331 (S1805).

The host device 332 loads the utterance of the user 331 into the input management unit 420 through the microphone 421 (S1801). After the input management unit 420 loads the audio data, the input management unit 420 causes the internal state internally managed to transition to a state where recognition is in progress (reserved expression) (S1802), and transmits the input audio data to the trigger recognition unit 405 (S1803).

After the trigger recognition unit 405 receives the audio data transmitted from the input management unit 420, the trigger recognition unit 405 reads recognition data from the reserved expression storage area 410-2 of the memory 410 (S1804), and compares the recognition data with the audio data transmitted from the input management unit 420 (S1805). When the trigger recognition unit 405 recognizes the input audio data as a reserved expression, the trigger recognition unit 405 transmits recognition completion notice to the input management unit 420 (S1806). After the recognition completion notice is received, the input management unit 420 causes the internal state internally managed to transition from a state where recognition is in progress (reserved expression) to a state for waiting for a speech input (additional word) (S1807).

The host device 332 loads the utterance of the user 331 subsequent to the reserved expression through the microphone 421 into the input management unit 420 (S1808). Since the internal state internally managed in the input management unit 420 is a state for waiting for a speech input (additional word) (S1807), the input management unit 420 transmits the input audio data to the trigger setting unit 403 (S1809). Subsequently, in a manner similar to that of the process for registering a reserved expression in FIG. 5A and FIG. 5B, the trigger setting unit 403 loads an additional word at the specified times (S1811) while storing the received audio data in the audio storage area 410-3 of the memory 410 (S1810).

When the trigger setting unit 403 determines that the specified number has not been reached as a result of confirmation, the trigger setting unit 403 performs display to prompt the user 331 to say the additional word to be registered (S1812), and transmits input continuation notice to the input management unit 420 (S1814). The display to prompt the user 331 to say the additional word to be registered (S1813) is preferably performed by a display method which allows the user 331 to recognize incompletion. For example, the trigger setting unit 403 may transmit registration incompletion notice to the display device 425 (S1812). After the registration incompletion notice is received, the display device 425 may cause the red LED to blink. Instead of the display method, a sound method may be used to prompt the user 331 to say the additional word to be registered. In this case, the trigger setting unit 403 may transmit registration incompletion notice to the speaker 423. After the registration incompletion notice is received, the speaker 423 may make an announcement, such as "please input again", to the user 331. Alternatively, the trigger setting unit 403 may use both a display method and a sound method to prompt the user 331 to say the additional word to be registered.

When the trigger setting unit 403 determines that the specified number has been reached as a result of confirmation, the trigger setting unit 403 reads all the audio data stored in the audio storage area 410-3 (S1815), and transmits the read audio data to the recognition data conversion unit 101-1 of the speech recognition cloud 101 of the cloud server 1 via the Internet 2 (S1816).

The recognition data conversion unit 101-1 converts the audio data transmitted from the trigger setting unit 403 into recognition data for recognizing the additional word (S1817). After the conversion into recognition data is completed, the recognition data conversion unit 101-1 transmits the recognition data to the trigger setting unit 403 via the Internet 2 (S1818). After the trigger setting unit 403 receives the recognition data for recognizing the additional word (referred to as recognition data [additional word]), the trigger setting unit 403 stores the received data in the reserved expression storage area 410-2 of the memory 410 (S1819). The trigger setting unit 403 stores the recognition data (additional word) in association with the reserved expression recognized in step S1806. In this way, the recognition data (additional word) may be stored in association with the reserved expression recognized in step S1806.

The trigger setting unit 403 performs display to notify the user 331 that the registration of the additional word is completed (S1822). The display to notify the user 331 that the registration of the additional word is completed (S1822) is preferably performed by a display method which allows the user 331 to recognize the completion. For example, the trigger setting unit 403 may transmit registration completion notice to the display device 425 (S1821). After the registration completion notice is received, the display device 425 may cause, for example, the green LED to blink (S1822). Instead of the display method, the trigger setting unit 403 may use a sound method to notify the user 331 that the registration of the additional word is completed. In this case, the trigger setting unit 403 may transmit registration completion notice to the speaker 423 (S1821). After the registration completion notice is received, the speaker 423 may make an announcement, such as "the registration has been completed", to the user 331. Alternatively, the trigger setting unit 403 may use both a display method and a sound method to notify the user 331 that the registration of the additional word is completed. In this way, the user 331 can know when the content of additional information 2 indicating an operation corresponding to the additional word should be spoken.

When the green LED blinks to prompt the user 331 to input additional information 2 (S1822), a menu for registering additional information 2 is displayed on the display unit 425. The user 331 prepares additional information 2 in accordance with the displayed menu screen. The prepared additional information 2 is loaded into the input management unit 420 (S1824). The input management unit 420 transmits the loaded additional information 2 to the trigger setting unit 403 (S1825). The trigger setting unit 403 stores the received additional information 2 in the reserved expression storage area 410-2 of the memory 410 (S1826).

The trigger setting unit 403 stores additional information 2 in the reserved expression storage area 410-2 of the memory 410 in association with the reserved expression recognized in step S1806. In this way, it is possible to store the operation (additional information 2) associated with the reserved expression recognized in step S1806 as well as the additional word stored in step S1819.

Only additional information may be added later for a registered reserved expression.

Figure 18D:
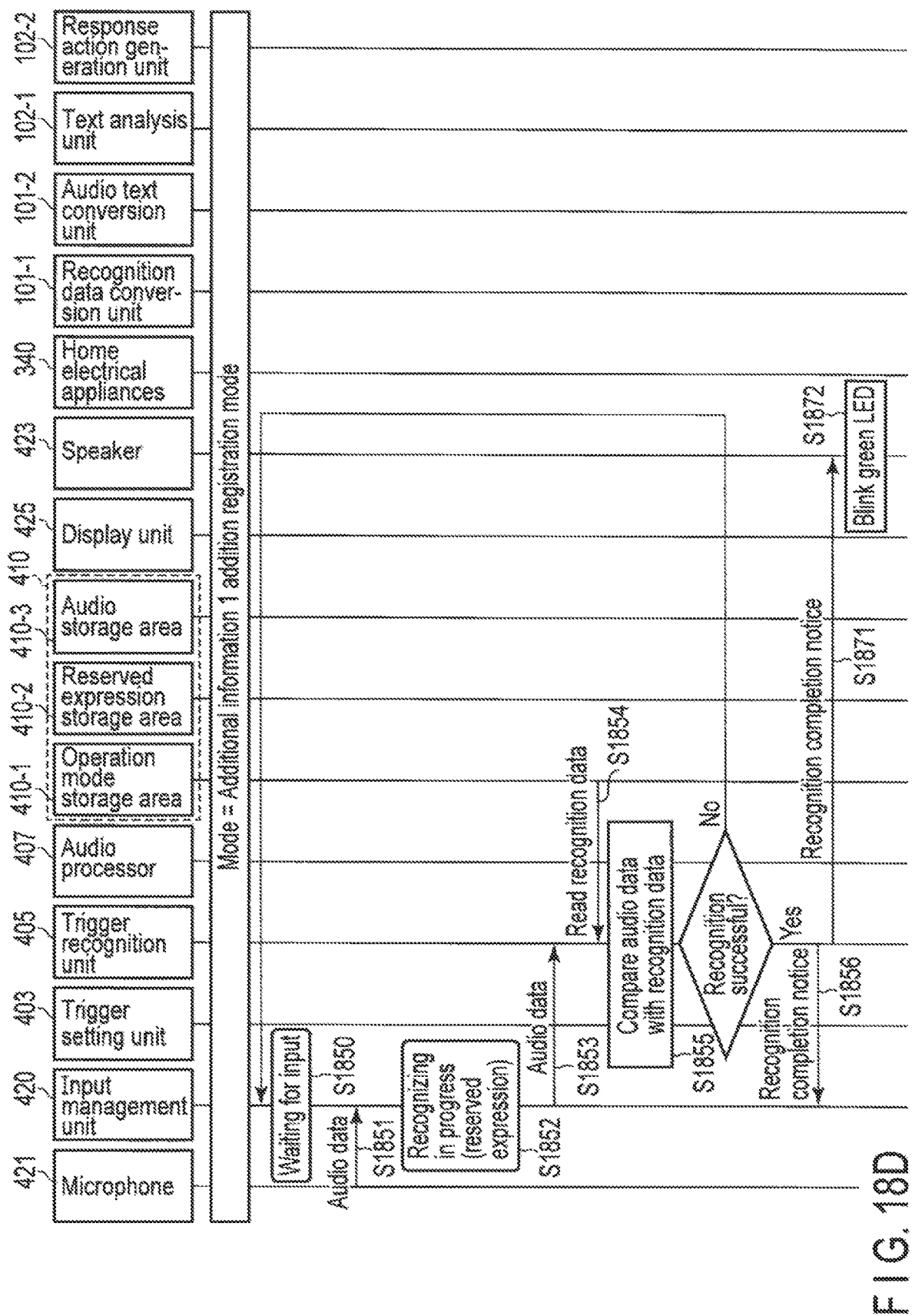
FIG. 18D shows another example of the sequence of steps for setting an operation corresponding to an utterance subsequent to a registered reserved expression in the recognition of the reserved expression according to an embodiment.
Figure 18E:
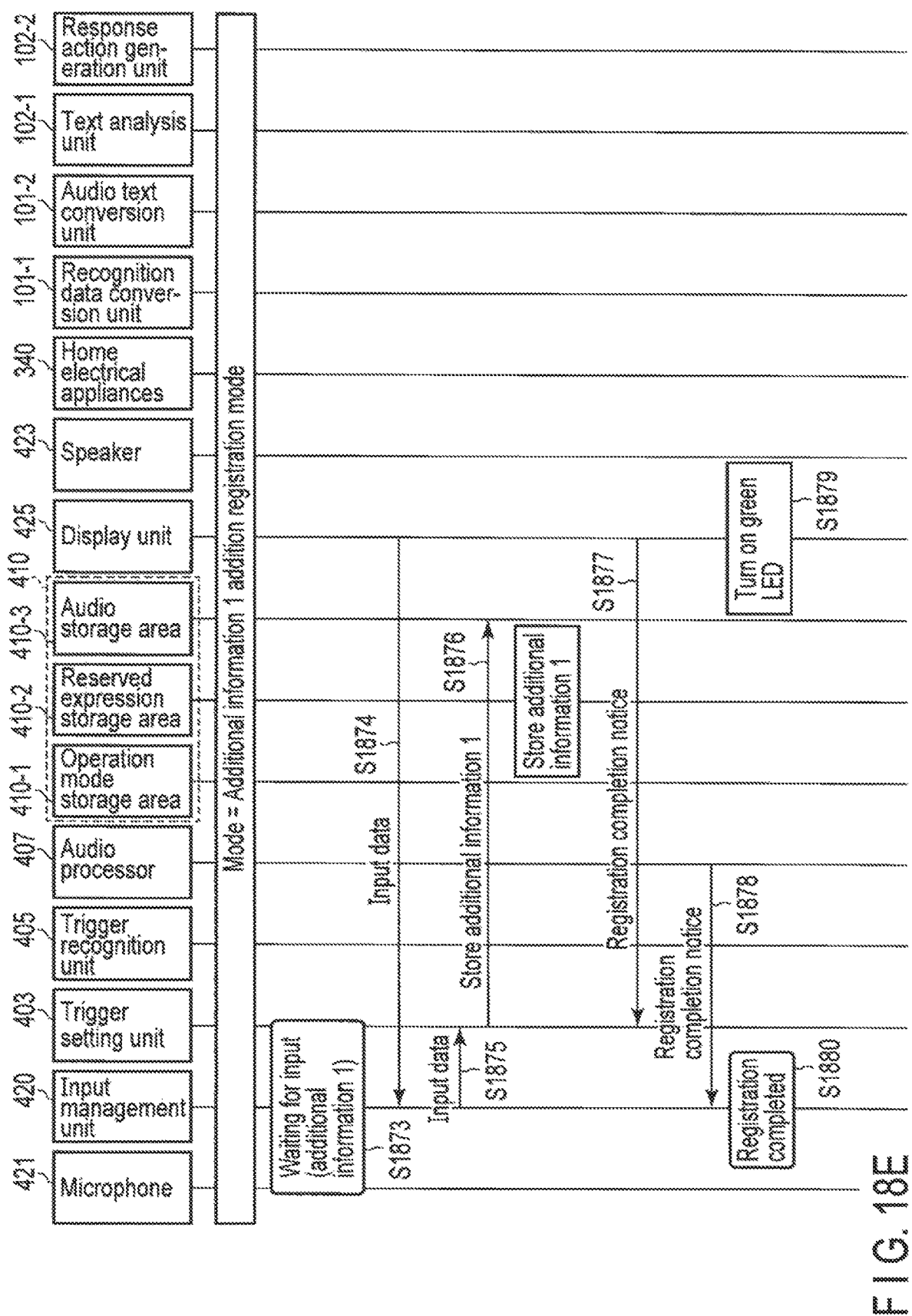
FIG. 18E shows another example of the sequence of steps for setting an operation corresponding to an utterance subsequent to a registered reserved expression in the recognition of the reserved expression according to an embodiment.

FIG. 18D and FIG. 18E show an example of the sequence of steps for adding only additional information for a registered reserved expression in a manner different from that of FIG. 18A, FIG. 18B and FIG. 18C.

Steps S1850 to S1856 shown in FIG. 18D are the same as steps S1800 to S1806 shown in FIG. 18A, respectively. Steps S1871 to S1880 shown in FIG. 18D and FIG. 18E are the same as steps S1821 to S1830 shown in FIG. 18C, respectively. The sequence example of FIG. 18A, FIG. 18B and FIG. 18C is different from that of FIG. 18D and FIG. 18E in respect that the process of FIG. 18D and FIG. 18E does not include steps corresponding to steps S1807 to S1820 for registering an additional word in FIG. 18A, FIG. 18B and FIG. 18C.

When the green LED blinks to prompt the user 331 to input additional information 1 (S1871), a menu for registering additional information 1 is displayed on the display unit 425. The user 331 prepares additional information 1 in accordance with the displayed menu screen. The prepared additional information 1 is loaded into the input management unit 420 (S1874). The input management unit 420 transmits the loaded additional information 1 to the trigger setting unit 403 (S1875). The trigger setting unit 403 stores the received additional information 1 in the reserved expression storage area 410-2 of the memory 410 (S1876).

The trigger setting unit 403 stores additional information 1 in the reserved expression storage area 410-2 of the memory 410 in association with the reserved expression recognized in step S1856. In this way, the operation associated with the reserved expression recognized in step S1856 may be stored.

Figure 19A:
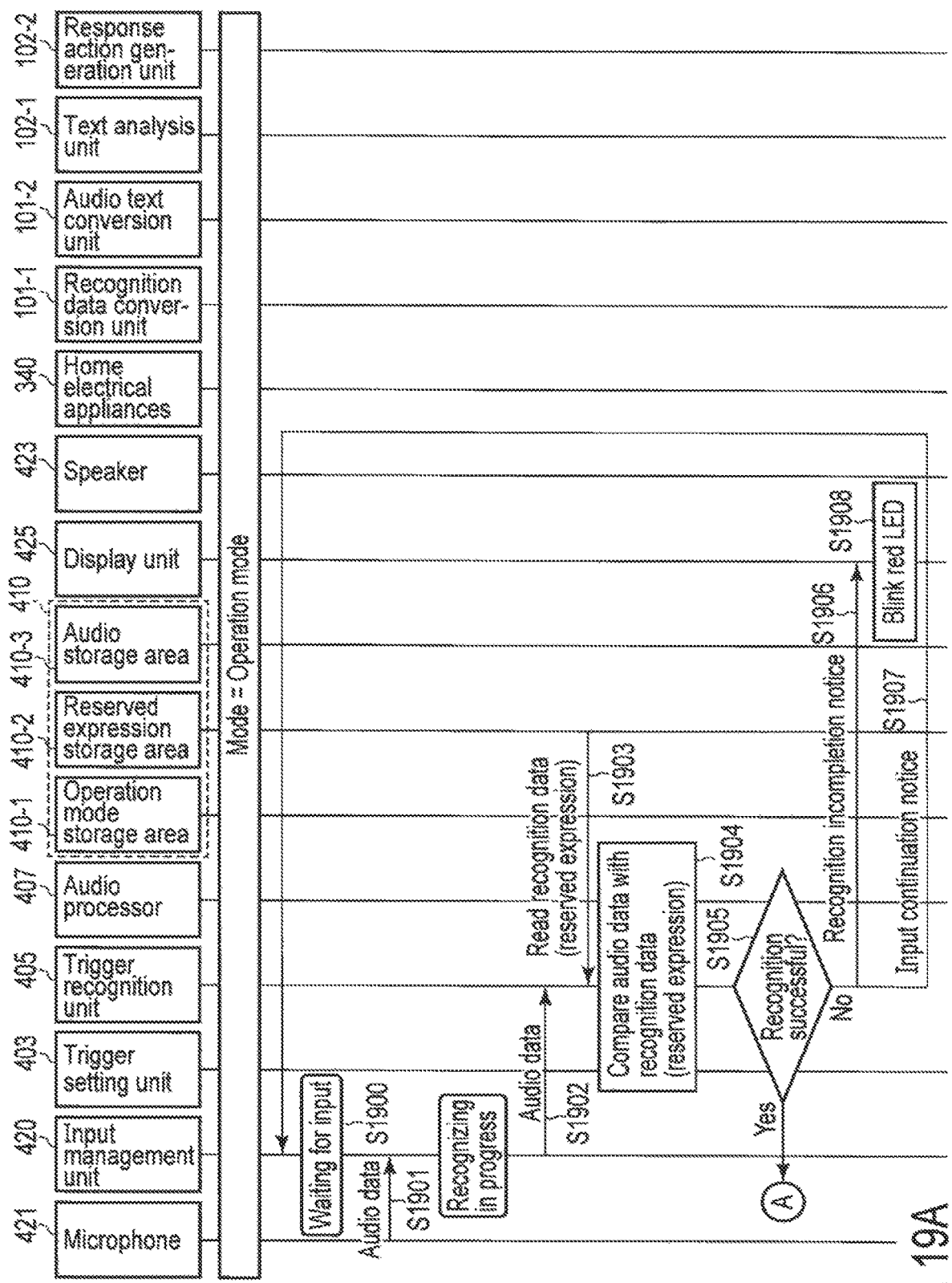
FIG. 19A shows an example of the sequence of steps for recognizing a reserved expression and setting an operation in accordance with the utterance subsequent to the recognized reserved expression according to an embodiment.
Figure 19B:
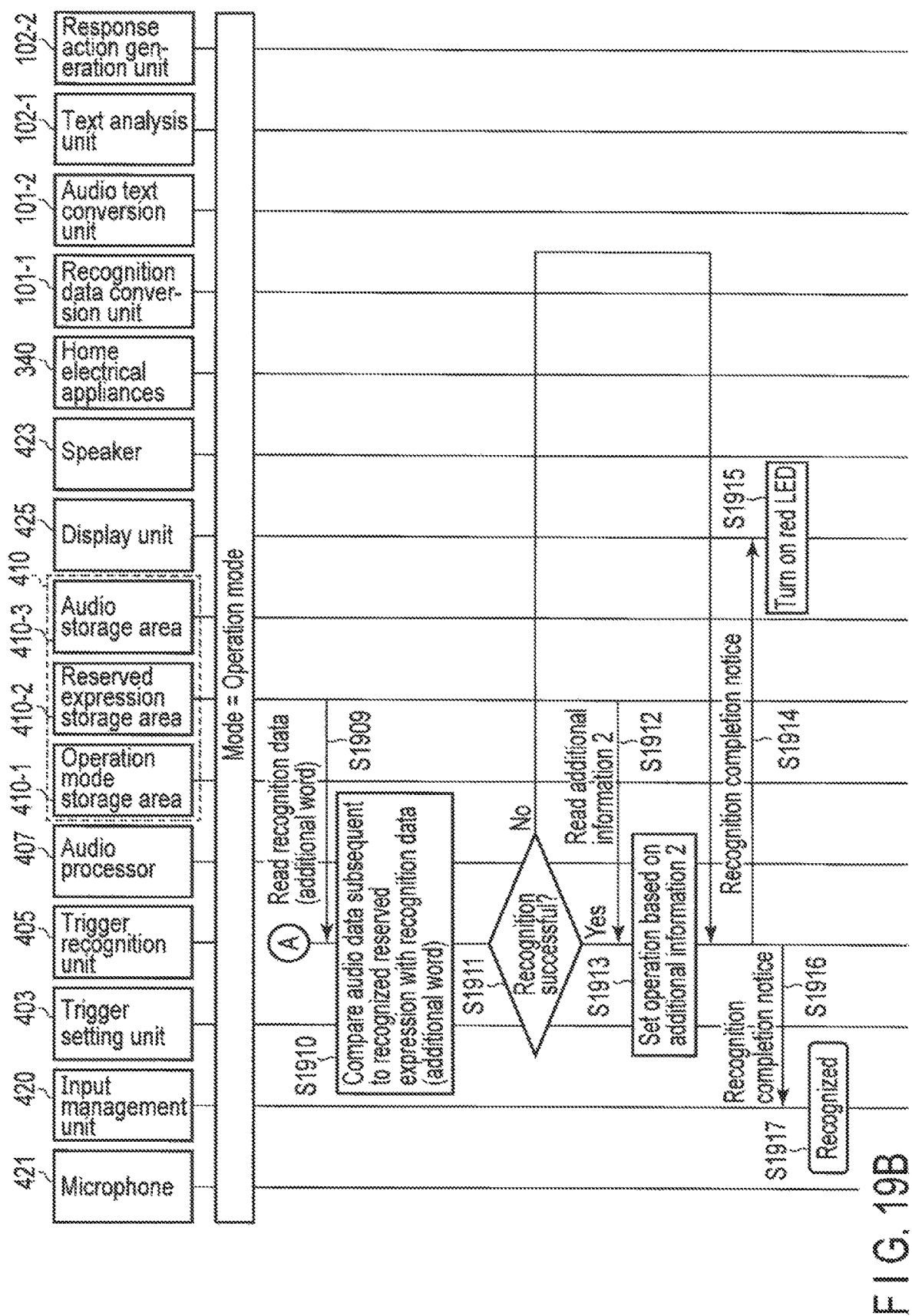
FIG. 19B shows an example of the sequence of steps for recognizing a reserved expression and setting an operation in accordance with the utterance subsequent to the recognized reserved expression according to an embodiment.

It is assumed that additional words and additional information 2 are stored in the reserved storage area 410-2 of the memory 410 by the process shown in FIG. 18A, FIG. 18B and FIG. 18C. FIG. 19A and FIG. 19B show an example of the sequence of steps for recognizing a reserved expression and an additional word from the utterance of the user 331, reading additional information 2 corresponding to the combination of the recognized reserved expression and additional word from the reserved expression storage area 410-2, and setting an operation in the host device 332.

Steps S1900 to S1908 shown in FIG. 19A are the same as steps S1600 to S1608 shown in FIG. 16A, respectively. The process of FIG. 19A and FIG. 19B is different from that of FIG. 16A and FIG. 16B in respect that steps S1909 to S1911 for recognizing an additional word are added, and steps S1912 and S1913 are performed to read additional information 2.

When a reserved expression is successfully recognized in step S1905 of FIG. 19A from the loaded data of the utterance of the user 311, the trigger recognition unit 405 compares the audio data continuously input subsequent to the recognized reserved expression with the recognition data (additional word) read from the reserved expression storage area 410-2 of the memory 410 to determine whether the audio data is an additional word (S1911). When the audio data subsequent to the reserved expression is recognized as an additional word, the trigger recognition unit 405 reads additional information 2 corresponding to the applicable reserved expression and additional word from the reserved expression area 410-2 of the memory 410 (S1912). After additional information 2 is read, the trigger recognition unit 405 sets the operation of the read additional information 2 in the host device 332 (S1913).

As described above, reserved expressions, additional words and additional information are registered in the host device 332. This structure allows the host device 332 to freely control the operation of the host device 332 and the operations of the devices and sensors connected to the host device 332 via the network. Thus, the devices and sensors can be controlled in accordance with the lifestyle of the user.

It is assumed that a plurality of reserved expressions are registered in the host device 332, and one of the reserved expressions is included in the utterance of the user 331. FIG. 20 shows a list of examples in which the speech recognition dictionary used in the audio text conversion unit 101-2 of the speech recognition cloud 101 is changed in accordance with the recognized reserved expression.

The host device 332 is capable of registering a plurality of reserved expressions. When the host device 332 recognizes that the utterance of the user 331 is one of the registered reserved expressions, the host device 332 is allowed to change the speech recognition dictionary used for converting audio data into text data in the audio text conversion unit 101-2 of the speech recognition cloud 101 in accordance with the recognized reserved expression. It is assumed that three reserved expressions "konnichiwa", "hello" and "ookini" are registered in the host device 332 as shown in FIG. 20. Konnichiwa is a Japanese phrase which means "hello" in the English language. Ookini means "thank you" in the Kansai dialect used in the Kansai region of Japan. When the host device 332 recognizes the reserved expression "konnichiwa", the host device 332 is allowed to issue an instruction for changing the speech recognition dictionary used in the audio text conversion unit 101-2 of the speech recognition cloud 101 to a Japanese dictionary. When the host device 332 recognizes the reserved expression "hello", the host device 332 is allowed to instruct the audio text conversion unit 101-2 of the speech recognition cloud 101 to change the type of speech recognition dictionary to an English dictionary. When the host device 332 recognizes the reserved expression "ookini", the host device 332 is allowed to issue an instruction for changing the type of speech recognition dictionary used in the audio text conversion unit 101-2 of the speech recognition cloud 101 to a dialect dictionary (Kansai dialect).

To change the speech recognition dictionary used in the audio text conversion unit 101-2 of the speech recognition cloud 101 in accordance with the reserved expression recognized by the host device 332, the user 331 needs to register a type of speech recognition dictionary (referred to as additional information 3) used in the audio text conversion unit 101-2 corresponding to the reserved expression when the user 331 registers the reserved expression in the host device 332.

The sequence of steps for registering a type of speech recognition dictionary (additional information 3) corresponding to a reserved expression together with the reserved expression is the same as that of steps for registering additional information 1 for a reserved expression in FIG. 15A and FIG. 15B. Additional information 3 may be input by selecting a screen for inputting additional information 3 instead of inputting additional information 1 into the menu screen displayed on the display unit 425 (S1516). Now, this specification explains the flow of the process for registering additional information 3 with reference to step S1514 and the subsequent steps in FIG. 15B. In the following explanation, additional information 1 described in step S1514 and the subsequent steps in FIG. 15B should be replaced by additional information 3.

When the green LED blinks to prompt the user 331 to input additional information 3 (S1514), a menu for registering additional information 3 is displayed on the display unit 425. The user 331 can select the type of dictionary as additional information 3 by inputting additional information 3 in accordance with the displayed menu screen. The prepared additional information 3 is loaded into the input management unit 420 (S1516). The input management unit 420 transmits the loaded additional information 3 to the trigger setting unit 403. The trigger setting unit 403 stores the received additional information 3 in the reserved expression storage area 410-2 of the memory 410.

The trigger setting unit 403 stores additional information 3 in the reserved expression storage area 410-2 of the memory 410 in association with the reserved expression registered in step S1513.

Figure 21A:
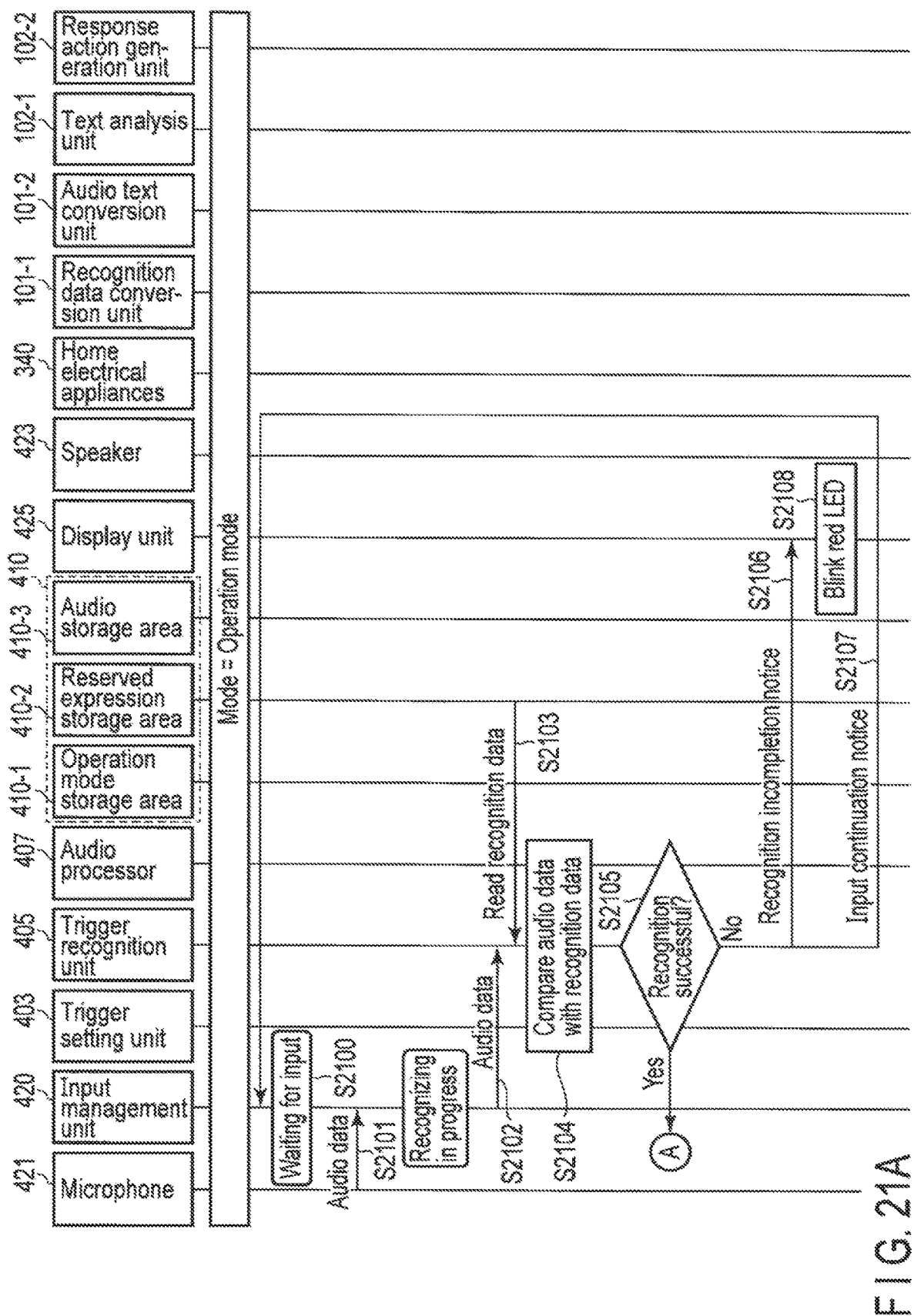
FIG. 21A shows an example of the sequence of steps for recognizing one of reserved expressions and changing the type of speech recognition dictionary to be used in accordance with the reserved expression according to an embodiment.

FIG. 21A and FIG. 21B show an example of the sequence of steps for changing the type of speech recognition dictionary used in the audio text conversion unit 101-2 when a plurality of reserved expressions are registered in the host device 332 as shown in FIG. 20, and further when each of the reserved expressions is recognized by the host device 332. Steps S2100 to S2113 shown in FIG. 21A and FIG. 21B are the same as steps S1600 to S1613 shown in FIG. 16A and FIG. 16B, respectively. The process of FIG. 21A and FIG. 21B is different from that of FIG. 16A and FIG. 16B in the following respect. In the process of FIG. 16A and FIG. 16B, the operation of the host device 332 is set based on additional information 1 (S1614) after the trigger recognition unit 405 reads additional information 1. The process of FIG. 21A and FIG. 21B includes an operation with the audio text conversion unit 101-2 for changing the type of speech recognition dictionary used in the audio text conversion unit 101-2 based on additional information 3 (S2114-1 to S2114-3) after the trigger recognition unit 405 reads additional information 3.

The display to notify the user that the recognition of a reserved expression and the change of the speech recognition dictionary are completed is preferably performed by a display method which allows the user 331 to recognize the completion. For example, the trigger setting unit 403 may transmit registration completion notice to the display device 425 (S2109). After the registration completion notice is received, the display device 425 may turn on, for example, the green LED. Alternatively, the trigger recognition unit 405 may transmit registration completion notice to the speaker 423. After the registration completion notice is received, the speaker 423 may make an audio announcement to the user 331 as follows: "May I help you? By the way, the dictionary of speech recognition has been changed to a Kansai-dialect dictionary." Alternatively, the trigger recognition unit 405 may use both a display method with the display device 425 and a sound method with the speaker 423 to notify the user 331 of the completion of the recognition of a reserved expression and the change of the speech recognition dictionary in accordance with the recognized reserved expression.

It is possible to register an operation corresponding to a reserved expression as shown in FIG. 14 (additional information 1), an operation corresponding to an additional word for a reserved expression as shown in FIG. 17(A) and FIG. 17(B) (additional information 2), and a type of speech recognition dictionary for a reserved expression as shown in FIG. 20 (additional information 3) in combination.

FIG. 22 is a list of combinations when the registration of an operation corresponding to a reserved expression as shown in FIG. 14, the registration of an additional word for a reserved expression and the registration of an operation corresponding to an additional word as shown in FIG. 17(A), and the registration of a type of speech recognition dictionary for a reserved expression as shown in FIG. 20 are performed in combination. For example, the host device 332 sets a Japanese dictionary as the type of speech recognition dictionary to be used for the reserved expression "konnichiwa". The host device 332 registers additional words "chan", "ya" and "oi" for the reserved expression "konnichiwa". The host device 332 changes its operation such that a high tone is used to respond when the additional word is "chan". The host device 332 changes the setting such that the expiry time T0 of the input interval confirmation timer T is extended when the additional word is "ya". The host device 332 changes the operation such that the announcement "moushiwakegozaimasen" is immediately made when the additional word is "oi".

FIG. 23 is a list of examples in which the type of speech recognition dictionary used in the text conversion unit 101-2 is changed in accordance with the content other than a reserved expression (referred to as the condition for change). FIG. 23(A) shows an example in which the time is set as the condition for change. The examples show that the host device 332 issues an instruction for changing the type of speech recognition dictionary to be used when the text conversion unit 101-2 of the speech recognition cloud 101 converts audio data into text in accordance with the time the speech recognition dictionary is used.

For example, the host device 332 instructs the text conversion unit 101-2 via the Internet 2 to use a general family dictionary from 5:00 to 8:00, use a wife dictionary from 8:00 to 16:00, use the general family dictionary from 16:00 to 20:00, and use an adult dictionary from 20:00 to 5:00.

FIG. 23(B) shows an example in which the operation status of the host device 332 is set as the condition for change. The host device 332 is capable of issuing an instruction for changing the type of speech recognition dictionary to be used by the text conversion unit 101-2 in accordance with the operation status of the host device 332 when the speech recognition dictionary is used.

For example, the host device 332 instructs the text conversion unit 101-2 via the Internet 2 to use a time route search dictionary when the operation status is GOING TO WORK, use a general dictionary when the operation status is OUT, and use a refresh dictionary when the operation status is NIGHT.

The host device 332 has a mode for registering the information of types for the condition for change, in other words, the information of types of speech recognition dictionaries to be used in accordance with the condition (referred to as a mode for registering the condition for change).

The user 331 needs to register in advance the information of types for the condition for change in the host device 332 such that the type of speech recognition dictionary to be used is changed in accordance with the condition for change.

To register the information of types for the condition for change, the host device 332 may load the utterance of the user 331 through the microphone 421 and analyze the loaded audio data. In this way, the type of speech recognition dictionary to be used may be changed in accordance with the condition for change. Alternatively, a menu for setting additional information 1 may be displayed on the display device 425. The user 331 may register the information of types for the condition for change in accordance with the menu. Alternatively, an external device connected via the network I/F 427 shown in FIG. 4, such as a smartphone or tablet, may be used such that a menu for setting additional information 1 corresponding to a reserved expression is displayed on the display screen of the smartphone or tablet. The user 331 may register the information of types for the condition for change in accordance with the menu screen.

Figure 24:
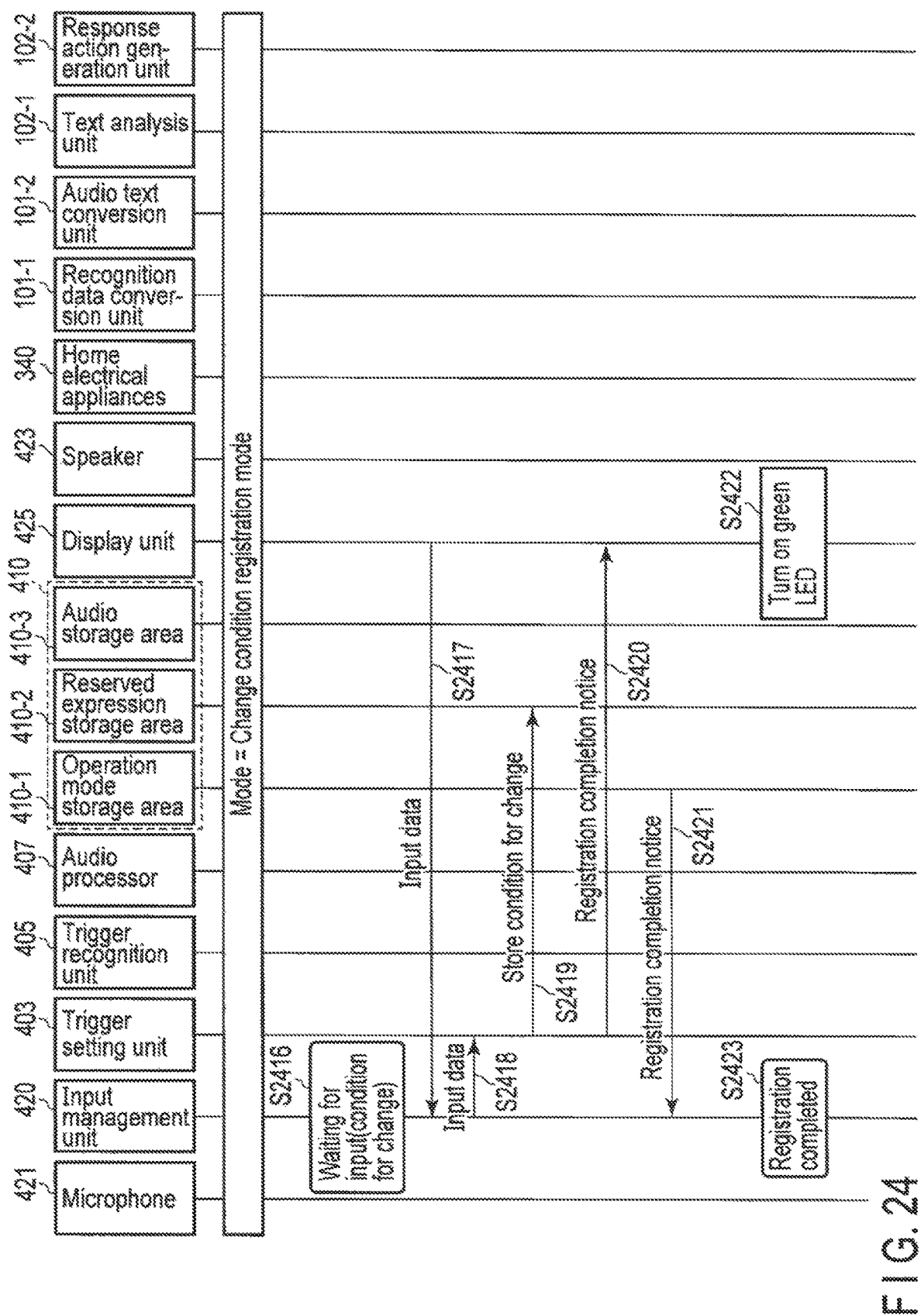
FIG. 24 shows the sequence of steps for registering the types of speech recognition dictionaries to be used in accordance with the content other than a reserved expression according to an embodiment.

FIG. 24 shows an example of the sequence of steps which are performed when the user 331 registers the types of speech recognition dictionaries to be used in accordance with the condition for change by operating a menu for setting the information of types for the condition for change on the display unit 425. Steps S2417 to S2423 shown in FIG.

24 are the same as steps S1517 to S1523 shown in FIG. 15B regarding the sequence of steps for registering additional information 1.

The user 331 inputs the types of speech recognition dictionaries to be used in accordance with the condition for change by operating the displayed menu screen. The input information of types for the condition for change is loaded into the input management unit 420 (S2417). The input management unit 420 transmits the loaded information of types for the condition for change to the trigger setting unit 403 (S2418). The trigger setting unit 403 stores the received information of types for the condition for change in the reserved expression storage area 410-2 of the memory 410 (S2419).

Figure 25:
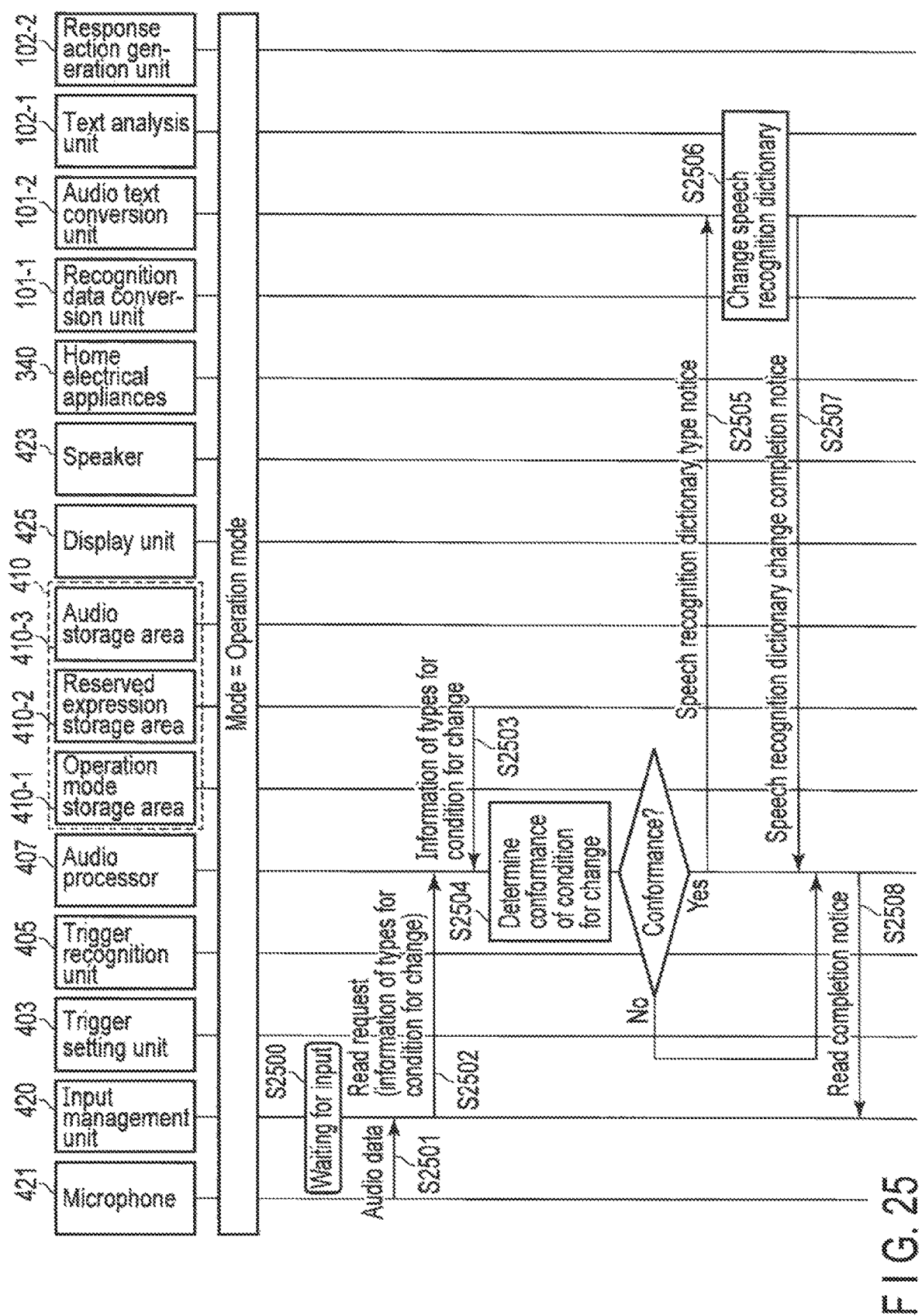
FIG. 25 shows the sequence of steps for changing the type of speech recognition dictionary in accordance with the content other than a reserved expression according to an embodiment.

It is assumed that the information of types for the condition for change for changing the type of speech recognition dictionary in accordance with the condition for change is stored in the reserved expression storage area 410-2 of the memory 410 as shown in FIG. 23. FIG. 25 shows an example of the sequence of steps which are performed when the host device 332 notifies the audio text conversion unit 101-2 of change of the speech recognition dictionary in accordance with the stored information of type for the condition for change.

For example, the process of FIG. 25 preferably follows the completion of the process for recognizing a reserved expression shown in FIG. 9B (S911). Alternatively, it is preferable that the process of FIG. 25 be performed after the host device 332 loads the utterance of the user 331 (S1001) in a case where the user 331 speaks to the host device 332 to control a device or sensor subsequent to the recognition of a reserved expression as shown in FIG. 10A and FIG. 10B.

FIG. 25 shows an example of a process for determining the change of the speech recognition dictionary and indicating the result of determination after the host device 332 loads the utterance of the user 331 (S1001) in a case where the user 331 speaks to the host device 332 to control a device or sensor as shown in FIG. 10A and FIG. 10B.

After the recognition of a reserved expression is completed, the host device 332 loads the successive utterance of the user into the input management unit 420 through the microphone 421 (S2501). To read the information of types for the condition for change, the input management unit 420 transmits a read request (the information of types for the condition for change) to the audio processor 407 (S2502) and suspends the process for the loaded audio data after the audio data is loaded. After the read request (the information of types for the condition for change) is received, the audio processor 407 reads the information of types for the condition for change including the combinations of conditions for change and types of speech recognition dictionaries from the reserved expression storage area 410-2 of the memory 410 (S2503). The audio processor 407 analyzes the conditions for change included in the read information of types for the condition for change, and determines whether the content conforms to the state of the host device 332 (S2504). When the content conforms to the state of the host device 332, the audio processor 407 reads a type of speech recognition dictionary corresponding to the condition for change, and transmits speech recognition dictionary type notice indicating the type of speech recognition dictionary after the change to the audio text conversion unit 101-2 via the Internet (S2505). After the speech recognition dictionary type notice is received, the audio text conversion unit 101-2 changes the type of speech recognition dictionary currently used to the indicated type of speech recognition dictionary with reference to the indicated type of speech recognition dictionary (S2506).

After the type of speech recognition dictionary is changed, the audio text conversion unit 101-2 transmits speech recognition dictionary change completion notice to the audio processor 407 as the notice of completion of change (S2507).

After the speech recognition dictionary change completion notice is received (S2507), the audio processor 407 transmits read completion notice to the input management unit 420 as notice indicating that the information of types for the condition for change has been read (S2508). After the read completion notice is received (S2508), the input management unit 420 restarts the process for the audio data loaded in step S2501.

The user 331 may forget some of the reserved expressions registered in the host device 332. In preparation for such a case, the user 331 is preferably able to easily confirm the reserved expressions already registered.

FIG. 26 shows a list of examples of reserved expressions (referred to as remedial reserved expressions) used to notify the user 331 of some of or all of the registered reserved expressions and displays (display ranges) when the user 331 registers the reserved expressions in the example of the sequence shown in FIG. 5A and FIG. 5B and forgets one of the registered reserved expression. For example, in association with the reserved expression "I don't know", all of the reserved expressions registered in the host device 332 are displayed on the display unit 425 or in the display area of an external device connected to the host device 332. In association with the reserved expression "tell me", some predetermined reserved expressions of all of the reserved expressions registered in the host device 332 are displayed on the display unit 425 or in the display area of an external device connected to the host device 332. In association with the reserved expression "not used", the reserved expressions which have not been used for the past year of all of the reserved expressions registered in the host device 332 are displayed on the display unit 425 or in the display area of an external device connected to the host device 332. The external device connected to the host device 332 is preferably a device which comprises a relatively large display screen such that the user can refer to a large number of reserved expressions at the same time, such as a smartphone, a tablet or a liquid crystal television.

In the above manner, a reserved expression for displaying the registered reserved expressions may be registered by changing the mode of the host device to a setting mode (a reserved expression for display) and following the sequence of steps for registering a reserved expression in FIG. 5A and FIG. 5B.

In the above example, the applicable reserved expressions are displayed immediately after the user says one of the remedial reserved expressions shown in FIG. 26. However, the host device 332 may request the user 331 to say a password before the applicable reserved expressions are displayed. After the user says a remedial reserved expression, the host device 332 may emit a sound of "mountain" through the speaker 423. When the user 331 says "river" in response to "mountain", the applicable reserved expressions may be displayed.

The host device 332 is also capable of loading the utterance of the user 331 and applying audio recording or video recording to the scene of registering a reserved expression, an additional word or additional information. Moreover, the host device 332 is capable of applying audio recording or video recording to the scene of recognizing a reserved expression or an additional word when it is recognized.

FIG. 27 shows the functional blocks of the host device 332 when the host device 332 loads the utterance of the user 331 and applies audio recording or video recording to the scene of registering a reserved expression, an additional word or additional information or the scene of recognizing a reserved expression or an additional word. FIG. 27 is different from FIG. 4 in the following respects. A host device 2700 comprises a camera 2702 for applying video recording to the scene of registering a reserved expression, an additional word or additional information or the scene of recognizing a reserved expression or an additional word. A control management unit 2701 comprises EVT-Mg 2701-3 in addition to APP-Mg 2701-1 and CONF-Mg 2701-2. The system controller 402 has a playback control function for playing back the data of the audio-recorded or video-recorded scene. The EVT-Mg 2701-3 has a function for applying audio recording or video recording as described later in association with the generation of the scene of registering a reserved expression, an additional word or additional information or the generation of the scene of recognizing a reserved expression or an additional word. Now, this specification explains the flow of a process which is performed by the host device 332 for loading the utterance of the user 331 and applying audio recording or video recording to the scene of registering a reserved expression, an additional word or additional information or to the scene of recognizing a reserved expression or an additional word.

Figure 28:
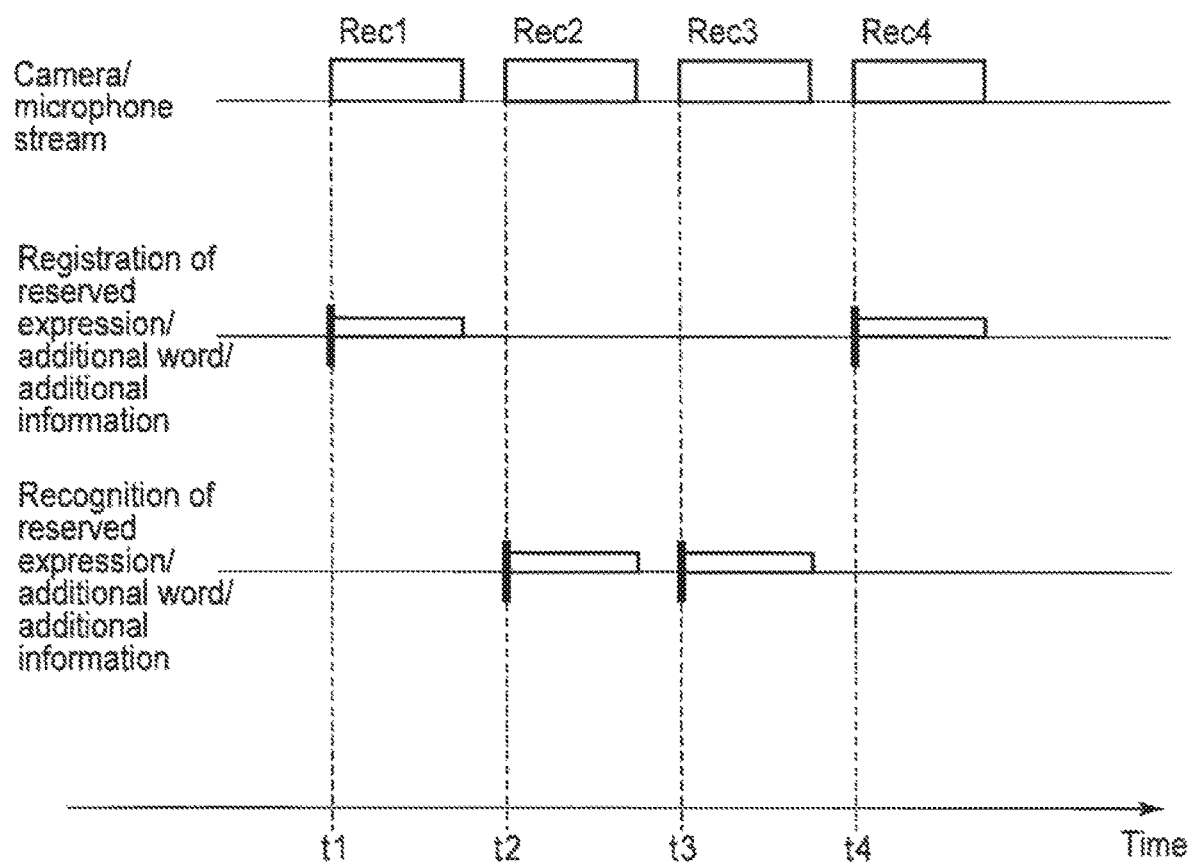
FIG. 28 shows an example of the passage of time when the scene of registering a reserved expression, an additional word or additional information or the scene of recognizing a reserved expression or an additional word is generated, and further when the host device 332 applies audio recording or video recording to the scene of registration or the scene of recognition in a process according to an embodiment.

FIG. 28 shows the passage of time when the scene of registering a reserved expression, an additional word or additional information or the scene of recognizing a reserved expression or an additional word is generated, and further when the host device 332 applies audio recording or video recording to the scene of registration or the scene of recognition.

It is assumed that the host device 332 starts registering the utterance of the user as a reserved expression at time t1. The registration of the reserved expression may be started when the input management unit 420 performs step S502 in the sequence of steps or registering a reserved expression in FIG. 5A and FIG. 5B. After the input management unit 420 recognizes that the registration of the reserved expression is started, the input management unit 420 notifies the EVT-Mg 2701-3 of the start. After the EVT-Mg 2701-3 receives the notice indicating the start of the registration of the reserved expression, the EVT-Mg 2701-3 applies audio recording to the scene of registering the reserved expression as Rec 1 through the microphone 421, or applies video recording to the scene of registering the reserved expression as Rec 1 through the camera 2702. The registration of the reserved expression may be completed when, for example, the input management unit 420 receives registration completion notice in step S512 in the sequence of steps for registering a reserved expression in FIG. 5A and FIG. 5B. After the input management unit 420 recognizes that the registration of the reserved expression is completed, the input management unit 420 notifies the EVT-Mg 2701-3 of the completion. After the EVT-Mg 2701-3 receives the notice indicating the completion of the registration of the reserved expression, the EVT-Mg 2701-3 terminates the audio recording of the scene of registering the reserved expression through the microphone 421 or the video recording of the scene of registering the reserved expression through the camera 2702.

It is assumed that the host device 332 starts recognizing the utterance of the user as a reserved expression at time t2. The recognition of the reserved expression may be started when the input management unit 420 performs step S802 in the sequence of steps for recognizing a reserved expression in FIG. 8A and FIG. 8B. After the input management unit 420 recognizes that the recognition of the reserved expression is started, the input management unit 420 notifies the EVT-Mg 2701-3 of the start. After the EVT-Mg 2701-3 receives the notice indicating the start of the recognition of the reserved expression, the EVT-Mg 2701-3 applies audio recording to the scene of recognizing the reserved expression as Rec 2 through the microphone 421, or applies video recording to the scene of recognizing the reserved expression as Rec 2 through the camera 2702. The recognition of the reserved expression may be completed when, for example, the input management unit 420 receives recognition completion notice in step S811 in the sequence of steps for registering a reserved expression in FIG. 8A and FIG. 8B. After the input management unit 420 recognizes that the recognition of the reserved expression is completed, the input management unit 420 notifies the EVT-Mg 2701-3 of the completion. After the EVT-Mg 2701-3 receives the notice indicating the completion of the recognition of the reserved expression, the EVT-Mg 2701-3 terminates the audio recording of the scene of recognizing the reserved expression through the microphone 421 or the video recording of the scene of recognizing the reserved expression through the camera 2702.

In the same way, video recording or audio recording is applied to an event of registration or recognition generated at times t3 and t4.

The host device 332 is capable of playing back the audio-recorded or video-recorded scene of registration or recognition.

Figure 29:
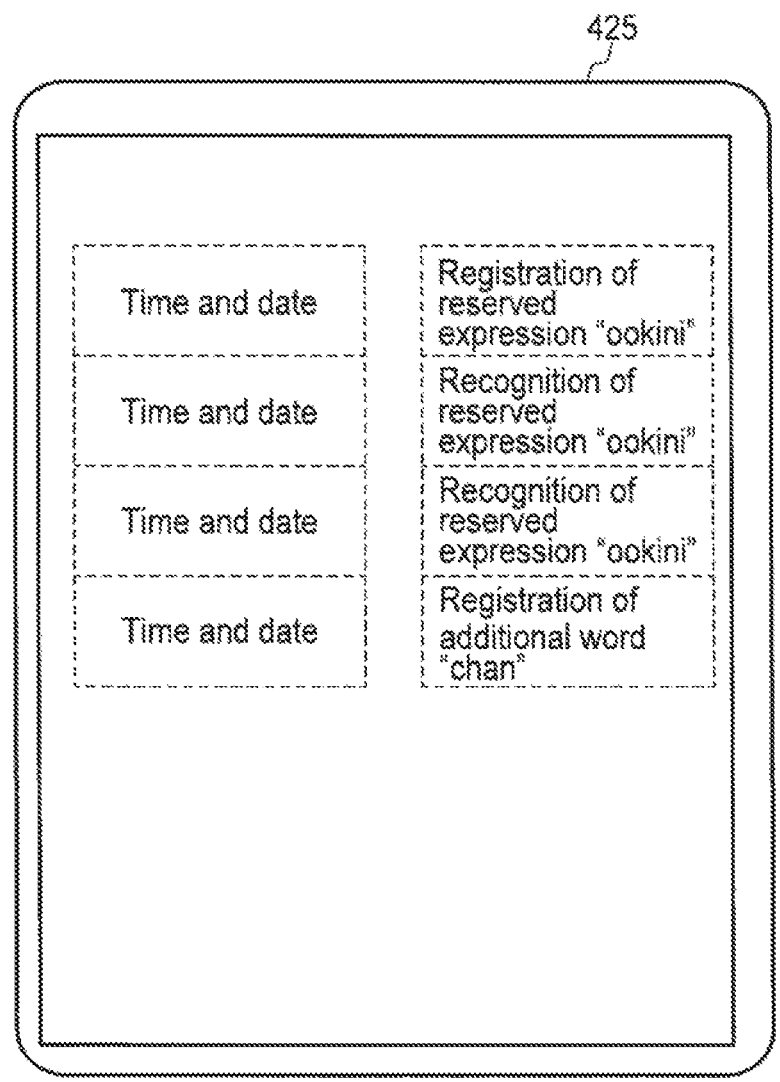
FIG. 29 shows an example in which the data of each video-recorded or audio-recorded scene to be played back is displayed according to an embodiment.

FIG. 29 shows an example in which the data of each video-recorded or audio-recorded scene to be played back is displayed. In the example of FIG. 29, the four icons of the data to be played back are displayed so as to correspond to the generations of events on the temporal axis of FIG. 28. The icons of the data to be played back may be displayed on, for example, the display unit 425. Alternatively, the icons may be displayed in an external device connected to the host device 332, such as a smartphone, a tablet or a liquid crystal television.

Each of the displayed icons shows the audio-recorded or video-recorded time and date, and the content of the video-recorded or audio-recorded data. When the display of the icon is the registration of the reserved expression "ookini", the content of the video-recorded or audio-recorded data is the scene of registering "ookini" as a reserved expression. When the display of the icon is the recognition of the reserved expression "ookini", the content of the video-recorded or audio-recorded data is the scene of recognizing "ookini" as a reserved expression.

The user 331 can confirm the audio-recorded or video-recorded content of the data to be played back by selecting the icon of the data.

When the scene of registering a reserved expression, an additional word or additional information is generated, or when the scene of recognizing a reserved expression or an additional word is generated, the host device 332 may transmit an instruction to a camera or microphone connected via the network 333 such that audio recording or video recording is applied to the scene of registration or recognition by the camera or microphone.

As explained above, the host device 332 is capable of recognizing a reserved expression from the utterance of the user 331 and controlling a device or sensor connected via the network based on additional information corresponding to the reserved expression. In some cases, the control content of the target device or sensor may require a high security level. It is assumed that a reserved expression is registered in the host device 332 with additional information indicating the operation for opening and closing the door of a safe such that the host device is used to control the operation for opening and closing the door of the safe. When the host device 332 recognizes the applicable reserved expression, the host device 332 opens or closes the door of the safe. Further, the host device 332 applies audio recording or video recording to the vicinity of the safe which is the device to be controlled, using a microphone or camera provided around the safe. In this way, the host device 332 is capable of maintaining the security of the operation for opening and closing the door of the safe. The user 331 can confirm the content of the data obtained by applying audio recording or video recording using a microphone or camera connected via the network as well as the microphone or camera provided in the host device 332. When the operation of the device or sensor to be controlled by the host device 332 requires a high security level, the host device 332 may use the audio or video data recorded by a microphone or camera provided around the target device or sensor and confirm the authorization of the person of the utterance or image included in the data before the operation is performed. The host device 332 may compare the feature points of the voice or face of the specific person registered in advance with the audio or video data recorded by the microphone or camera provided around the device or sensor to be controlled before performing the operation of the specific additional information. Only when the applicable person is authorized, the applicable operation may be performed.

In the above explanation, all of the recognition data conversion unit 101-1, the audio text conversion unit 101-2, the text analysis unit 102-1 and the response action generation unit 102-2 are present in the cloud server 1. However, one of, some of or all of these units may be provided in the host device 332. Even in such a case, the example of the sequence of steps of each process explained above is applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a management unit configured to prepare and manage a voice command triggering audio data item for determining whether a first external utterance input is a desired utterance, and to determine whether the first external utterance is the desired utterance using the prepared and managed voice command triggering audio data item; and
a controller configured to control one or more devices based on a second external utterance input subsequent to the first external utterance input in response to the management unit determines that the first external utterance is the desired utterance,
wherein:
the management unit is further configured to automatically detect a user age range associated with the first external utterance and/or the second external utterance;
automatically configure a time threshold period based on the user age range;
the management unit is further configured to receive a third external utterance input;
in response to the third external utterance being received after the second external utterance within the automatically configured time threshold period and being an utterance other than the prepared and managed voice command triggering audio data item, the controller is further configured to interpret the third external utterance as a control content and to control the one or more devices based on the third external utterance; and
in response to that the third external utterance is received after the second external utterance outside the automatically configured time threshold period, the controller is further configured to provide a prompt for a user to input the desired utterance and determine whether the third external utterance is the desired utterance rather than controlling the one or more devices based on the third eternal utterance.

2. The electronic device according to claim 1, wherein the one or more devices controlled by the controller based on the second external utterance are in connection with the electronic device via a network.

3. The electronic device according to claim 1, wherein the controller is further configured to determine whether the first external utterance is the desired utterance by:
receiving the first external utterance;
reading voice recognition reference data;
comparing the voice recognition reference data with the first external utterance;
in response to the first external utterance being recognized as a reserved expression, determining a recognition probability;
in response to the recognition probability being no less than a first threshold, determining that the first external utterance is the desired utterance; and
in response to the recognition probability being less than the first threshold, prompting for more external utterance input.

4. The electronic device according to claim 1, further comprising a display unit configured to display a result of determination of the management unit, wherein the said determination comprises determining that the first external utterance is the desired utterance using the voice command triggering audio data item.

5. The electronic device according to claim 1, further comprising an output unit configured to output a result of determination of the management unit by sound, wherein the said determination comprises determining that the first external utterance is the desired utterance using the voice command triggering audio data item.

6. The electronic device according to claim 1, further comprising a selection unit for selecting a type of speech recognition dictionary used for analyzing the first external utterance, wherein the selection unit is configured to determine the type of speech recognition dictionary in accordance with a state of the electronic device.

7. The electronic device according to claim 1, further comprising a selection unit for selecting a type of speech recognition dictionary used for analyzing the second external utterance, wherein the selection unit is configured to determine the type of speech recognition dictionary in accordance with a state of the electronic device.

8. The electronic device according to claim 1, further comprising a selection unit for selecting a type of speech recognition dictionary used for analyzing the third external utterance, wherein the selection unit is configured to determine the type of speech recognition dictionary in accordance with a state of the electronic device.

9. A control method of an electronic device comprising:
receiving a first external utterance input;
determining whether the first external utterance is a desired utterance based on a predefined voice command triggering audio data item;
in response to the first external utterance being the desired utterance, controlling one or more devices based on a second external utterance input subsequent to the first external utterance input;
automatically detecting a user age range associated with the first external utterance and/or the second external utterance;
automatically configuring a time threshold period based on the user age range;
receiving a third external utterance input;
in response to the third external utterance being received after the second external utterance within the automatically configured time threshold period and being an utterance other than the prepared and managed voice command triggering audio data item, interpreting the third external utterance as a control content and controlling the one or more devices based on the third external utterance; and
in response to that the third external utterance is received after the second external utterance outside the automatically configured time threshold period, providing a prompt for a user to input the desired utterance and determining whether the third external utterance is the desired utterance rather than controlling the one or more devices based on the third eternal utterance.

10. The method according to claim 9, wherein determining whether the first external utterance is the desired utterance comprises:
receiving the first external utterance;
reading voice recognition reference data;
comparing the voice recognition reference data with the first external utterance;
in response to the first external utterance being recognized as a reserved expression, determining a recognition probability;
in response to the recognition probability being no less than a first threshold, determining that the first external utterance is the desired utterance; and
in response to the recognition probability being less than the first threshold, prompting for more external utterance input.

11. The method according to claim 9, further comprising:
displaying a result of the determination that the first external utterance is the desired utterance using the predefined voice command triggering audio data item.

12. The method according to claim 9, further comprising:
outputting a result of the determination that the first external utterance is the desired utterance using the predefined voice command triggering audio data item by sound.

13. The method according to claim 9, further comprising: selecting a type of speech recognition dictionary used for analyzing the first external utterance in accordance with a state of the electronic device.

14. The method according to claim 9, further comprising: selecting a type of speech recognition dictionary used for analyzing the second external utterance in accordance with a state of the electronic device.

15. The method according to claim 9, further comprising: selecting a type of speech recognition dictionary used for analyzing the third external utterance in accordance with a state of the electronic device.

* * * * *